(12) United States Patent
Cole

(10) Patent No.: US 7,635,136 B2
(45) Date of Patent: Dec. 22, 2009

(54) TRUCK ASSEMBLY FOR A SKATEBOARD, WHEELED PLATFORM, OR VEHICLE

(75) Inventor: Jeffrey E. Cole, 40 Gold Creek Ct., Danville, CA (US) 94506

(73) Assignee: Jeffrey E. Cole, Danville, CA (US)

( * ) Notice: Subject to any disclaimer, the term of this patent is extended or adjusted under 35 U.S.C. 154(b) by 436 days.

(21) Appl. No.: 11/376,621

(22) Filed: Mar. 14, 2006

(65) Prior Publication Data

US 2007/0001415 A1 Jan. 4, 2007

Related U.S. Application Data

(63) Continuation-in-part of application No. PCT/US2005/022009, filed on Jun. 21, 2005.

(51) Int. Cl.
| | |
|---|---|
| A63C 1/00 | (2006.01) |
| A63C 17/00 | (2006.01) |
| B62B 9/22 | (2006.01) |
| B62M 1/00 | (2006.01) |
| B60K 25/10 | (2006.01) |
| B60L 11/16 | (2006.01) |
| B62M 1/10 | (2006.01) |
| A63C 17/12 | (2006.01) |

(52) U.S. Cl. .................. 280/87.042; 280/11.115; 280/11.27; 280/11.28; 280/21.1; 280/22.1; 280/87.01; 280/87.021; 280/87.041; 280/47.1; 180/165; 180/180; 180/181

(58) Field of Classification Search ............ 280/11.115, 280/11.27, 11.28, 21.1, 22.1, 87.01, 87.021, 280/87.041, 87.042, 47.1; 180/165, 180, 180/181

See application file for complete search history.

(56) References Cited

U.S. PATENT DOCUMENTS

| 297,388 A | 4/1884 | Hall |
| 527,082 A | 10/1894 | Smith |
| 582,696 A | 5/1897 | Schneible et al. |
| 590,492 A | 9/1897 | Calderwood et al. |
| 787,988 A | 4/1905 | Moore |
| 793,664 A | 7/1905 | Kleindienst et al. |
| 865,117 A | 9/1907 | Muhl et al. |

(Continued)

FOREIGN PATENT DOCUMENTS

DE 3829318 3/1990

(Continued)

*Primary Examiner*—Paul N Dickson
*Assistant Examiner*—John R Olszewski
(74) *Attorney, Agent, or Firm*—Buchanan Ingersoll & Rooney PC

(57) ABSTRACT

A method of propelling a wheeled platform, which includes creating a source of energy upon a first change in orientation of the platform around an axis approximately parallel to a longitudinal axis of the platform and wherein the platform rotates around the axis. The source of energy is stored and released to propel the wheeled platform upon a second change in orientation of the platform around the axis.

20 Claims, 33 Drawing Sheets

U.S. PATENT DOCUMENTS

| | | |
|---|---|---|
| 936,173 A | 10/1909 | Schoenberg |
| 1,111,160 A | 9/1914 | Larsen et al. |
| 1,208,173 A | 12/1916 | Lenhardt |
| 1,364,471 A | 1/1921 | Ameli |
| 1,410,326 A | 3/1922 | Labak |
| 1,535,950 A | 4/1925 | Schramke |
| 1,650,450 A | 11/1927 | Jochum |
| 2,061,334 A | 11/1936 | Stone |
| 2,177,381 A | 10/1939 | Bichi |
| 2,195,812 A | 4/1940 | Czamecki |
| 2,434,546 A | 1/1948 | Breedlove |
| 2,589,449 A | 3/1952 | Stageberg |
| 2,699,649 A | 1/1955 | Messick |
| 2,852,183 A | 9/1958 | Breinig et al. |
| 2,976,698 A | 3/1961 | Muffly |
| 2,991,619 A | 7/1961 | Powell |
| 3,027,719 A | 4/1962 | Keech |
| 3,074,233 A | 1/1963 | Keech |
| 3,153,984 A | 10/1964 | Fikse |
| 3,216,363 A | 11/1965 | Snow et al. |
| 3,272,138 A | 9/1966 | Connoy et al. |
| 3,381,622 A | 5/1968 | Wilcox |
| 3,399,906 A | 9/1968 | Portnoff |
| 3,528,756 A | 9/1970 | Norlin et al. |
| 3,567,350 A | 3/1971 | Niemiec |
| 3,635,020 A | 1/1972 | Mahlmann |
| 3,642,388 A | 2/1972 | Maistrelli |
| 3,677,141 A | 7/1972 | Lagerqvist et al. |
| 3,822,965 A | 7/1974 | Drutchas et al. |
| 3,855,791 A | 12/1974 | Quinto |
| 3,866,935 A | 2/1975 | Nelson |
| 3,892,283 A | 7/1975 | Johnson |
| 3,971,215 A | 7/1976 | Baron et al. |
| 3,973,468 A | 8/1976 | Russell, Jr. |
| 4,040,310 A | 8/1977 | Giroux |
| 4,069,881 A | 1/1978 | Shiber |
| 4,087,105 A | 5/1978 | Amarantos |
| 4,109,466 A | 8/1978 | Keech |
| 4,111,618 A | 9/1978 | Thibault |
| 4,153,376 A | 5/1979 | Neier |
| 4,181,319 A | 1/1980 | Hirbod |
| 4,185,847 A | 1/1980 | Johnson |
| 4,196,916 A | 4/1980 | Schorr |
| 4,206,684 A | 6/1980 | Gosney et al. |
| 4,265,602 A | 5/1981 | Teruyama |
| 4,290,268 A | 9/1981 | Lowther |
| 4,319,760 A | 3/1982 | Romano |
| 4,347,047 A | 8/1982 | Shiozawa et al. |
| 4,355,542 A | 10/1982 | Tsutsumi et al. |
| 4,367,638 A | 1/1983 | Gray |
| 4,386,891 A | 6/1983 | Riefel et al. |
| 4,411,442 A | 10/1983 | Rills |
| 4,419,058 A | 12/1983 | Franklin, Jr. et al. |
| 4,451,055 A | 5/1984 | Lee |
| 4,459,807 A | 7/1984 | Koppen |
| 4,470,776 A | 9/1984 | Kostek et al. |
| 4,486,150 A | 12/1984 | Davis |
| 4,506,464 A | 3/1985 | Cartner |
| 4,541,791 A | 9/1985 | Ideta et al. |
| 4,546,990 A | 10/1985 | Harriger |
| 4,548,096 A | 10/1985 | Giocastro et al. |
| 4,582,342 A | 4/1986 | Lew et al. |
| 4,679,995 A | 7/1987 | Bristow |
| 4,688,815 A | 8/1987 | Smith |
| 4,712,633 A | 12/1987 | Suzuki et al. |
| 4,715,180 A | 12/1987 | Rosman |
| 4,738,603 A | 4/1988 | Hattori |
| 4,807,896 A | 2/1989 | Philippi |
| 4,843,950 A | 7/1989 | Heyl |
| 4,861,054 A | 8/1989 | Spital |
| 4,886,298 A | 12/1989 | Shols |
| 4,915,403 A | 4/1990 | Wild et al. |
| 4,925,372 A | 5/1990 | Hansen |
| 4,934,251 A | 6/1990 | Barker |
| 4,934,253 A | 6/1990 | Berthold et al. |
| 4,955,626 A | 9/1990 | Smith et al. |
| 5,007,544 A | 4/1991 | Saotome et al. |
| 5,016,726 A | 5/1991 | Metcalf |
| 5,051,065 A | 9/1991 | Hansen |
| 5,147,183 A | 9/1992 | Gettel |
| 5,154,436 A | 10/1992 | Jez et al. |
| 5,169,166 A | 12/1992 | Brooks |
| 5,184,536 A | 2/1993 | Arai |
| 5,199,718 A | 4/1993 | Niemiec |
| 5,218,935 A | 6/1993 | Quinn, Jr. et al. |
| 5,224,719 A | 7/1993 | Goodspeed |
| 5,239,833 A | 8/1993 | Fineblum |
| 5,263,725 A * | 11/1993 | Gesmer et al. ............ 280/11.28 |
| 5,266,018 A | 11/1993 | Niemiec |
| 5,280,935 A * | 1/1994 | Sobocan ..................... 280/221 |
| 5,285,742 A | 2/1994 | Anderson |
| 5,292,234 A | 3/1994 | Ling |
| 5,310,202 A | 5/1994 | Goodspeed |
| 5,310,326 A | 5/1994 | Gui et al. |
| 5,320,367 A | 6/1994 | Landis |
| 5,330,214 A | 7/1994 | Brooks et al. |
| 5,340,131 A | 8/1994 | Smathers et al. |
| 5,423,560 A | 6/1995 | Warrick et al. |
| 5,428,958 A | 7/1995 | Stenlund |
| 5,553,874 A | 9/1996 | Schouten et al. |
| 5,595,067 A | 1/1997 | Maness |
| RE35,493 E | 4/1997 | Horton |
| 5,642,991 A | 7/1997 | Singleterry et al. |
| 5,687,567 A | 11/1997 | Hansson et al. |
| 5,689,956 A | 11/1997 | Reboredo |
| 5,772,225 A | 6/1998 | Brackett |
| 5,778,671 A | 7/1998 | Bloomquist et al. |
| 5,794,955 A | 8/1998 | Flynn |
| 5,806,896 A | 9/1998 | Sato et al. |
| 5,811,037 A | 9/1998 | Ludwig |
| 5,826,674 A | 10/1998 | Taylor |
| 5,839,737 A | 11/1998 | Kruczek |
| 5,915,322 A | 6/1999 | Adams |
| 5,938,224 A | 8/1999 | Brackett |
| 5,947,495 A | 9/1999 | Null et al. |
| 5,950,754 A | 9/1999 | Ondrish, Jr. |
| 5,992,148 A | 11/1999 | Satake |
| 5,997,018 A | 12/1999 | Lee |
| 6,000,513 A | 12/1999 | Richards |
| 6,015,279 A | 1/2000 | Yamane |
| 6,022,201 A | 2/2000 | Kasmer et al. |
| 6,032,968 A | 3/2000 | Chattin |
| 6,035,976 A | 3/2000 | Duhamel |
| 6,050,357 A | 4/2000 | Staelin et al. |
| 6,050,796 A | 4/2000 | Waong et al. |
| 6,079,727 A | 6/2000 | Fan |
| 6,123,396 A | 9/2000 | Siegel |
| 6,131,933 A | 10/2000 | Fan |
| 6,149,409 A | 11/2000 | Palakodati et al. |
| 6,152,711 A | 11/2000 | Van Wijk et al. |
| 6,158,752 A | 12/2000 | Kay |
| 6,173,981 B1 | 1/2001 | Coleman |
| 6,182,779 B1 | 2/2001 | Hosoda |
| 6,217,398 B1 | 4/2001 | Davis |
| 6,241,264 B1 | 6/2001 | Page |
| 6,315,313 B1 | 11/2001 | Huang |
| 6,371,501 B2 | 4/2002 | Jenkins |
| 6,419,248 B1 | 7/2002 | Kay |
| 6,422,845 B1 | 7/2002 | Wong et al. |
| 6,425,313 B1 | 7/2002 | Kleinedler et al. |
| 6,425,450 B1 | 7/2002 | Lansberry |
| 6,443,471 B1 | 9/2002 | Mullen |
| 6,450,448 B1 | 9/2002 | Suzuki |
| 6,467,560 B1 | 10/2002 | Anderson |

| | | |
|---|---|---|
| 6,488,296 B2 | 12/2002 | Ireton |
| 6,499,964 B2 | 12/2002 | Staton et al. |
| 6,536,788 B1 | 3/2003 | Kuncz et al. |
| 6,537,047 B2 | 3/2003 | Walker |
| 6,543,769 B1 | 4/2003 | Podoloff et al. |
| 6,571,757 B1 | 6/2003 | Simpson |
| 6,592,486 B1 | 7/2003 | Arbanas et al. |
| 6,612,117 B2 | 9/2003 | Kasmer |
| 6,626,442 B2 | 9/2003 | Pahis |
| 6,629,829 B1 | 10/2003 | Shinoda et al. |
| 6,647,719 B2 | 11/2003 | Truninger |
| 6,655,936 B2 | 12/2003 | Szeszulski et al. |
| 6,659,480 B1 | 12/2003 | Newman |
| 6,663,362 B1 | 12/2003 | Lentz et al. |
| 6,669,215 B2 | 12/2003 | Laporte |
| 6,685,201 B1 | 2/2004 | Smith, III |
| 6,688,624 B2 | 2/2004 | Christensen et al. |
| 6,688,862 B2 | 2/2004 | Jeronymo et al. |
| 6,698,196 B2 | 3/2004 | Hashimoto et al. |
| 6,848,527 B2 | 2/2005 | Nelson |
| 6,913,272 B2 | 7/2005 | Chang |
| 2004/0262872 A1* | 12/2004 | Kang .................... 280/87.042 |
| 2005/0012290 A1 | 1/2005 | McClain |
| 2005/0127629 A1 | 6/2005 | Nelson et al. |
| 2006/0119062 A1* | 6/2006 | Lukoszek .............. 280/87.042 |
| 2006/0163830 A1* | 7/2006 | Kwak .................... 280/87.042 |
| 2007/0001414 A1* | 1/2007 | Kang .................... 280/87.041 |
| 2007/0262546 A1* | 11/2007 | Bertiller ................ 280/87.042 |

FOREIGN PATENT DOCUMENTS

| | | |
|---|---|---|
| DE | 3942210 | 6/1991 |
| EP | 558776 | 9/1993 |
| FR | 2702012 | 9/1994 |

* cited by examiner

|  |  | 1 | 2 | 3 | 4 |
|---|---|---|---|---|---|
|  |  | Fixed Displacement | Variable Displacement | Fixed Displacement With Bypass Valve 285 | Variable Displacement With Bypass Valve 285 |
| A | Generalized Motors | Fig. 34A | Fig. 34B | Fig. 34C | Fig. 34D |
| B | One Direction of Torque and One Axle | Fig. 34E | Fig. 34F | Fig. 34G | Fig. 34H |
| C | Two Directions of Torque and One Axle | Fig. 34I | Fig. 34J | Fig. 34K | Fig. 34L |
| D | One Direction of Torque and Two Axles | Fig. 34M | Fig. 34N | Fig. 34O | Fig. 34P |
| E | Two Directions of Torque and Two Axles | Fig. 34Q | Fig. 34R | Fig. 34S | Fig. 34T |
| Pneumatic motors (▽) can replace the hydralic motors (▼) in any of the embodiments shown in FIG. 33 and FIG. 34A-T ||||||

FIG. 33

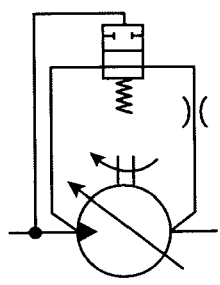
FIG. 34D
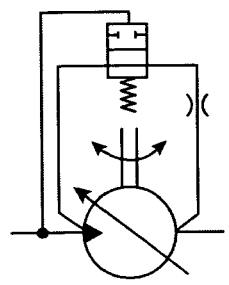
FIG. 34H
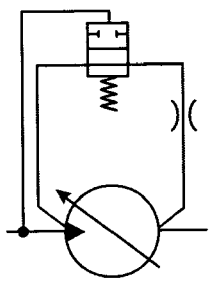
FIG. 34L
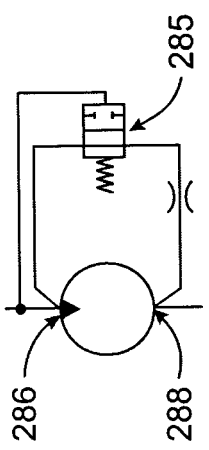
FIG. 34C
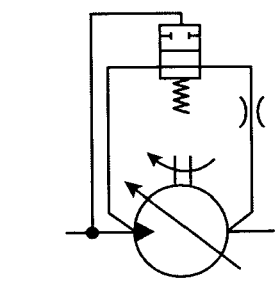
FIG. 34G
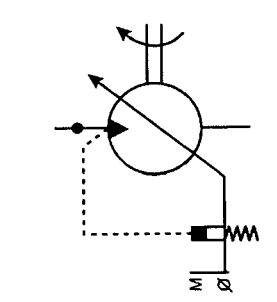
FIG. 34K
FIG. 34B
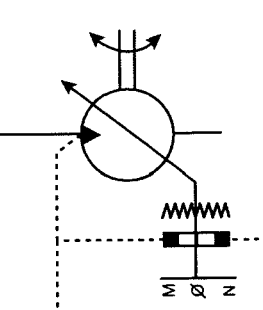
FIG. 34F
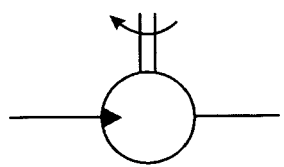
FIG. 34J
FIG. 34A
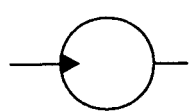
FIG. 34E
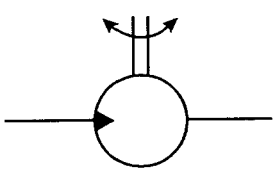
FIG. 34I

TRUCK ASSEMBLY FOR A SKATEBOARD, WHEELED PLATFORM, OR VEHICLE

CROSS-REFERENCE TO RELATED APPLICATIONS

This application is a Continuation-in-Part of International Patent Application No. PCT/US2005/022009, filed Jun, 21, 2005, which claims priority to U.S. patent application Ser. No. 11/051,088 filed Feb. 4, 2005; U.S. patent application Ser. No. 11/030,480, filed Jan. 5, 2005; and Ser. No. 10/874,134, filed Jun. 21, 2004, all of which are incorporated herein by this reference in their entirety.

FIELD OF THE INVENTION

This invention generally relates to a truck assembly for a skateboard, a wheeled platform or a vehicle and more particularly to the assembly for a mechanized truck that converts differential movement of the platform(s) relative to the truck into rotational energy used to help propel the wheeled platform, vehicle, or skateboard or into sensory information used to control the braking, steering and locomotion of the wheeled platform, vehicle, or skateboard.

BACKGROUND OF INVENTION

Skateboarding is a popular sport and for some is even a means of transportation. One typical problem a skateboarder encounters is the need to propel the skateboard forward for example, when the slope of the terrain is too shallow and does not allow gravity to pull the skateboard and rider down the slope. Typically, the skateboarder will place one foot on the skateboard and utilize the other foot to push or propel the skateboard forward. This pushing motion, however, can become tiresome and may detract from the more pleasurable experience of riding the board with both feet on it.

The truck is an important element in the design of skateboards, wheeled platforms, roller skates, inline skates and vehicles. The truck not only supports the wheels of the skateboard, platform, inline skates, roller skates or vehicle, it may also provide the user with a significant degree of directional control.

In a typical skateboard truck, directional control is accomplished by providing the truck with four primary components: a truck hanger, a base plate, a kingpin, and bushings. Typically skateboard trucks (FIGS. 1 and 2) have two (2) axle extensions, which protrude laterally from the sides of the truck hanger upon which the skateboard wheels and bearings are mounted. Skateboard trucks are a wide variety of construction and designs beyond the typical truck described herein. Each of these trucks designs tends to exhibit most, if not all, of the characteristics described below. Skateboard trucks are typically mounted to the skateboard deck in a front (or leading) and rear (or trailing) position along the longitudinal or lengthwise axis of the skateboard deck such that, at rest, the truck axle extensions at the leading position are roughly parallel to the truck axle extensions at the trailing position and all truck axle extensions are roughly perpendicular to the longitudinal axis of the skateboard deck when the skateboard is at rest. If this approximately parallel alignment of the trucks and their respective axles are maintained while the skateboard rolls along the ground, the skateboard's path will be relatively straight.

A skateboard truck typically exhibits some dynamic response when the user of the skateboard or wheeled platform leans to one side or the other. Such dynamic response tends to cause the truck hanger and axles to exhibit a component of rotation, in part, around a vertical axis, or an axis oriented perpendicular to the ground surface upon which the skateboard is positioned. The leading hanger and trailing hanger typically (but not necessarily) rotate in opposite directions. Thus, the user can turn, or otherwise control the forward direction of the wheeled platform, by shifting his or her body from one side of the platform to the other. Bushings are located between the truck base plate and truck hanger in the most common truck design. A kingpin connects the hanger, base plate and bushings together. The threaded kingpin can be tightened and loosened to modify rigidity of the bushings, and the dynamic response characteristics of the truck. Loose or slack bushings generally allow greater movement of the hanger about the kingpin and vertical axis of the truck, and thus are less responsive to slight weight shifts than are tight or rigid bushings.

Most, if not all skateboard truck designs exhibit some undesirable ride characteristics. One such undesired ride characteristic is instability or "speed wobble", which occurs when the axle and hanger develop a resonant frequency of vibration and uncontrolled wobbling within their typical range of motion. This can cause instability in the user's control of the skateboard, wheeled platform or vehicle. Speed wobbles occur on most skateboard truck designs. Different designs experience these wobbles at different speeds and under different conditions.

In addition, skateboards often do not provide a sensation for the rider that is similar to the gains and losses in speed encountered when turning, curving, and straightening ones path when snowboarding downhill or surfing ocean waves due to the requirement to periodically remove one foot from the board to propel the skateboard. Many geographic areas do not have the terrain required to allow gravity to do some or all the work of propelling the skateboard.

Furthermore, many skateboards suffer from distracting wobbles and vibration at higher rates of speed. Thus, the use of the hydraulic system will tend to dampen the vibrations and provide for a much more stable and controlled feeling for the occupant.

Although, there have been innovations in the self-powered skateboard, none of the innovations have utilized a hydraulic system and method of converting linear motion into rotational motion to propel the skateboard forward.

Accordingly, what is needed is a system and method utilizing a hydraulic system to convert linear motion into rotational motion to propel a skateboard forward and provide a sensation similar to snowboarding or surfing without having to put one foot on the ground to propel the skateboard and without the need for gravity or inclined surfaces.

Furthermore, most common skateboard truck designs do not transfer energy generated by the rider into the rotation of the skateboard wheels, resulting directly in the locomotion of a skateboard, wheeled platform or vehicle. Accordingly, what is needed is an improved truck assembly that can dynamically steer a wheeled platform, substantially reduce the impact of speed wobbles under typical riding conditions, and generate rotational energy to be used to propel the skateboard, wheeled platform, roller skates, inline skates, or vehicle.

Additionally, for maximum transfer of energy from the rider to the rotation of the at least one rotor, axle or wheel, the rider's gravitational, centrifugal and muscular energy should be structurally supported predominantly or entirely by components actively involved in the transfer of energy from the platform to the wheels. Accordingly, what is additionally needed is an entirely new truck design that strives to minimize support structures that are not used directly in the transfer of energy from the rider into the wheels.

Additionally, for maximum velocity potential of a mechanically propelled wheeled platform, what is needed is temporary storage and subsequent delayed release of potential energy. This potential energy is created by the rider's gravitational, centrifugal and muscular energy during a turn and is released into the rotation of the at least one rotor, axle or wheel at a later time. This stored potential energy should be created and stored temporarily when the gravitational, centrifugal, and frictional loading are greatest, which occurs while the turning radius is decreasing. Increased velocity potential is achieved if this stored potential energy is released between turns when the gravitational, centrifugal, and frictional loading is decreased Additionally, what is needed for maximum dynamic range of steering at all velocities, is the storing and delayed transfer of potential energy from the rider into the rotation of the at least one rotor, axle or wheel. In this wheeled platform, the steering response and the transfer of power from the rider to the mechanical wheeled platform are accomplished by the same action, rotation of the platform of the deck. If the transfer of energy for the propulsion of the wheeled platform is instantaneous (direct-drive), the potential exists for the inhibited response of the steering dynamics. This could be problematic at slower speeds when a huge amount of torque is needed to get the vehicle up to speed. On the other hand, if the energy generated for the propulsion of the wheeled platform is stored temporarily (in a spring, for example) and not delivered instantaneously to the mechanisms which propel the wheeled platform, the steering response does not need to be inhibited by the generation of power.

SUMMARY OF THE INVENTION

In one aspect of the invention, an occupant propelled device including at least one hydraulic cylinder having at least two chambers in fluid communication; at least one platform attachable to the at least one hydraulic cylinder at a first connection point and a second connection point, wherein movement of the platform displaces a hydraulic fluid from one of the at least two chambers; a housing attachable to the platform at a pivot point and having at least one axle adapted to receive a wheel, wherein the pivot point is positioned between the first connection point and the second connection point of the at least one hydraulic cylinder; and at least one wheel.

In a further aspect of the invention, an occupant propelled device including at least two hydraulic cylinders, each cylinder having at least one chamber in fluid communication; at least one platform attachable to the at least two hydraulic cylinders at a first connection point and a second connection point, wherein movement of the platform displaces a hydraulic fluid from one of the at least two hydraulic cylinders; a housing attachable to the platform at a pivot point and having at least one axle adapted to receive a wheel, wherein the pivot point is positioned between the first connection point and the second connection point of the at least two hydraulic cylinders; and at least one wheel.

In another aspect of the invention, a hydraulic skateboard including a skateboard deck; at least two hydraulic cylinders, each of the at least two hydraulic cylinders in fluid communication, wherein the skateboard deck is attachable to the at least two hydraulic cylinders such that movement of the skateboard deck displaces a hydraulic fluid from one of the at least two hydraulic cylinders; a pair of skateboard trucks, wherein at least one of the pair of skateboard trucks further comprises at least one hydraulic motor adapted to receive the hydraulic fluid from the at least two hydraulic cylinders, wherein each skateboard truck is attachable to the skateboard deck and configured to be attachable to the skateboard deck at a pivot point, wherein the pivot point is positioned between a first connection point and a second connection point of the at least two hydraulic cylinders and wherein the skateboard deck comprises at least one axle protruding from the truck and configured to receive a wheel; at least one hydraulic motor configured to rotate by displaced hydraulic fluid from one of the at least two hydraulic cylinders creating torque to drive the at least one axle; and at least one wheel attached to the at least one axle of each skateboard truck.

In a further aspect of the invention, a hydraulic skateboard including at least one hydraulic cylinder, having at least two chambers in fluid communication; a skateboard deck attachable to the at least one hydraulic cylinder at a first connection point and a second connection point, wherein movement of the platform displaces a hydraulic fluid; a pair of skateboard trucks, each skateboard truck being adapted to be attachable to the skateboard deck at a pivot point and comprising at least one axle protruding from the truck and configured to receive at least one wheel, and wherein at least one of the pair of skateboard trucks further comprises at least one hydraulic motor adapted to receive the hydraulic fluid from the at least two hydraulic cylinders creating torque to rotate the at least one axle.

In another aspect of the invention, a hydraulic system including at least one hydraulic cylinder having at least two chambers; and a housing attachable to a platform at a pivot point and having at least one axle adapted to receive at least one wheel, wherein the pivot point is positioned between a first connection point and a second connection point of the at least one hydraulic cylinder to the platform; and wherein movement of the platform displaces a hydraulic fluid from one chamber to the other chamber.

In a further aspect of the invention, a hydraulic propulsion system including a hydraulic cylinder having two chambers in fluid communication with one another; a housing connected to a platform at a pivot point; at least one axle extending from the housing; and wherein the hydraulic cylinder is connected to the housing and upon movement of the hydraulic cylinder about the pivot point a hydraulic fluid is displaced from one of the at least two chambers.

In another aspect of the invention, a hydraulic system for a skateboard including at least two hydraulic cylinders each having a chamber in fluid communication with one another; and a housing attachable to a platform at a pivot point and having at least one axle adapted to receive at least one wheel; and wherein upon movement of the platform at least one of the two cylinders displaces a hydraulic fluid to the other chamber.

In a further aspect of the invention, a hydraulic system including at least two hydraulic cylinders, each of the at least two hydraulic cylinders in fluid communication; and a housing comprising at least one hydraulic motor configured to receive a hydraulic fluid from the at least two hydraulic cylinders, wherein the hydraulic motor is configured to rotate creating torque to drive an axle; a directional control valve configured to direct the flow of the hydraulic fluid to engage or bypass the hydraulic motor; and an axle surrounding the housing.

In another aspect of the invention, a truck component for a wheeled platform comprising a platform element adapted to be attachable to a platform and designed to movably adapt to a housing configured to support wheels.

In a further aspect of the invention, a truck assembly for a wheeled platform comprising: a platform element adapted to be attachable to a platform; a housing configured to movably receive the platform element; and one or more axles extending from the housing and configured to receive one or more wheels.

In another aspect of the invention, a truck assembly for a wheeled platform comprising: a platform element configured to be attachable to a platform; a housing configured to movably receive the platform element and mechanisms designed to convert motion of the platform element relative to the housing into energy to propel the wheeled platform; and one or more axles extending from the axle housing and configured to receive one or more wheels.

In a further aspect of the invention, a truck assembly for a wheeled platform comprising: a platform element configured to be attachable to a platform; a housing configured to movably receive the platform element and at least one mechanism (of a ratchet or toggling design or otherwise) designed to convert motion of the platform element relative to the housing into stored energy to propel the wheeled platform when the platform is rotated in one direction and to release this stored energy when the platform rotates in the other direction or when triggered for release by some other means; one or more energy storage elements designed to store energy generated by the differential motion of the platform element relative to the housing, wherein the energy storage elements include at least one of the following: a spring, a compressed or pressurized gas, an elastic material, a battery, or a hybrid combination of one or more of the energy storage elements; and one or more axles extending from the axle housing and configured to receive one or more wheels.

In a further aspect of the invention, a truck assembly for a wheeled platform comprising: a platform element configured to be attachable to a platform; a housing configured to movably receive the platform element and sensors designed to sense motion of the platform element relative to the housing (signals from sensors can be used to control energy release from other energy sources, braking, steering and many other electronic or mechanical phenomena); and one or more axles extending from the axle housing and configured to receive one or more wheels.

In another aspect of the invention, a wheeled platform comprising one or more platforms; one or more truck assemblies attached to one or more platforms, some or all comprising: a platform element adapted to be attachable to platform; a housing configured to movably receive the platform element; one or more axles extending from one or more housings and configured to receive one or more wheels; one or more housing mechanisms designed to convert motion of one or more platform elements relative to the one or more housings into energy to propel the wheeled platform and one or more wheels attached to the one or more axles extending from the one or more housings.

In another aspect of the invention, a wheeled platform comprising one or more platforms; one or more truck assemblies attached to one or more platforms, some or all comprising: a platform element adapted to be attachable to platform; a housing configured to movably receive the platform element; one or more axles extending from one or more housings and configured to receive one or more wheels; one or more housing mechanisms (of a ratchet or toggling design or otherwise) designed to convert motion of the platform element relative to the housing into stored energy to propel the wheeled platform when the platform is rotated in one direction and to release this stored energy when the platform rotates in the other direction or when triggered for release by some other means; one or more energy storage elements designed to store energy generated by the differential motion of the platform element relative to the housing, wherein the energy storage elements includes one of the following: a spring, a compressed or pressurized gas, an elastic material, a battery, or a hybrid combinations of one or more of the energy storage elements; and one or more wheels attached to the one or more axles extending from the one or more housings.

In a further aspect of the invention, a wheeled platform comprising: one or more platforms; one or more truck assemblies attached to one or more platforms. One or more of the truck housings comprising: a platform element adapted to be attachable to platform; a housing configured to movably receive the platform element; one or more axles extending from the housing and configured to receive one or more wheels; one or more energy storage elements designed to store energy generated by the differential motion of the platform element relative to the housing, wherein the energy storage elements includes at least one of the following: a spring, a compressed or pressurized gas, an elastic material, a battery, or a hybrid combination of one or more of the energy storage elements; and one or more sensors designed to sense motion (rate, pattern, and magnitude) of the platform element relative to the housing and motion of the platform element relative to the platform (signals from sensors can be used to control the timing, duration, intensity and/or quantity of energy released from other energy sources, braking, steering and many other electronic or mechanical phenomena); one or more wheels attached to the one or more axles extending from the one or more housings; and one or more energy sources (human, electric, internal combustion engine, accumulated pressure-hydraulic or pneumatic, fluid, wind, hybrid combinations).

In another aspect of the invention, a wheeled platform comprising: one or more platforms; one or more truck assemblies attached to one or more platforms each comprising: a platform element adapted to be attachable to a platform; a housing configured to movably receive the platform element; one or more axles extending from the housing and configured to receive one or more wheels; and sensors designed to sense motion of the platform element relative to the housing (signals from sensors can be used to control the timing, duration, intensity and/or quantity of energy released from other energy sources, braking, steering and many other electronic or mechanical phenomena); and housing mechanisms designed to convert motion of the platform element relative to the housing into energy to propel the wheeled platform; and one or more wheels attached to the axles extending from the housing.

In a further aspect of the invention, a method of propelling a wheeled platform comprising: creating a source of energy upon a first change in orientation of the platform around an axis approximately parallel to a longitudinal axis of the platform and wherein the platform rotates around the axis; storing the source of energy; and releasing the source of energy to propel the wheeled platform upon a second change in orientation of the platform around the axis.

In another aspect of the invention, the releasing of the source of energy from one or more energy storage elements, wherein the one or more energy storage elements can comprise: (a) a ratchet system which engages the storing of energy when the platform is rotated in one direction and which disengages the storage of energy from the movement of the platform when the platform rotates in the opposite direction, and which releases the energy to one or more mechanisms to propel the wheeled platform; (b) a mechanical or electronic toggle system, which engages the storing of energy when the platform is rotated in one direction and which disengages the storage of energy from the movement of the platform when the platform rotates in the opposite direction, and which releases the energy to one or more mechanisms to propel the wheeled platform; (c) an electronic sensor and switching system which releases the energy to one or more mechanisms to propel the wheeled platform when the platform rotates around its rotational axis in a programmed response to some movement of the platform relative to a truck assembly; and/or (d) a pneumatic or hydraulic control valve system which engages the storing of energy when the platform is rotated in one direction and which disengages the storage of energy from the movement of the platform when the platform rotates in an opposite direction, and which releases the energy to one or more mechanisms to propel the wheeled platform.

In a further aspect of the invention, a method of propelling a wheeled platform comprising: creating a source of energy upon a first change in orientation of the platform around an axis approximately parallel to a direction of rolling motion of the platform and wherein the platform rotates around the axis; storing the source of energy; and releasing the source of energy to propel the wheeled platform upon a second change in orientation of the platform around the axis.

In another aspect of the invention, a method of propelling a wheeled platform comprising: creating a source of energy upon a first change in orientation of the platform relative to an axle housing of the wheeled platform; storing the source of energy; and releasing the source of energy to propel the wheeled platform upon a second change in orientation of the platform relative to the axle housing, wherein the change in orientation of the platform relative to the axle housing results in a change in direction of the wheeled platform.

In a further aspect of the invention, a truck component for a wheeled platform comprising a platform element adapted to be attachable to a platform and designed to provide torque upon a change in the orientation of the platform relative to an axle or other truck component when the platform is rotated around an axis approximately parallel to the longitudinal axis of the platform.

In another aspect of the invention, a truck component for a wheeled platform comprising a platform element adapted to be attachable to a platform and designed to provide torque upon a change in the orientation of the platform relative to an axle or other truck component when the platform is rotated around an axis approximately parallel to the longitudinal axis of the platform wherein the element around which torque is created is located above the platform or located above the location upon the platform where the rider will place their feet.

In a further aspect of the invention, a truck component for a wheeled platform comprising a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform.

In another aspect of the invention, a truck assembly for a wheeled platform comprising: a platform element adapted to be attachable to a platform and designed to provide torque upon a change in the orientation of the platform relative to an axle or other truck component when the platform is rotated around an axis approximately parallel to the longitudinal axis of the platform; a housing configured to receive the platform element; and one or more axles extending from the housing and configured to receive one or more wheels.

In a further aspect of the invention, a truck assembly for a wheeled platform comprising: a platform element adapted to be attachable to a platform and designed to provide torque upon a change in the orientation of the platform relative to an axle or other truck component when the platform is rotated around an axis approximately parallel to the longitudinal axis of the platform wherein the element around which torque is created is located above the platform or located above the location upon the platform where the rider will place their feet; a housing configured to receive the platform element; and one or more axles extending from the housing and configured to receive one or more wheels.

In another aspect of the invention, a truck assembly for a wheeled platform comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform; mechanisms designed to convert motion of the platform element relative to the housing into energy to propel the wheeled platform; a housing configured to receive the platform element; and one or more axles extending from the housing and configured to receive one or more wheels.

In a further aspect of the invention, a truck assembly for a wheeled platform comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform wherein the element around which torque is created is located above the platform or located above the location upon the platform where the rider will place their feet; mechanisms designed to convert motion of the platform element relative to the housing into energy to propel the wheeled platform; a housing configured to receive the platform element; and one or more axles extending from the housing and configured to receive one or more wheels.

In another aspect of the invention, a truck assembly for a wheeled platform comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform; mechanisms designed to convert motion of the platform element relative to the housing into energy to propel the wheeled platform; at least one mechanism (of a ratchet or toggling design or otherwise) designed to convert motion of the platform element relative to the housing into stored energy to propel the wheeled platform when the platform is rotated in one direction and to release this stored energy when the platform rotates in the other direction or when triggered for release by some other means; one or more energy storage elements designed to store energy generated by the differential motion of the platform element relative to the housing, wherein the energy storage elements include at least one of the following: a spring, a compressed or pressurized gas, an elastic material, a battery, or a hybrid combination of one or more of the energy storage elements; a housing configured to receive the platform element; and one or more axles extending from the housing and configured to receive one or more wheels.

In a further aspect of the invention, a truck assembly for a wheeled platform comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform wherein the element around which torque is created is located above the platform or located above the location upon the platform where the rider will place their feet; mechanisms designed to convert motion of the platform element relative to the housing into energy to propel the wheeled platform; at least one mechanism (of a ratchet or toggling design or otherwise) designed to convert motion of the platform element relative to the housing into stored energy to propel the wheeled platform when the platform is rotated in one direction and to release this stored energy when the platform rotates in the other direction or when triggered for release by some other means ; one or more energy storage elements designed to store energy generated by the differential motion of the platform element relative to the housing, wherein the energy storage elements include at least one of the following: a spring, a compressed or pressurized gas, an elastic material, a battery, or a hybrid combination of one or more of the energy storage elements; a housing configured to receive the platform element; and one or more axles extending from the housing and configured to receive one or more wheels.

In another aspect of the invention, a truck assembly for a wheeled platform comprising: a platform element adapted to be attachable to a platform and designed to rotate upon a change in the orientation of the platform relative to an axle or other truck component when the platform is rotated around an axis approximately parallel to the longitudinal axis of the platform; a housing configured to receive the platform element; sensors designed to sense motion of the platform element relative to the housing (signals from sensors can be used to control energy release from other energy sources, braking, steering and many other electronic or mechanical phenomena); and one or more axles extending from the housing and configured to receive one or more wheels.

In a further aspect of the invention, a truck assembly for a wheeled platform comprising: a platform element adapted to be attachable to a platform and designed to rotate upon a change in the orientation of the platform relative to an axle or other truck component when the platform is rotated around an axis approximately parallel to the longitudinal axis of the platform wherein the element around which the platform element rotates is located above the platform or located above the location upon the platform where the rider will place their feet; sensors designed to sense motion of the platform element relative to the housing (signals from sensors can be used to control energy release from other energy sources, braking, steering and many other electronic or mechanical phenomena); a housing configured to receive the platform element; and one or more axles extending from the housing and configured to receive one or more wheels.

In another aspect of the invention, a wheeled platform comprising one or more platforms; one or more truck assemblies attached to one or more platforms, some or all comprising: a platform element adapted to be attachable to a platform and designed to provide torque upon a change in the orientation of the platform relative to an axle or other truck component when the platform is rotated around an axis approximately parallel to the longitudinal axis of the platform; a housing configured to receive the platform element; and one or more axles extending from the housing and configured to receive one or more wheels.

In a further aspect of the invention, a wheeled platform comprising one or more platforms; one or more truck assemblies attached to one or more platforms, some or all comprising: a platform element adapted to be attachable to a platform and designed to provide torque upon a change in the orientation of the platform relative to an axle or other truck component when the platform is rotated around an axis approximately parallel to the longitudinal axis of the platform wherein the element around which torque is created is located above the platform or located above the location upon the platform where the rider will place their feet; a housing configured to receive the platform element; and one or more axles extending from the housing and configured to receive one or more wheels.

In another aspect of the invention, a wheeled platform comprising one or more platforms; one or more truck assemblies attached to one or more platforms, some or all comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform; mechanisms designed to convert motion of the platform element relative to the housing into energy to propel the wheeled platform; a housing configured to receive the platform element; and one or more axles extending from the housing and configured to receive one or more wheels.

In a further aspect of the invention, a wheeled platform comprising one or more platforms; one or more truck assemblies attached to one or more platforms, some or all comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform wherein the element around which torque is created is located above the platform or located above the location upon the platform where the rider will place their feet; mechanisms designed to convert motion of the platform element relative to the housing into energy to propel the wheeled platform; a housing configured to receive the platform element; and one or more axles extending from the housing and configured to receive one or more wheels.

In another aspect of the invention, a wheeled platform comprising one or more platforms; one or more truck assemblies attached to one or more platforms, some or all comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform; mechanisms designed to convert motion of the platform element relative to the housing into energy to propel the wheeled platform; at least one mechanism (of a ratchet or toggling design or otherwise) designed to convert motion of the platform element relative to the housing into stored energy to propel the wheeled platform when the platform is rotated in one direction and to release this stored energy when the platform rotates in the other direction or when triggered for release by some other means; one or more energy storage elements designed to store energy generated by the differential motion of the platform element relative to the housing, wherein the energy storage elements include at least one of the following: a spring, a compressed or pressurized gas, an elastic material, a battery, or a hybrid combination of one or more of the energy storage elements; a housing configured to receive the platform element; and one or more axles extending from the housing and configured to receive one or more wheels.

In a further aspect of the invention, a wheeled platform comprising one or more platforms; one or more truck assemblies attached to one or more platforms, some or all comprising: a platform element adapted to be attachable to a platform and designed to provide torque to create energy to propel the wheeled platform upon a change in the orientation of the platform relative to an axle or other truck component when the platform is rotated around an axis approximately parallel to the longitudinal axis of the platform wherein the element around which torque is created is located above the platform or located above the location upon the platform where the rider will place their feet; mechanisms designed to convert motion of the platform element relative to the housing into energy to propel the wheeled platform; at least one mechanism (of a ratchet or toggling design or otherwise) designed to convert motion of the platform element relative to the housing into stored energy to propel the wheeled platform when the platform is rotated in one direction and to release this stored energy when the platform rotates in the other direction or when triggered for release by some other means; one or more energy storage elements designed to store energy generated by the differential motion of the platform element relative to the housing, wherein the energy storage elements include at least one of the following: a spring, a compressed or pressurized gas, an elastic material, a battery, or a hybrid combination of one or more of the energy storage elements; a housing configured to receive the platform element; and one or more axles extending from the housing and configured to receive one or more wheels.

In another aspect of the invention, a wheeled platform comprising one or more platforms; one or more truck assemblies attached to one or more platforms, some or all comprising: a platform element adapted to be attachable to a platform and designed to rotate upon a change in the orientation of the platform relative to an axle or other truck component when the platform is rotated around an axis approximately parallel to the longitudinal axis of the platform; a housing configured to receive the platform element; sensors designed to sense motion of the platform element relative to the housing (signals from sensors can be used to control energy release from other energy sources, braking, steering and many other electronic or mechanical phenomena); and one or more axles extending from the housing and configured to receive one or more wheels.

In a further aspect of the invention, a wheeled platform comprising one or more platforms; one or more truck assemblies attached to one or more platforms, some or all comprising: a platform element adapted to be attachable to a platform and designed to rotate upon a change in the orientation of the platform relative to an axle or other truck component when the platform is rotated around an axis approximately parallel to the longitudinal axis of the platform wherein the element around which the platform element rotates is located above the platform or located above the location upon the platform where the rider will place their feet; sensors designed to sense motion of the platform element relative to the housing (signals from sensors can be used to control energy release from other energy sources, braking, steering and many other electronic or mechanical phenomena); a housing configured to receive the platform element; and one or more axles extending from the housing and configured to receive one or more wheels.

In another aspect of the invention, an assembly for a wheeled platform comprising: a platform element adapted to be attachable to a platform; a housing adapted to receive the platform element; and wherein a change in a contact point of the platform element relative to the housing results in a turning response of a wheeled platform.

In a further aspect of the invention, an assembly for a wheeled platform comprising: a platform element adapted to be attachable to a platform; a housing adapted to receive the platform element; and wherein a change in a contact point of the platform element relative to the housing results in a propulsion of the wheeled platform.

In another aspect of the invention, an assembly for a wheeled platform comprising: a platform element adapted to be attachable to a platform; a housing adapted to receive the platform element; and wherein a change in a contact point of the platform element relative to the housing results in a delayed propulsion of the wheeled platform.

In a further aspect of the invention, a truck assembly for a skateboard comprising: a platform element adapted to be attachable to a skateboard deck; a housing adapted to receive the platform element; an axle extending from the housing and configured to receive a wheel; and wherein a change in a change of a contact point of the platform element relative to the housing results in a turning response of a wheeled platform.

In another aspect of the invention, a skateboard comprising: a skateboard deck; a pair of truck assemblies comprising: a platform element adapted to be attachable to the skateboard deck; a housing adapted to receive the platform element, wherein a change in a contact point of the platform element relative to the housing results in a turning response of a wheeled platform; and an axle extending from the housing and configured to receive a wheel; and a plurality of wheels attached to the axles extending from the housing.

In a further aspect of the invention, a truck assembly for a wheeled platform comprising: a base plate adapted to be attachable to a platform; a pivot member comprising a housing having at least one axle extending from the housing and configured to receive a wheel; an axial pivot pin, wherein the pivot member rotates around the axial pivot pin in response to movement of the platform; and a platform element adapted to be attachable to the platform, wherein the platform element is adapted to engage a mechanism configured to convert motion of the platform element relative to the pivot pin into energy to propel a wheeled platform.

In another aspect of the invention, an assembly for a wheeled platform comprising: a platform element adapted to be attachable to a platform; a housing adapted to receive the platform element; and wherein a change in a contact point of the platform element relative to the housing generates a source of energy to power an apparatus attachable to the wheeled platform.

In a further aspect of the invention, a rotary device for hydraulic fluids is designed to generate controlled rotational energy and comprises at least one hydraulic cylinder, the at least one hydraulic cylinder comprising at least two chambers, wherein each of the at least two chambers are in fluid communication with the other; an accumulator system designed for the temporary storage of potential energy and subsequent later release of such stored potential energy, wherein the accumulator system is comprised of at least two accumulators configured to receive the hydraulic fluid from the at least one hydraulic cylinder, a valve system adapted to receive the hydraulic fluid from the at least two accumulators which can control the delayed release of stored potential energy, and two pressure relief valves; at least one directional control valve, which is configured to receive hydraulic fluid from the valve system within the accumulator system; at least one hydraulic motor adapted to receive the hydraulic fluid from the at least one directional control valve, wherein the internal components of the hydraulic motor are configured to rotate by the displaced hydraulic fluid creating torque; and a reservoir adapted to receive the hydraulic fluid from the at least one hydraulic motor, the directional control valve or the pressure relief valve and return the hydraulic fluid to the at least one hydraulic cylinder.

In another aspect of the invention, a hydraulic skateboard comprising: a skateboard deck; a pair of skateboard trucks, each skateboard truck being adapted to be attachable to the skateboard deck and comprising at least one axle protruding from the truck and wherein each of the at least one axles is configured to receive at least one wheel. The skateboard truck further comprises: at least one hydraulic cylinder, the at least one hydraulic cylinder comprising at least two chambers, wherein each of the at least two chambers are in fluid communication with the other; an accumulator system, wherein the accumulator system is comprised of at least two accumulators designed for the temporary storage of potential energy and subsequent later release of such stored potential energy, configured to receive the hydraulic fluid from the at least one hydraulic cylinder, a valve system adapted to receive the hydraulic fluid from the at least two accumulators which can control the delayed release of stored potential energy, and two pressure relief valves designed to reduce excessive pressure buildup in the accumulators; at least one directional control valve, which is configured to receive hydraulic fluid from the valve system within the accumulator system; at least one hydraulic motor adapted to receive the hydraulic fluid from the at least one directional control valve, wherein the internal components of the hydraulic motor are configured to rotate by the displaced hydraulic fluid creating torque to drive the at least one axle protruding from the truck; and a reservoir adapted to receive the hydraulic fluid from the at least one hydraulic motor or a directional control valve or pressure relief valve and return the hydraulic fluid to the at least one hydraulic cylinder; and wherein the skateboard truck is attachable to the skateboard deck at least one end of the at least one hydraulic cylinder, such that movement of the skateboard deck from a first position to a second position causes the at least two hydraulic cylinder chamber to displace a hydraulic fluid from one hydraulic cylinder chamber to the other hydraulic cylinder; and configured to be attachable to the skateboard deck at a pivot point, wherein the pivot point is approximately symmetrically positioned between a first connection point and a second connection point of the at least one hydraulic cylinder and the skateboard deck; and at least one wheels attached to the at least one axle of each skateboard truck.

In a further aspect of the invention, a device for generating rotational energy for hydraulic fluids comprising: at least one hydraulic cylinder, the at least one hydraulic cylinder comprising at least two chambers, wherein each of the at least two chambers are in fluid communication with the other; and an accumulator system comprising: at least two accumulators designed for the temporary storage of potential energy and subsequent later release of such stored potential energy and configured to receive the hydraulic fluid from the at least one hydraulic cylinder; a valve adapted to receive the hydraulic fluid from the at least two accumulators; at least one hydraulic motor adapted to receive the hydraulic fluid from the valve, wherein the hydraulic motor is configured to rotate by the displaced hydraulic fluid creating torque; and a reservoir adapted to receive the hydraulic fluid from the at least one hydraulic motor and return the hydraulic fluid to the at least one hydraulic cylinder.

In another aspect of the invention, a hydraulic skateboard comprising: a skateboard deck; a pair of skateboard trucks, each skateboard truck being adapted to be attachable to the skateboard deck and comprising at least one axle protruding from the truck, wherein each of the at least one axles is configured to receive at least one wheel; at least two hydraulic cylinders, each of the at least two hydraulic cylinders in fluid communication the other via a conduit, and wherein the skateboard deck is attachable to the at least two hydraulic cylinders, such that movement of the skateboard deck from a first position to a second position causes the hydraulic cylinders to displace a hydraulic fluid through the conduit to the other hydraulic cylinder; an accumulator system designed for the temporary storage of potential energy and subsequent later release of such stored potential energy and comprising: at least two accumulators configured to receive the hydraulic fluid from the at least two hydraulic cylinders; a valve adapted to receive the hydraulic fluid from the at least two accumulators; and a reservoir adapted to receive the hydraulic fluid from the at least one hydraulic motor and return the hydraulic fluid to the at least one hydraulic cylinder; at least one hydraulic motor adapted to receive the hydraulic fluid from the at least two hydraulic cylinders, wherein the hydraulic motor is configured to rotate by the displaced hydraulic fluid creating torque to drive the at least one axle and configured to be attachable to the skateboard deck at a pivot point, wherein the pivot point is approximately symmetrically positioned between a first connection point and a second connection point of the at least two hydraulic cylinders and the skateboard deck; and at least two wheels attached to the at least one axle of each skateboard truck.

In a further aspect of the invention, a method of powering a device comprises providing a hydraulic system comprising: at least one hydraulic cylinder, the at least one hydraulic cylinder comprising at least two chambers, wherein each of the at least two chambers are in fluid communication with the other; at least two accumulators designed for the temporary storage of potential energy and subsequent later release of such stored potential energy and configured to receive the hydraulic fluid from the at least one hydraulic cylinder; a valve system which can control the delayed release of stored potential energy, adapted to receive the hydraulic fluid from the at least two accumulators; at least one hydraulic motor adapted to receive the hydraulic fluid from the valve system, wherein the hydraulic motor is configured to rotate by the displaced hydraulic fluid creating torque; and a reservoir adapted to receive the hydraulic fluid from the at least one hydraulic motor or the accumulators and return the hydraulic fluid to the at least one hydraulic cylinder; compressing one chamber of the at least one hydraulic cylinder; expanding the other chamber of the at least one hydraulic cylinder, wherein the compressing and expanding of the two chambers displaces a hydraulic fluid to the at least two accumulators to release a pressurized hydraulic fluid to the valve system and at least one hydraulic motor to create torque.

The above aspects of this invention are more fully explained in reference to the drawings and general disclosure herein.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 33 shows a table of hydraulic motors and configurations that can be incorporated into the various embodiments with references to hydraulic circuits drawn in FIGS. 34A-34T FIGS. 34A-34T show a series of hydraulic circuitry diagrams showing a number of hydraulic motors.

DESCRIPTION OF THE INVENTION

Figure 1:
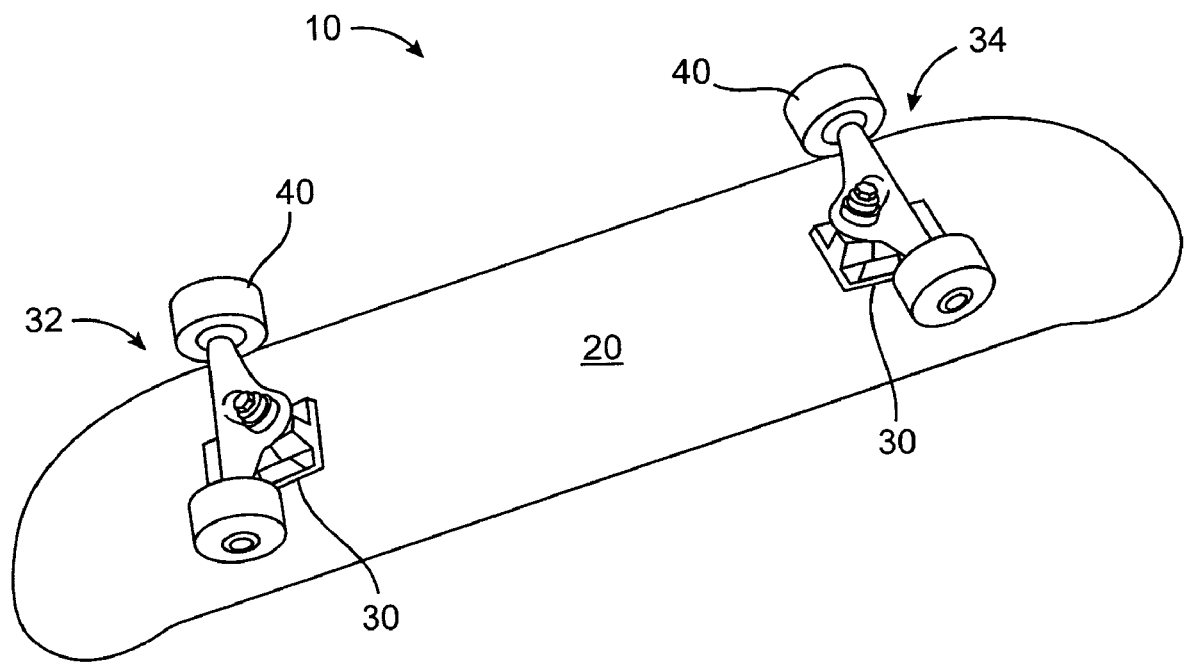
FIG. 1 shows a perspective view of a skateboard.

As shown in FIG. 1, a skateboard 10 typically comprises a deck 20, a pair of skateboard trucks 30, and a plurality of wheels 40, most commonly four (4) wheels. Existing skateboard products have anywhere from 2 to 14 or more wheels. Skateboard trucks 30 made by various manufacturers vary significantly in design, but the most common designs (FIG. 2) typically have two (2) axle extensions 66, which protrude laterally from the sides of the truck 30 upon which the skateboard wheels 40 and bearings are mounted. Skateboard truck assemblies 30 are typically mounted to the skateboard deck 20 in a front 32 (or leading) and rear 34 (or trailing) position along the longitudinal or lengthwise axis of the skateboard deck 20 such that, at rest, the truck axle extensions 66 at the leading position 32 are roughly parallel to the truck axle extensions 66 at the trailing position 34 and all truck axle extensions 66 are roughly perpendicular to the longitudinal axis of the skateboard deck 20 when the skateboard 10 is at rest. If this approximately parallel alignment of the truck assembly 30 and their respective axles are maintained while the skateboard 10 rolls along the ground, the skateboard's path will be relatively straight.

The skateboard deck 20 most commonly comprises a single piece of fiberglass, wood, wood laminates or wood composite or any suitable material for the skateboard deck 20. In addition, the deck 20 can have variable degrees of stiffness and flexibility based on the weight of the rider and the riders skateboarding style, i.e. gradual turns or a more aggressive pumping action of the skateboard deck 20. Some skateboard decks 20 consist of multiple pieces and/or are made from a combination of different materials.

The skateboard truck 30 most commonly comprises a multiple pieces of aluminum, steel, and/or other metals, and elastic components. Skateboard truck components can be constructed with any suitable material, including but not limited to fluids, gasses, plastics, rubber, metal, fabric, wood, electronics, etc.

Figure 2:
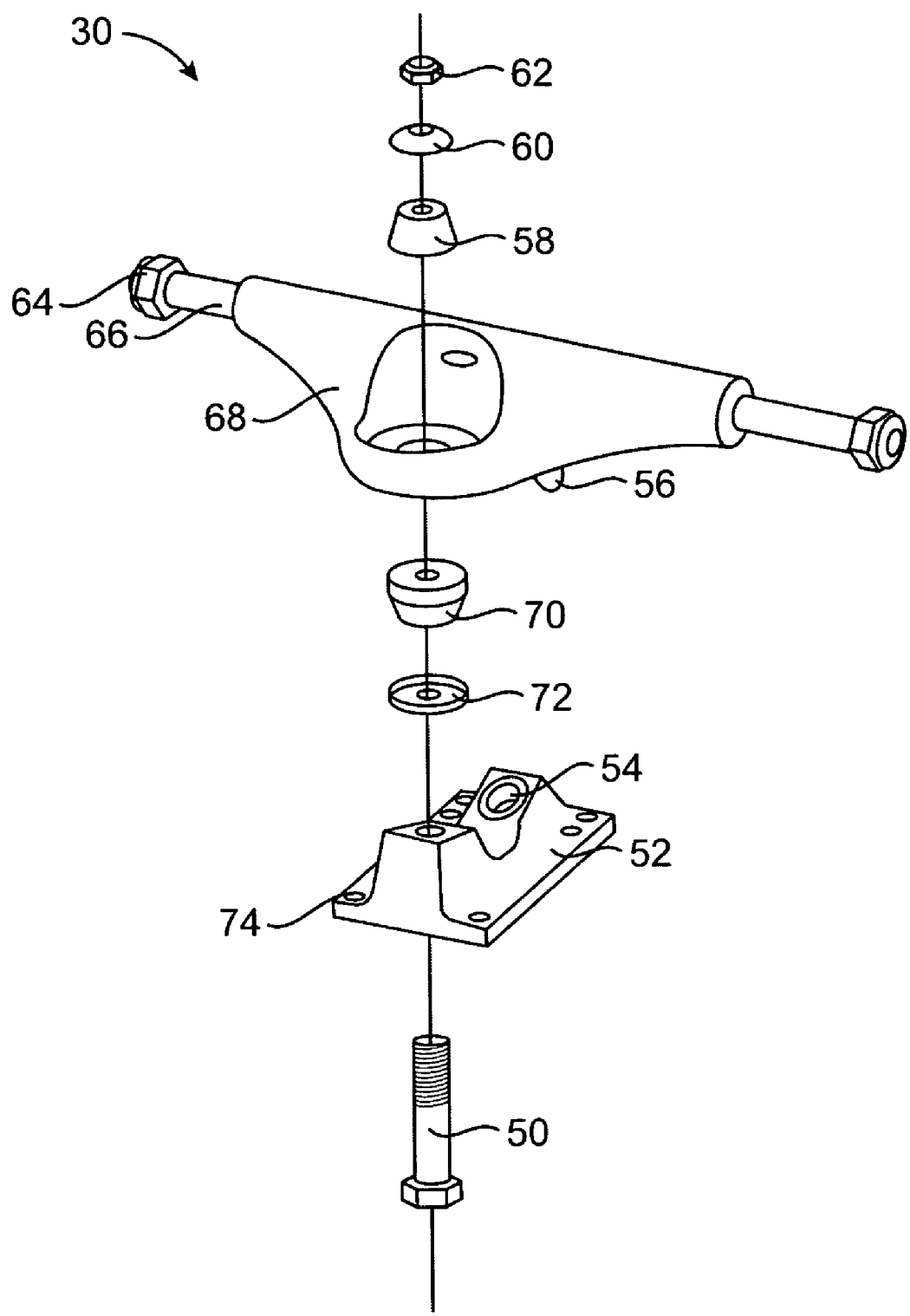
FIG. 2 shows an exploded perspective view of a skateboard truck.

FIG. 2 shows an exploded perspective view of a common style of skateboard truck 30. However, it can be appreciated that the embodiments described herein can be implemented with any skateboard truck 30 and skateboard truck design.

As shown in FIG. 2, a common skateboard truck 30 comprises a kingpin 50, a base plate 52, a pivot cup 54, a pivot 56, an upper cushion (aka bushing) 58, an upper cushion washer 60, a kingnut 62, a pair of axle nuts 64, a hanger 68, axle extensions 66 which protrudes from two ends of the hanger 68, a bottom cushion (aka bushing) 70 and a bottom cushion washer 72.

The base plate 52 has a plurality of openings 74. The openings 74 are configured to each receive bolts (not shown) for attaching the base plate 52 of the truck 30 to the deck 20 of the skateboard 10. Each of the two axle extensions 66 can receive a wheel 40. The wheel 40 preferably includes bearings (not shown), and washers or spacers (not shown), which properly position the bearings and wheels 40 such that they can freely spin without rubbing against the hanger 68. The wheel 40 is secured to the axle extension 66 with an axle nut 64.

The plurality of wheels 40, are preferably skateboard wheels or suitable wheels preferably having bearings, which can be attached to the wheels and which fit over the axle extension 66 of the skateboard truck 30. The at least one axle extension 66 preferably protrudes from hanger 68 and is configured to receive a wheel 40. It can be appreciated that the skateboard 10 can be equipped with a hydraulic truck as shown in U.S. patent application Ser. No. 10/874,134, filed Jun. 21, 2004, which is incorporated herein in its entirety, in the front or rear of the skateboard and one standard truck at the opposite end of the skateboard. Alternatively, multiple hydraulic trucks can be mounted on the skateboard 10.

Figure 3:
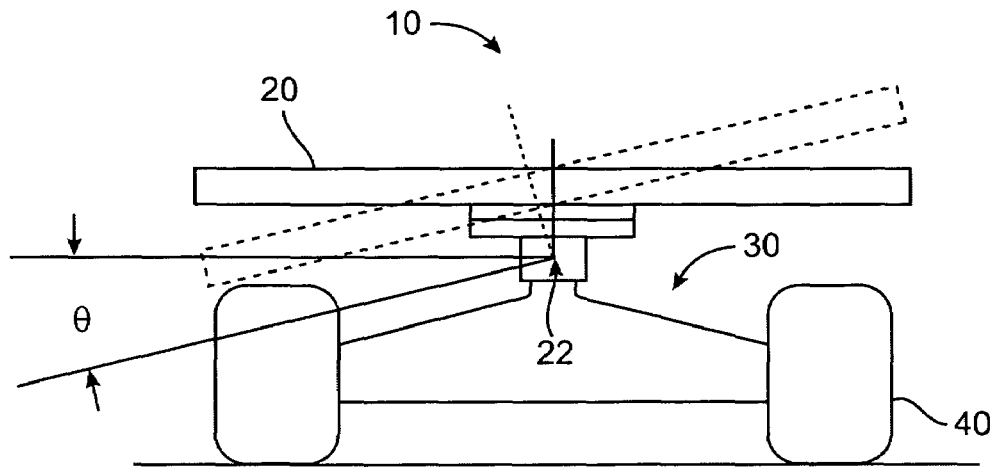
FIG. 3 shows an end view of a skateboard.

FIG. 3 shows an end view of a skateboard 10. As shown in FIG. 3, the weight of the skateboarder upon shifting his or her weight from side to side of the skateboard 10 causes the deck 20 of the skateboard to rotate about a pivot point 22, which is typically below the plane of the deck 20 of the skateboard 10. The pivot point 22 is typically located in the vicinity of the bushings 58, 70 of a common truck (FIG. 2). The pivot points 22 for a leading truck and a trailing truck are preferably each located on a plane which is perpendicular to the skateboard deck 20, and which also passes through the longitudinal axis of the skateboard deck 20. The axis of rotation of the skateboard deck 20 is defined by an imaginary line, which connects the two pivot points 22 on the leading and trailing trucks 30. It can be appreciated that the axis of rotation may not be so positioned without deviating from this invention. It can be appreciated that the position of the axis of rotation may dynamically shift in response to changes in orientation of the skateboard 10 without deviating from this invention.

Figure 4:
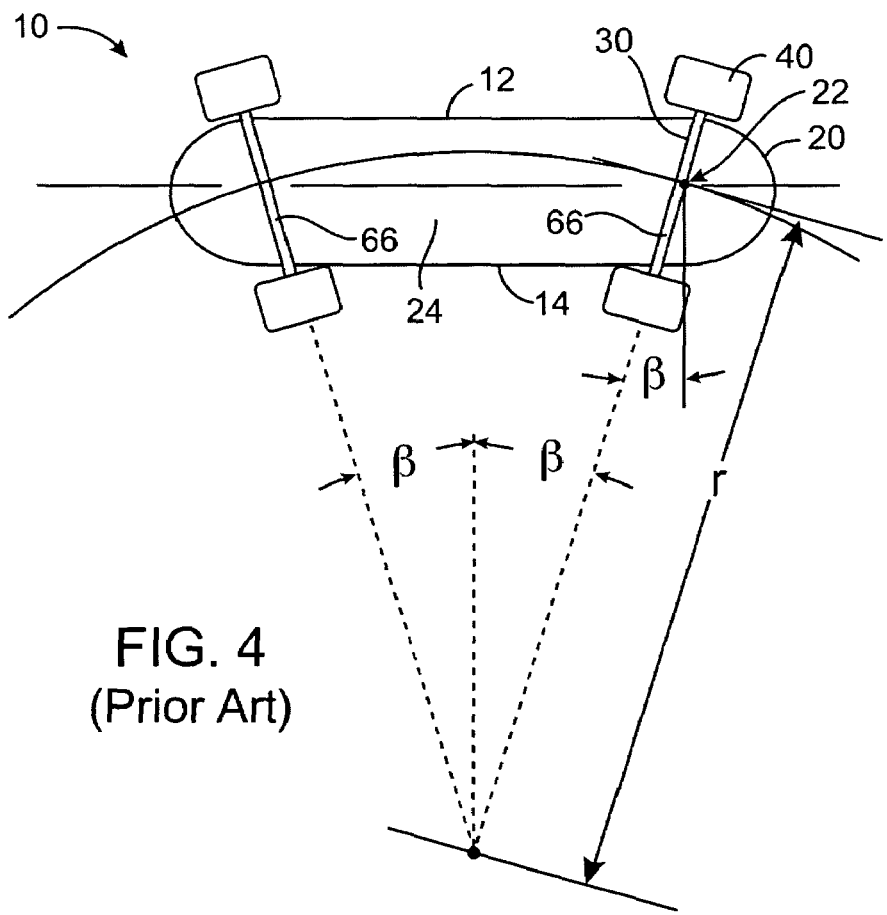
FIG. 4 shows a plan view of a skateboard.

FIG. 4 shows a bottom view of the skateboard 10 showing the skateboard's turning radius. As shown in FIG. 4, the turning path of the skateboard 10 will curve in the direction of the edge 14 of the skateboard that has been forced downwards. The greater the deck dipping angle, theta ($\theta$), as seen in FIG. 3, of the skateboard deck 20 measured from its resting position and around the longitudinal axis connecting points 22, the greater the trucks' 30 turning angles, beta ($\beta$), from their resting parallel position, measured around a vertical axis passing through pivot points 22, and the shorter the turning radius, r, of the skateboard's path. When one edge 14 of the skateboard deck 20 is rotated downward by the deck dipping angle theta ($\theta$), around the longitudinal axis connecting pivot points 22, the ends of the axle extensions 66 on that side of the skateboard 10 are caused to mechanically move towards one another, thus achieving the potential for the skateboard 10 to have a curved path.

As shown in FIG. 4, the skateboards path becomes curved when the axles 66 of the two trucks 30 are caused to have an alignment, which is no longer parallel to one another and no longer perpendicular to the longitudinal axis of the skateboard deck 20. The variable turning angle, beta ($\beta$), that the axle extension 66 of a truck 30 makes relative to its resting position (perpendicular to the longitudinal axis of the skateboard deck), is typically similar in magnitude, but opposite in direction, for each of the two trucks 30. It can be appreciated that the beta angle for the front and rear trucks 30 may be designed to be different from one another and/or in the same or opposite directions for a given dip angle, theta ($\theta$), of the deck 20 without deviating from this invention.

The truck axle extensions 66 positions and alignment are designed to respond variably to different changes in the deck dipping angle, theta ($\theta$), of the skateboard deck 20 from a first position to a second position. The path of the skateboard 10 will curve in the direction of the edge 14 of the skateboard deck 20 that has been forced downwards. The greater the deck dipping angle, theta ($\theta$), of the skateboard deck 20, the greater the trucks' 30 turning angle, beta ($\beta$), from their resting position and the shorter the radius of curvature, r, of the skateboards 10 path.

Trucks 30 have various mechanical designs. Trucks 30 are designed by different manufacturers to have different and varying mechanical and/or turning angle beta ($\beta$), responses to the deck-dipping angle, theta ($\theta$) of the skateboard deck 20 upon which, the trucks 30 are mounted. Some trucks 30 have no moving parts and rely on the geometry of the truck axle to facilitate the skateboard's 10 variable turning radius when the deck 20 is variably rotated from its resting position. Some trucks have single wheels (1), some have two (2) wheels, some trucks have three (3) wheels, and some others have seven (7) wheels. Mechanically, these trucks 30 appear and operate differently from one another but share a similar goal: a dynamic steering system which responds to the dipping of the skateboard deck 20 around the axis parallel to the longitudinal axis of the deck 20. Most of the truck designs, which include moving parts, also include a central or axial support structure such that the weight of the rider is carried through a single axial position. Speed wobbles detract from the riding experience for many of these truck designs due to a repetitive vibration of the truck assembly around the single structural pivot point. These speed wobbles may become so severe that they cause the rider to lose control of the skateboard. Moving the support structure away from the central axis will provide greater control of the skateboard and reduce or eliminate speed wobbles within the nominal riding speeds for the skateboard. Most, if not all, of the truck designs do not integrate a means of converting the lateral dipping of the skateboard deck directly or indirectly into locomotion of the skateboard. Most, if not all of the truck designs do not include a support structure, which enables the transfer of the entire load pressing on the deck via the rider's weight, gravity, muscular power, or centrifugal force into the components designed for locomotion of the skateboard. Most, if not all, truck designs do not include sensors which detect the relative motion of the skateboard deck with respect to the truck assembly and use that sensory information to control the distribution of supplementary energy sources to operate other functions on the platform, such as the locomotion, auditory, or visual effects of the board through the release of supplementary energy sources.

It is typical, but not universal, that the magnitude of the turning response, beta ($\beta$), of both of the skateboard trucks 30 on the skateboard 10 will be similar to each other but opposite in direction such that an imaginary linear extension of each trucks axle extensions 66 will cross and define a radius of curvature of the skateboard's 10 path. Some skateboard designs include one truck that does not ever change its orientation with respect to the deck and instead relies entirely on the other truck's response to the dipping deck 20 to enable the skateboard 10 to be steered by the rider. The greater the deck dipping angle, theta ($\theta$), of the skateboard deck 20, the greater the turning angle, beta ($\beta$), of each typical truck 30, and the smaller the turning radius, (r), of the skateboard's 10 path. Some skateboard 10 designs have a designated front (or leading) truck 30 and rear (or trailing) truck 30. The rear truck's 30 response may be more responsive to decking dipping angle, theta ($\theta$), thereby providing a fishtailing motion, which is not optional at increased deck dipping angles, theta ($\theta$).

Figure 5:
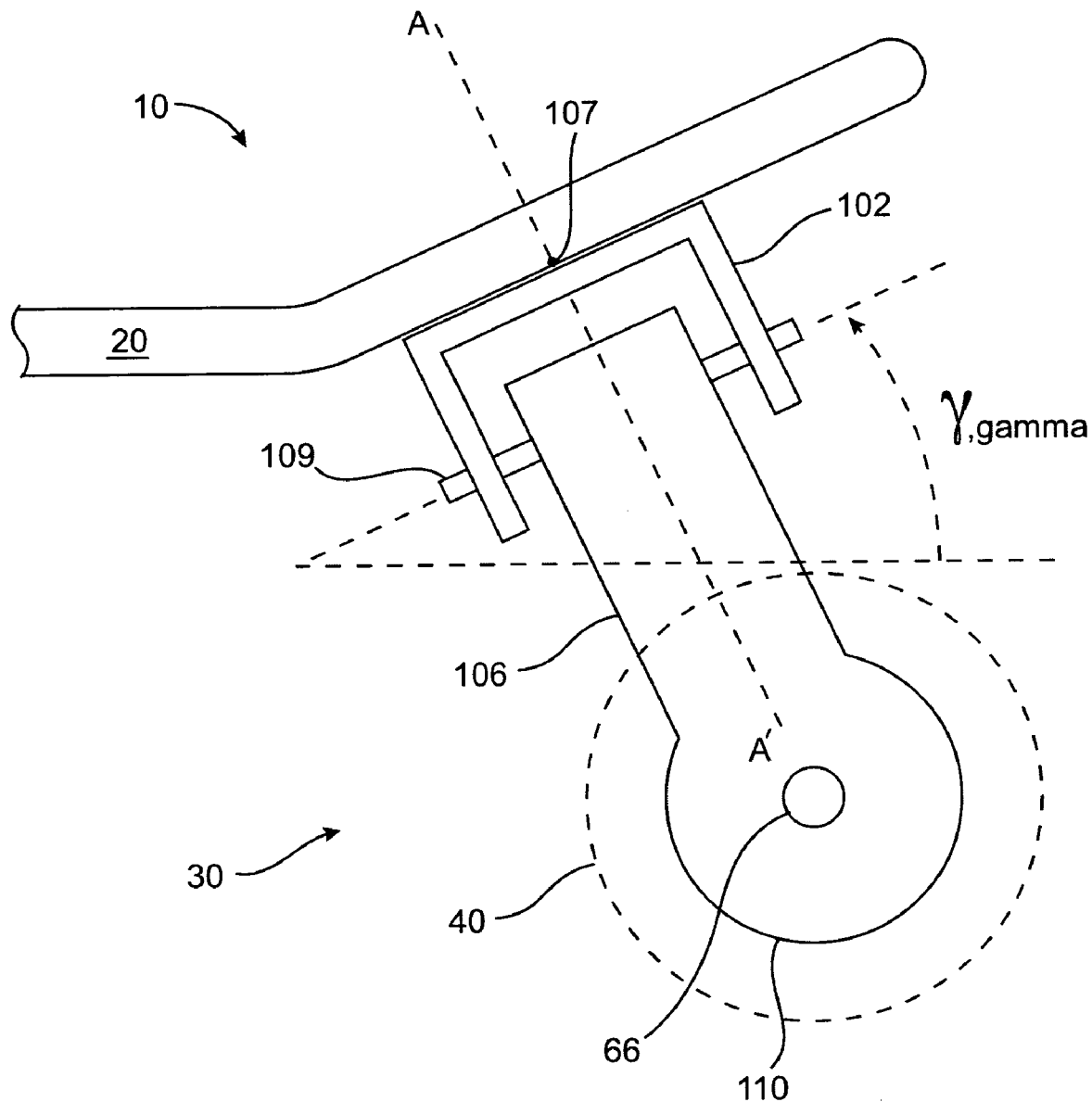
FIG. 5 shows a side view of one end of a skateboard with an alternate truck assembly.

FIG. 5 shows a side view of one end of a skateboard 10 having an alternate truck assembly 30 comprising an inclined axial pivot point 109. The truck assembly 30 comprises a base plate bracket 102, a pivot member 106, an axle housing 110, and an axial pivot pin 109. It can be appreciated that truck assembly 30 designs based on this configuration can include other parts, including but not limited to fasteners, washers, springs, and other suitable parts.

As shown in FIG. 5, the base plate bracket 102 can be configured to be attachable to the underside of the skateboard deck 20 with fasteners (not shown). The axle housing 110 includes a supporting structure or pivot member 106, which slips into and rotates within the base plate bracket 102. An axial pivot pin 109 connects the base plate bracket 102 to the pivot member 106 and allows the axle housing 110 to rotate around the axis of the axial pivot pin 109 as the rider dips the skateboard deck 20 from side to side. It can be appreciated that the axial pivot pin 109 can be fastened with washers, nuts, and other suitable components (not shown) to the base plate bracket 102.

The axial pivot pin 109 in FIG. 5 is configured to be inclined at an axial pin angle, gamma ($\gamma$), relative to the ground surface upon which the skateboard 10 is positioned. It is this angle, gamma ($\gamma$), which dictates the turning response angle, beta ($\beta$, as shown in FIG. 4), in response to the deck-dipping angle theta ($\theta$, as shown in FIG. 5). The greater the axial pin angle, gamma ($\gamma$), the greater the turning response angle, beta ($\beta$), to any given deck dipping angle, theta ($\theta$). If the axial pin angle, gamma ($\gamma$), is zero (0), then the turning response angle, beta ($\beta$), will be zero (0) in response to any given deck dipping angle, theta ($\theta$). The axial pin angle, gamma ($\gamma$), may be positive or negative, thus creating the opportunity for unusual responses to the deck dipping angle, theta ($\theta$).

Additionally, as shown in FIG. 5, the axial pin angle, gamma ($\gamma$), can be adapted to be adjustable (statically, or dynamically) to alter the turning characteristics of the skateboard 10. Because the skateboard wheels 40 tend to stay in contact with the riding surface due to the gravitational load of the rider, the axle housing 110 and attached structural pivot member 106 rotate around the axial pivot pin 109 in response to the rider dipping the deck 20 from left to right, theta ($\theta$). Thus, when the rider dips the deck 20 left or right, theta ($\theta$), the skateboard 10 has a turning response, beta ($\beta$), whose magnitude is defined by the axial pin angle, gamma ($\gamma$).

Figure 6:
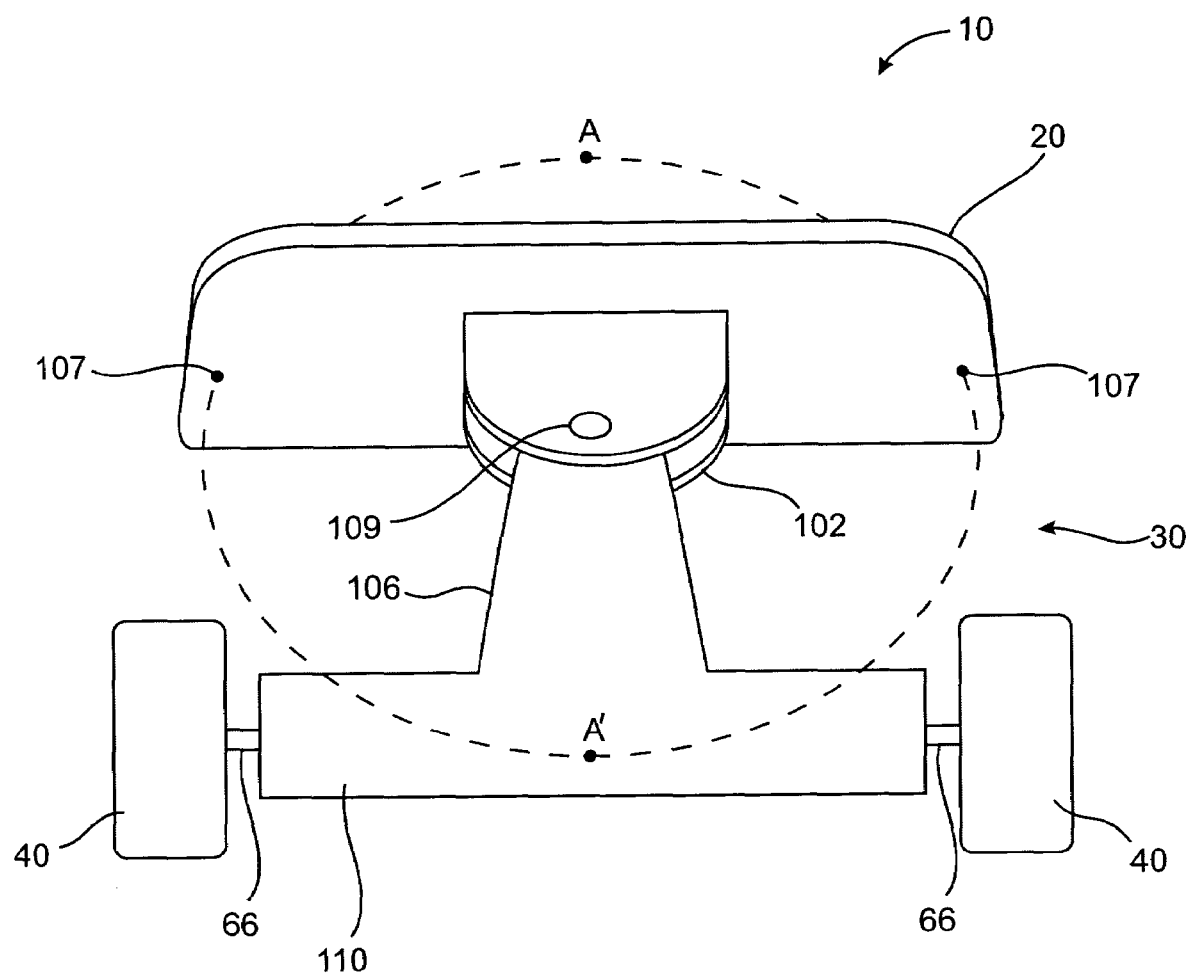
FIG. 6 shows an end view of a skateboard with the alternate truck assembly of FIG. 5.

FIG. 6 shows an end view of the skateboard 10 and truck 30 of FIG. 5. As shown in FIG. 6, as the truck 30 rotates around the axial pivot point 109, a reference point A' on the pivot member 106 moves in a concentric circle around the pivot point 109. The plane of the concentric circle of reference point A' is perpendicular to the axis of the axial pivot pin 109 and therefore appears as an ellipse when drawn on the plane of the FIG. 6. The concentric circle maintains its axial alignment with that of the axial pivot pin 109 as the deck 10 is dipped left or right by any deck dipping angle, theta ($\theta$), such that the plane formed by the concentric circle maintains the same angle, gamma ($\gamma$), when measured relative to the perpendicular to the ground surface. The concentric circle passes through a pair of intersection points 107 on the skateboard deck 20. As the skateboard deck 20 dips left and right through its deck dipping angle theta ($\theta$, as shown in FIG. 3), the pivot member 106 and the truck housing 110 rotate in a concentric path around the axial pivot pin 109. The position of the concentric circle relative to the axial pivot pin 109 remains fixed and the position of the intersection points 107 remain fixed to the same spot on the skateboard deck 20.

It can be appreciated that angular force or torque is generated around the axis of the axial pivot pin 109 when the platform deck 20 is rotated around the platform decks 20 longitudinal axis. It can also be appreciated that this torque can be captured by a variety of mechanical means and converted into forces to cause the skateboard axle extensions 66, and/or wheels 40 to rotate with the goal of providing propulsion to the skateboard.

It can be appreciated that in an alternative embodiment for a skateboard truck assembly 30, the structural axial pivot pin 109, the pivot member 106, and the base plate bracket 102 can be replaced with a more widely spaced structural design, which utilizes variations of the geometry and static position of the concentric circle in FIG. 6. This more widely spaced structural design increases stability, reduces speed wobbles, provides a greater range of turning characteristics, reduces the minimum number of parts, and provides a means of transferring energy from the rider to the wheels through the structural truck assembly components.

Figure 7A:
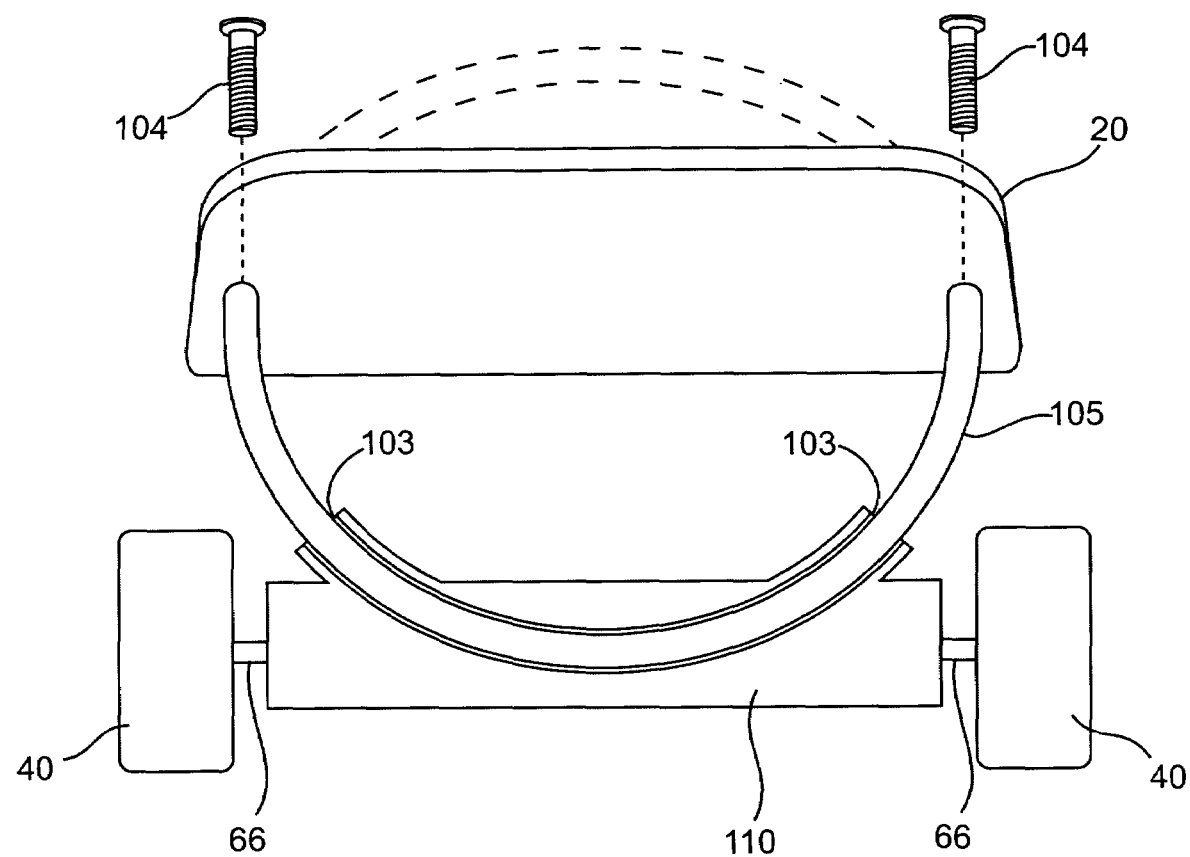
FIG. 7A shows an end view of a skateboard having an alternate truck assembly.

FIG. 7A shows a cross sectional view of an alternative embodiment of a skateboard truck assembly 30 attached to a skateboard deck 20. The truck assembly 30 includes a platform element 105 and an axle housing 110. The axle housing 110 includes openings 103 configured to movably receive the platform element 105. The axle housing 110 also has one or more axle extensions 66. Each axle extension 66 may receive one or more wheels 40. In this embodiment the platform member 105 is configured in a shape similar to that of the concentric circle in FIG. 6. The plane, which contains this concentric circle, is inclined at an angle, gamma ($\gamma$), measured from a perpendicular drawn from the ground surface, as shown in FIG. 6.

The platform element 105 is attached to the skateboard deck 20 preferably by bolts or screws 104, which are strong enough to allow the structural stability required to maintain the position of the platform element 105 relative to the skateboard deck 10. The platform element 105 may be attached to the deck 20 with pins, flexible fasteners, pivoting fasteners, welding, or any other suitable means of flexibly, rotationally, or fixedly attachment without deviating from this invention.

In this embodiment the platform element 105 slides through the curved openings 103 in the axle housing 110, changing the contact point between the platform element 105 and axle housing 110. The change in the contact point between the platform element 105 relative to the axle housing 110 results in a turning response of the skateboard deck 20 or wheeled platform. The curved openings 103 have a shape, which closely matches that of the platform element 105. In this embodiment some sort of lubrication or suitable material can be used to allow easier movement between the two parts.

The turning response angle, beta (β in FIG. 4) for the embodiment of FIG. 7A should be the same as that turning response for the embodiment in FIG. 6 so long as the orientation of the concentric circle in FIG. 6 is the same as the orientation of the platform element 105 in FIG. 7A. It can be appreciated that the structural elements (the base plate bracket 102, the pivot member 106 and the axial pivot pin 109) in FIG. 6 can be added to the embodiment in FIG. 7A for additional structural stability without deviating from this invention.

It can be appreciated that angular force or torque is generated around the virtual axis located at the center of the concentric circle when the platform deck 20 is rotated around the platform decks 20 longitudinal axis. It can also be appreciated that this torque can be captured by a variety of mechanical means and converted into forces to cause the skateboard axle extensions 66, and or wheels 40 to rotate with the goal of providing propulsion to the skateboard.

It can be appreciated that the truck assembly 30 can additionally be equipped with a pair of springs (not shown). The pair of springs assists with returning the axle housing 110 to a centered position. The pair of springs is preferably positioned around the exposed platform element 105. However, it can be appreciated that the pair of springs can be enclosed or encased for performance and safety purposes. It can be appreciated that any suitable material or element can be positioned around the platform element 105 to assist with returning the axle housing 110 to a centered position.

Figure 7B:
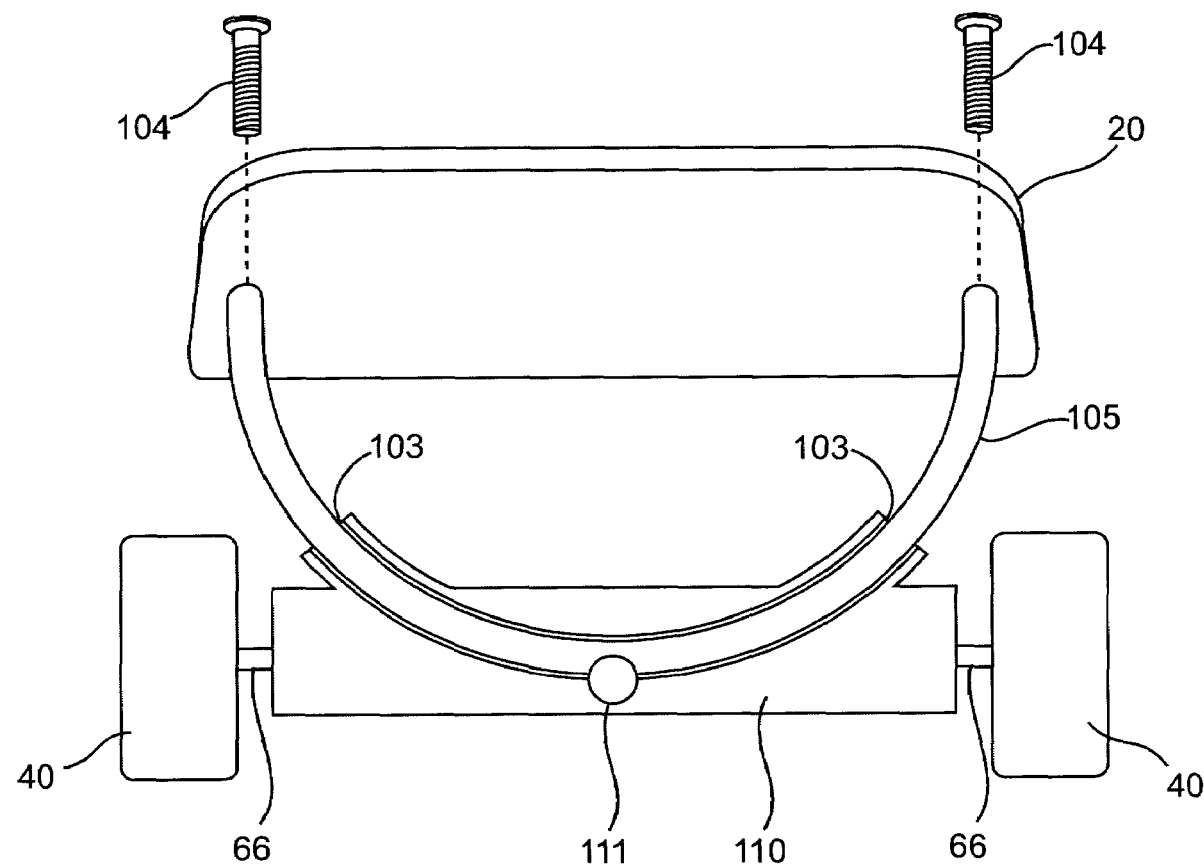
FIG. 7B shows an end view of a skateboard having an alternate truck assembly.

FIG. 7B shows an alternative embodiment of the truck assembly 30 as shown in FIG. 7A. As shown in FIG. 7B, the truck assembly 30 comprises the platform element 105, and axle housing 110 as shown in FIG. 7A and further comprising one or more roller bearings 111. The one or more roller bearings 11 are configured to ease or guide the movement, and/or reduce the friction between the platform element 105 and axle housing 110. It can be appreciated that additional bearings, rollers and guides can be added to improve the control and motion of the platform element 105 relative to the axle housing 110 without deviating from this invention.

Figure 7C:
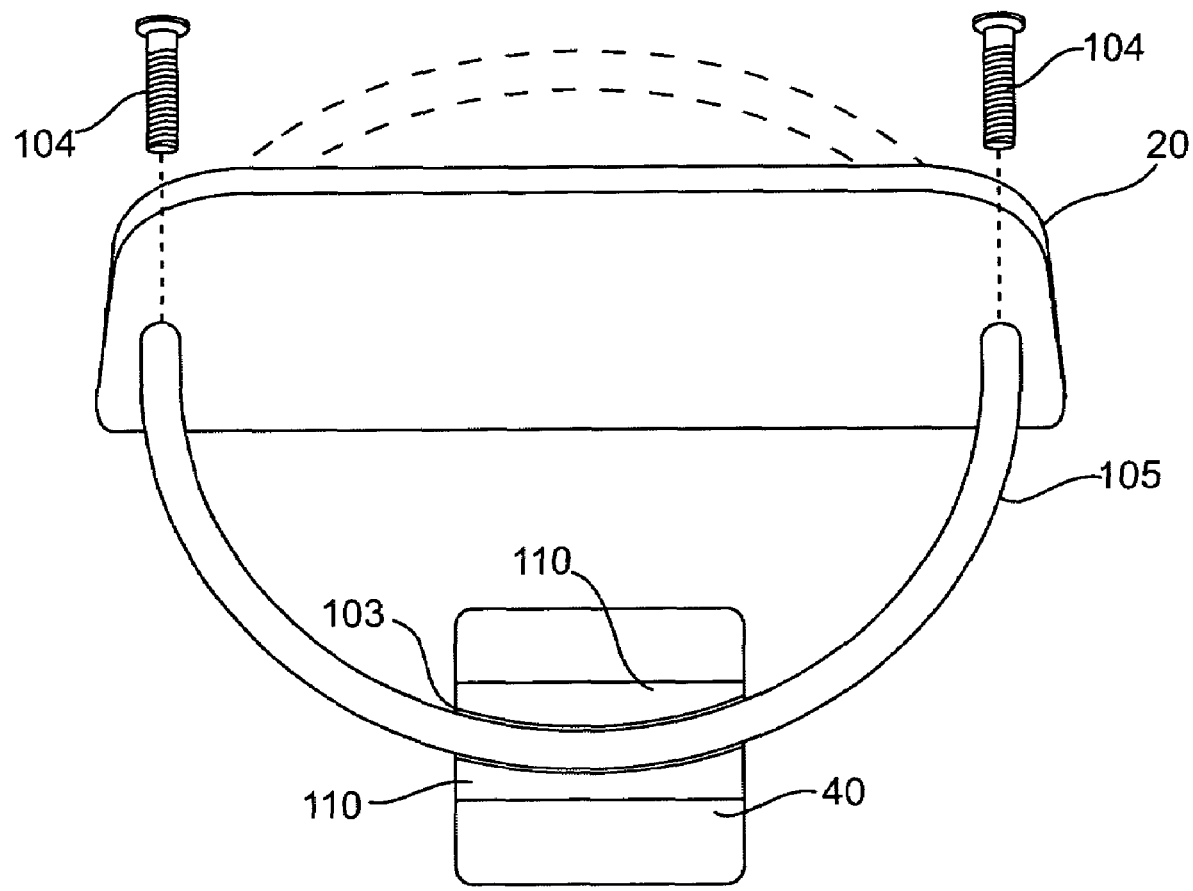
FIG. 7C shows an end view of a skateboard having an alternate truck assembly.

FIG. 7C shows a further embodiment of a skateboard truck assembly 30 attached to a skateboard deck 20. The truck assembly 30 includes a platform element 105 and a housing 110 in the form of a wheel 40. The wheel 40 includes openings 103 configured to movably receive the platform element 105. The opening 103, which is in general not cylindrical is part of the cylindrical housing 110, which is axially centered within the wheel 40 such that the wheel 40 will smoothly rotate around the cylindrical housing 110. As shown in FIG. 7C, bolts or screws 104 attach the platform element 105 to the skateboard deck 20. The bolts or screws 104 are preferably strong enough to allow the structural stability required to maintain the position of the platform element 105 relative to the skateboard deck 10. The platform element 105 may be attached to the deck 20 with pins, flexible fasteners, pivoting fasteners, welding, or any other suitable means of flexibly, rotationally, or fixedly attachment without deviating from this invention.

Figure 8:
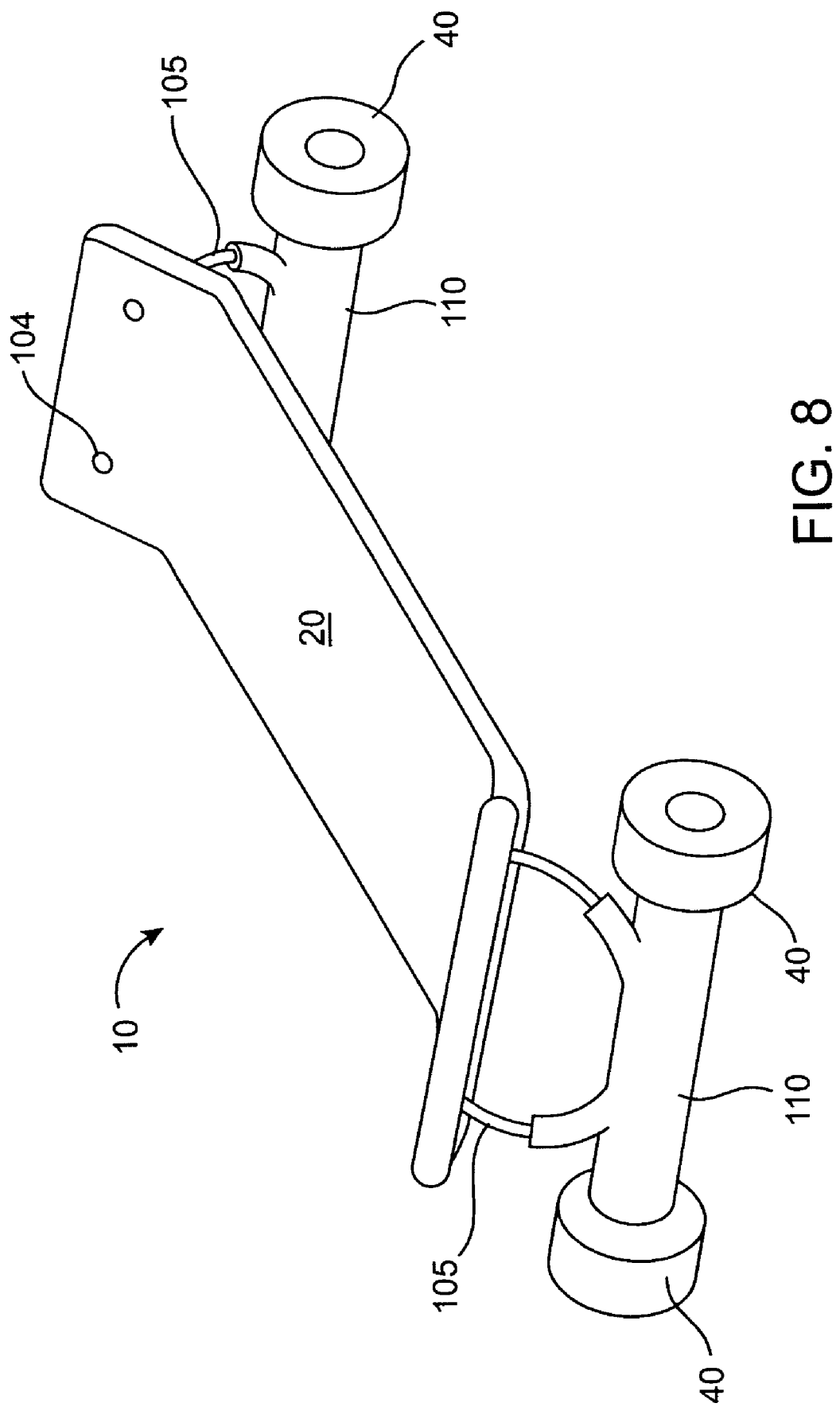
FIG. 8 shows a perspective view of the skateboard of FIG. 7A or 7B shown in a configuration to illustrate a straight path geometry.

FIG. 8 shows a perspective view of a skateboard 10 including the truck assembly 30 as described in FIGS. 7A and 7B. As shown in FIG. 8, the skateboard 10 is shown at rest, or traveling without a rider along a straight path.

Figure 9:
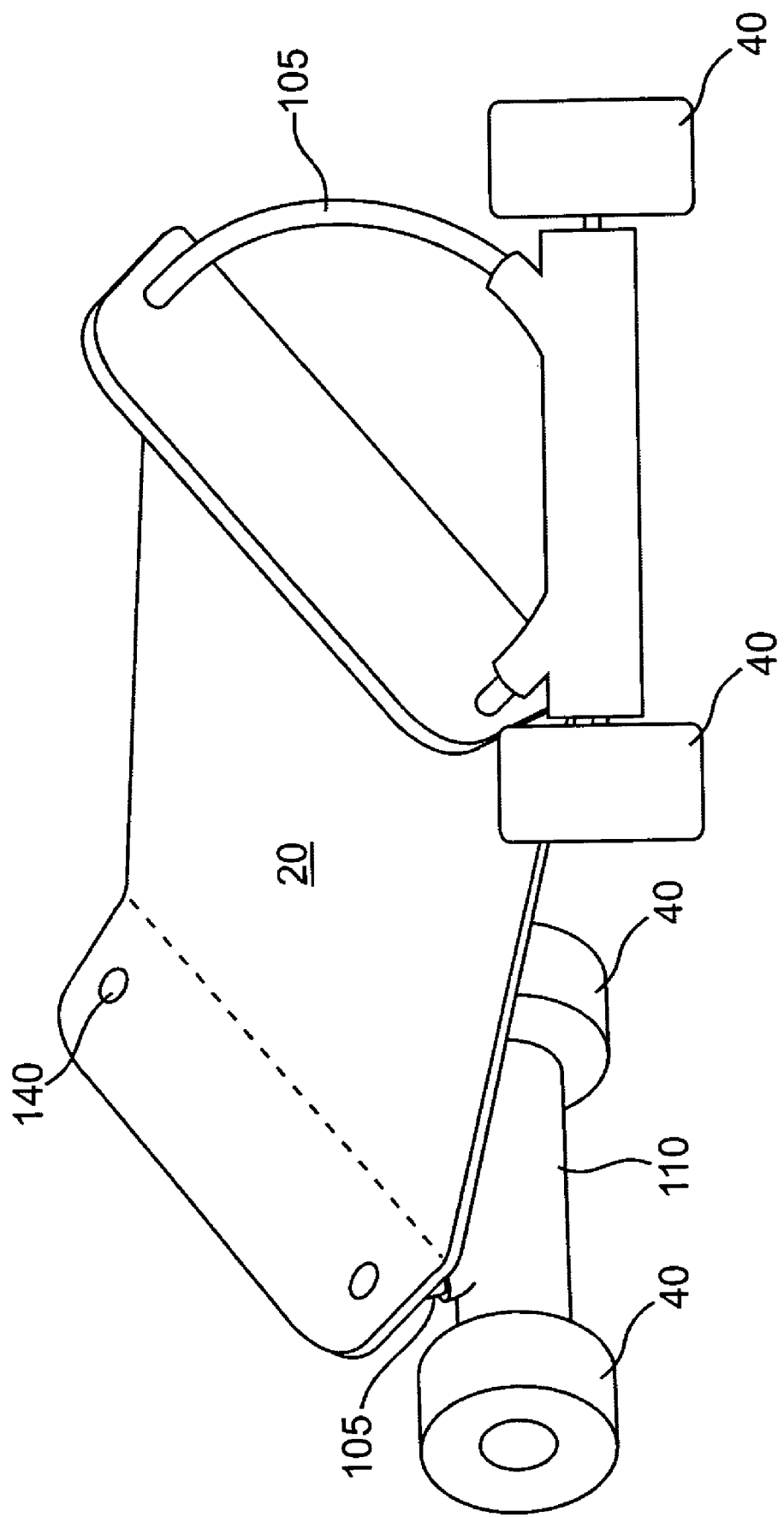
FIG. 9 shows another perspective view of the skateboard of FIG. 7A or 7B shown in a configuration to illustrate a turning geometry.

FIG. 9 shows a perspective view of a skateboard 10 including the truck assembly 30 described in FIG. 7A or 7B. As shown in FIG. 9, the skateboard 10 is shown in a turning configuration wherein there is a non-zero deck-dipping angle, theta (θ in FIG. 3) and non-zero turning response angle, beta (β in FIG. 4).

The geometric configuration of the truck assembly 30 as shown in FIGS. 7A, 7B, 8, and 9 offer several significant improvements over other truck designs. For example, issues of speed wobble should be significantly reduced due to the broader distribution of structural support between the deck 20 and the ground surface. The shape of the platform element 105 and the angle at which it is mounted to the deck 20 can be altered, along with the associated opening 103 within the axle housing 10, to provide a variety of turning responses for different deck dipping angles. In addition, the energy generated by the rider while turning or steering the skateboard 10 in this embodiment is transferred through the structural elements, as differential motion of the platform element 105 relative to the axle housing 110.

In further embodiments to be described below, the relative motion between the platform element 105 and axle housing 110 can be converted into power for the locomotion of the skateboard 10. It is significant that other structural elements, which support the weight of the rider, are removed. Power transferred by the rider into systems designed for the locomotion of the skateboard can be maximized if the structural elements used to support the load generated by the rider are also used to transfer the generated power. This design is significant in that it solves several problems inherent in many existing truck designs, while offering means to maximize the transfer of energy generated by riding and turning the skateboard into the energy which may be used in the locomotion of the skateboard. It can be appreciated that this transmitted energy can be transmitted or transferred to one or more energy storage elements (not shown) designed to store energy generated by the differential motion of the platform element relative to the housing. The energy storage elements can include one or more springs, a compressed or pressurized gas, an elastic material, at least one battery, or a hybrid combination of one or more of the energy storage elements. Additionally this transmitted energy can also be used to perform a variety of auditory, visual, or other sensory effects. It is of great significance that the structural load is carried by platform element 105, for without additional means of supporting the weight, muscular power, and centrifugal force generated through the riding of the board, such energy transmitted through the structural platform element 105 is maximized and may be used for a variety of other function including, but not limited to the locomotion, braking, and steering enhancement of the skateboard, wheeled platform, etc.

Figure 10:
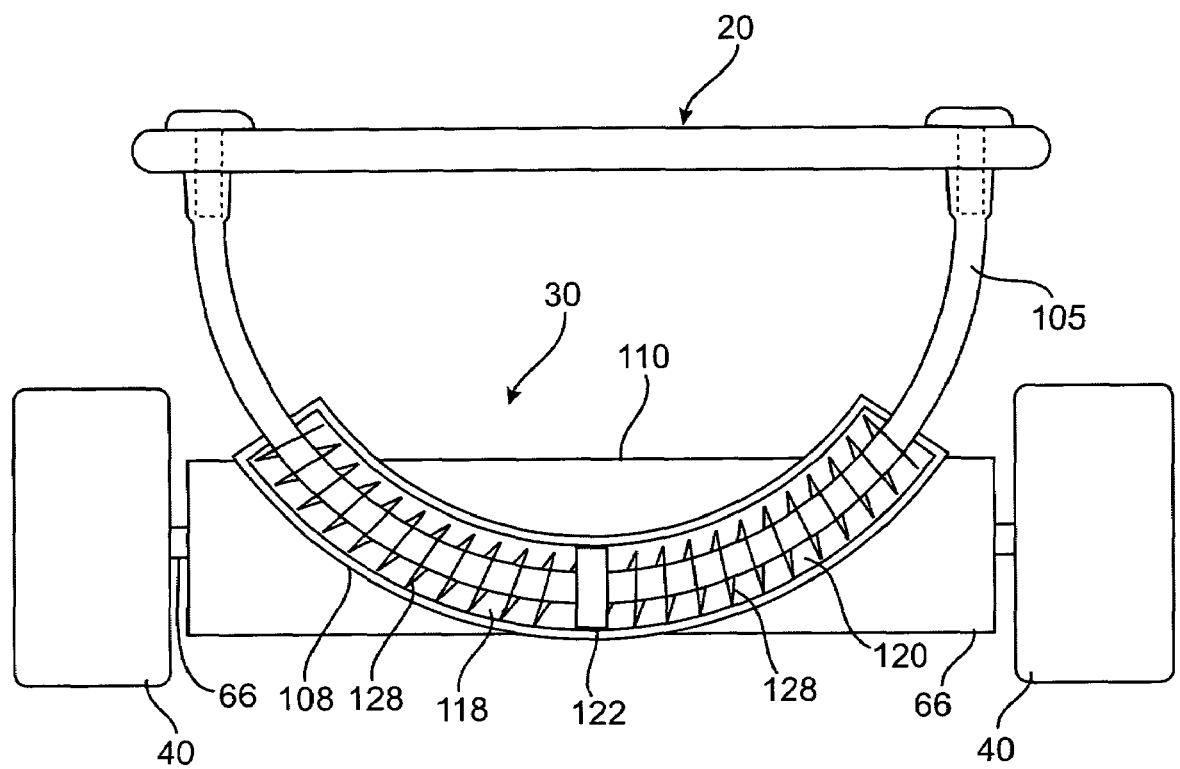
FIG. 10 shows an end view of a skateboard having an alternate truck assembly, which includes a cutaway view of internal parts, which include hydraulic components.
Figure 11:
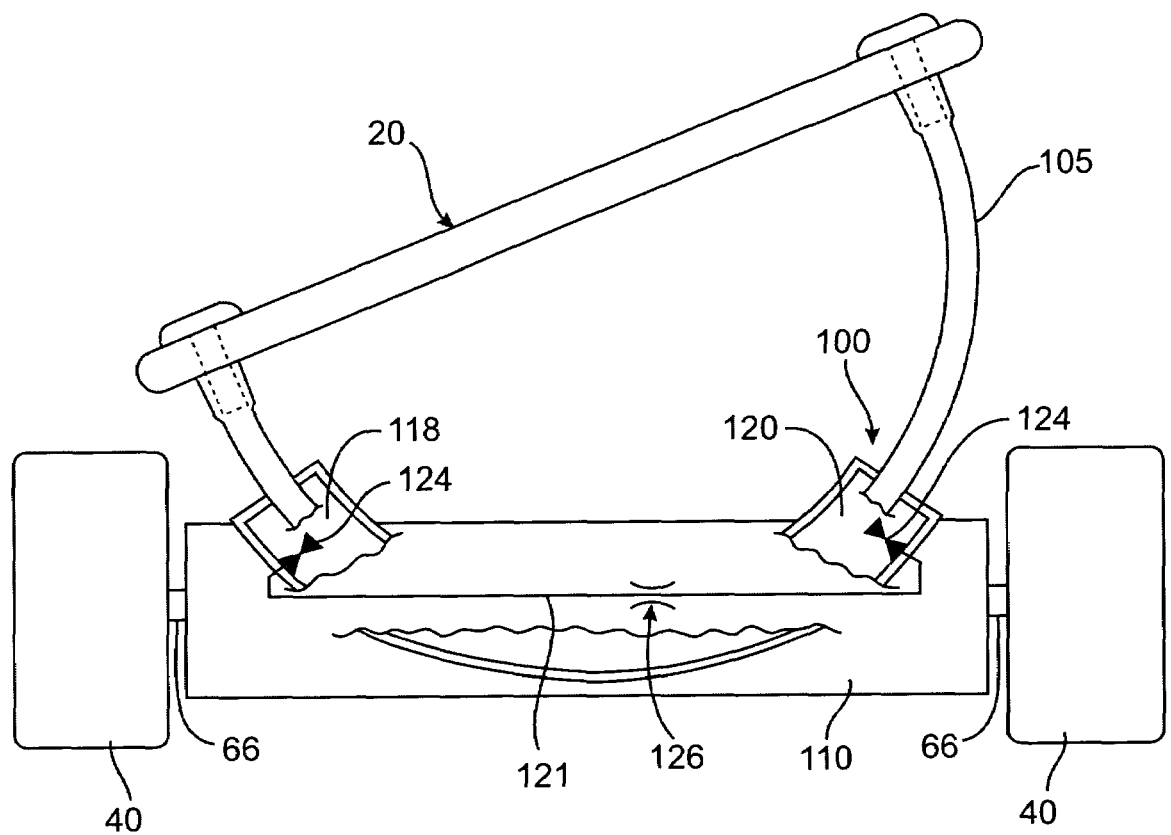
FIG. 11 shows a partial cutaway end view of a skateboard having the truck assembly of FIG. 10 showing schematic hydraulic circuitry.

FIGS. 10 and 11 are cutaway end views of an alternative truck assembly 30 mounted on a skateboard 10 having a hydraulic system 100. As shown in FIGS. 10 and 11, the truck assembly 30 embodies the truck geometries in FIGS. 7A and 7B with a hydraulic system 100. It can be appreciated that any suitable hydraulic system 100 can be used with the embodiment as shown in FIGS. 10 and 11.

FIG. 10 shows a cross sectional view of the truck assembly 30 attached to the skateboard 10, which is at rest with a horizontal skateboard deck 20. FIG. 11 shows the skateboard 10 of FIG. 10 with the deck 20 of the skateboard 10 dipping to the left and a cutaway schematic of the truck assembly 30 showing hydraulic circuitry symbols which describe the movement of hydraulic fluids within the hydraulic system.

As shown in FIG. 10, the curved housing 108 is a hydraulic chamber 118, 120 adapted to displace a hydraulic fluid from one of the hydraulic chambers 118 to the other hydraulic chamber 120. The housing 108 can also comprise a piston 122 configured to separate the at least one hydraulic chamber into the two separate hydraulic chambers 118, 120. The at least two chambers 118, 120 are in fluid communication with each other through a single conduit 121 (FIG. 11), which connects to an inlet/outlet port 124 in each chamber 118, 120.

The movement of the deck 20 from a first position to a second position (i.e., side to side, or up and down) causes the platform element 105 to displace a hydraulic fluid from one of the at least two hydraulic cylinder chambers 118, 120 to the other hydraulic cylinder chamber 118, 120, which expands to receive the hydraulic fluid and can dampen or eliminate the speed wobble vibrations to varying degrees by restricting the size of the fluid conduit, which connects the two chambers 118, 120, which a skateboarder can experience as a result of the speed of the skateboard 10. It can be appreciated that the wheeled platform in the form of a skateboard 10 may be propelled by the rider in immediate response to the steering or movement of the skateboard deck 20, whether turning left or right by providing torque to the drive axle in response to the compression of the hydraulic cylinder or hydraulic cylinders located symmetrically across a longitudinal axis of the platform in the form of a skateboard deck 20 or alternatively, the skateboard can be propelled in delayed response to the steering of the skateboard and the change of the contact point of the platform element 105 relative to the housing 110.

In this embodiment, the platform element 105 is preferably a single double-ended-piston-rod contained within a spring-centered hydraulic cylinder 108; however, it can be appreciated that other types of cylinder arrangements can be used. It can also be appreciated that it is not necessary to use a curved hydraulic housing 108 and that other housing 108 configurations can be used.

As shown in FIGS. 10 and 11, the platform element 105 is adapted to displace a hydraulic fluid from one of the hydraulic chambers 118 to the other hydraulic chamber 120 when compressed, after passing through the housing 108 via the conduit 121, which connects the two chambers 118, 120. It can be appreciated that the conduit 121 can be a flexible or rigid hydraulic conduit, which can be located internal or external to the housing 108. Additionally, the conduit 121 can be designed with an adjustable restrictor valve 126 to dampen or restrict the rate at which the hydraulic fluids flow from one chamber 118 to the other chamber 120. The two chambers 118, 120 are separated by the movable piston 122, which separates the two chambers 118, 120 of the truck assembly 100 from each other. It can be appreciated that the hydraulic fluid can be any suitable liquid or gas including but not limited to water, mineral oil, or oil.

It can also be appreciated that the hydraulic system can be replaced with a similar pneumatic system using air or other suitable gas as a replacement for the liquids. Pneumatic embodiments of these devices may or may not require fluid or gaseous communication between the chambers 118, 120.

Each of the two chambers 118, 120 may further include a spring-like element 128 configured to provide resistance within the chambers 118, 120 within the housing 108, when the hydraulic fluid is being displaced from one chamber 118 to the other chamber 120. Any suitable spring-like or resistive device can be used within or external to the hydraulic chambers 118, 120 without departing from the present invention.

Gravitational force, centrifugal force and the force derived from the dipping of the deck 20 to the left or the right or up and down will actuate the truck assembly 30. In operation, one of the chambers 118 of the truck assembly 30 compresses, while the other chamber 120 of the truck assembly 30 expands forcing the hydraulic fluid from the compressed hydraulic cylinder chamber 118 into the expanding hydraulic cylinder chamber 120. The expanding hydraulic cylinder chamber 118 creates a volume of reduced pressure to suction the hydraulic fluid into the hydraulic cylinder chamber 120.

As shown, the conduit 121 connects the two chambers 118, 120 to one another and can be contained within the housing 108, or alternatively, the conduit 121 can be positioned outside of the housing 108 in either the axle housing 110 or entirely outside or either housing 108, 110.

It can be appreciated that the skateboard 10 comprising a single double-ended-piston-rod-truck assembly 30 as shown in FIGS. 10 and 11 can be designed without an axle housing 110. If the truck assembly 30 does not include an axle housing 110, the cylinder housing 108 further comprises the conduit 121 for flow between the two chambers 118, 120 of the cylinder housing 108 and at least one axle extension 66.

The configuration of the truck assembly 30 described above and shown in FIGS. 10 and 11 can be extended to incorporate the hydraulic and pneumatic variations described in U.S. patent application Ser. No. 10/874,134, filed Jun. 21, 2004, and incorporated herein in its entirety.

Figure 12:
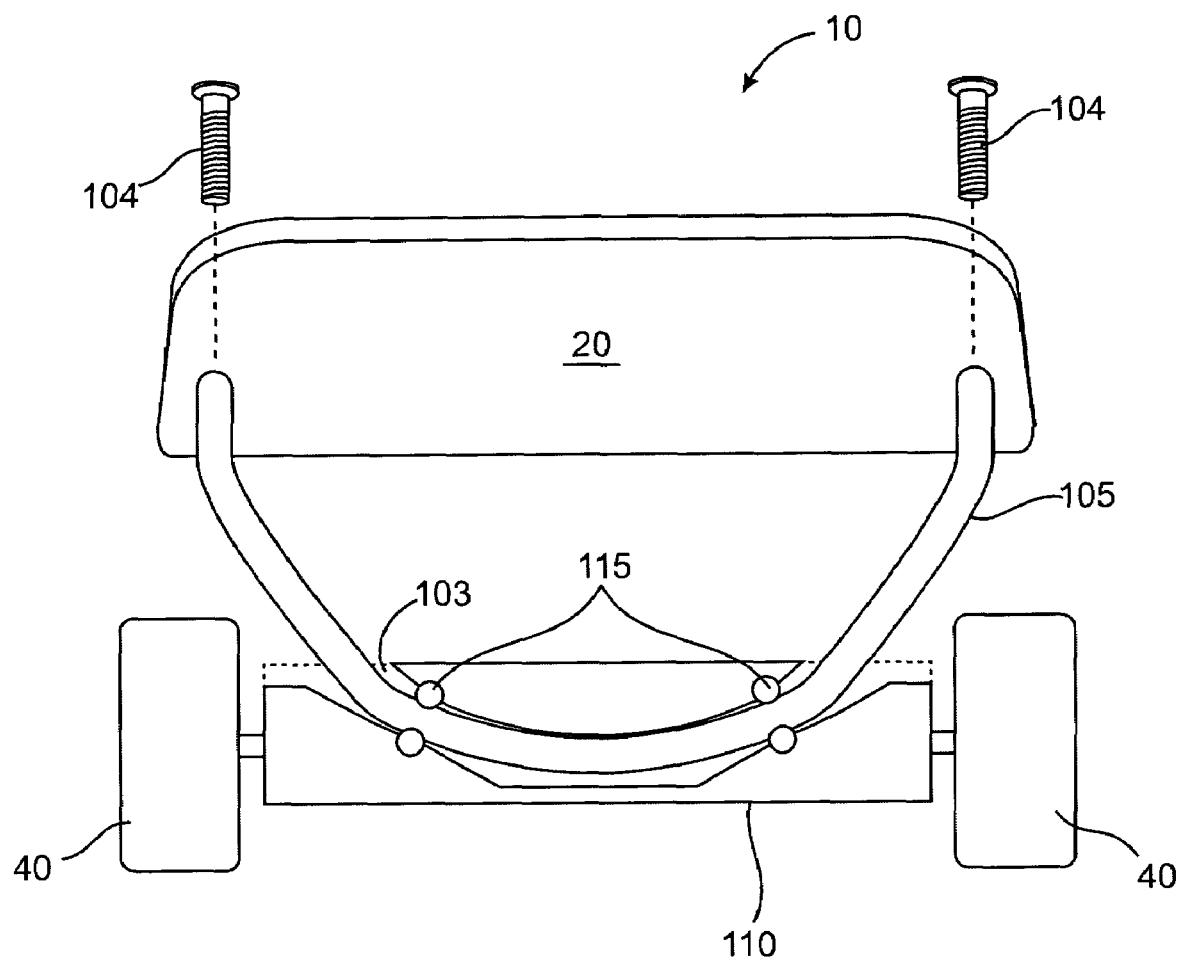
FIG. 12 shows an end view of a skateboard with an alternate truck assembly illustrating one example of non-circular shapes for a platform element.

FIG. 12 shows a cross sectional end view of an alternative truck assembly 30 attached to a skateboard 10. FIG. 12 illustrates that the platform element 105 does not need to be limited to a semi-circular shaped edge or be contained entirely within a two-dimensional plane. The platform element 105 may have any shape, with or without other elements, so long as the means by which it is movably connected to the axle housing 110 and the axle housing opening 103 is adapted to receive the unique shape of the platform element 105. Any suitable guide device 115, such as roller bearings, bearings, or guide system can be used to guide the movement of the uniquely shaped platform element 105 within the housing opening 103.

Figure 13:
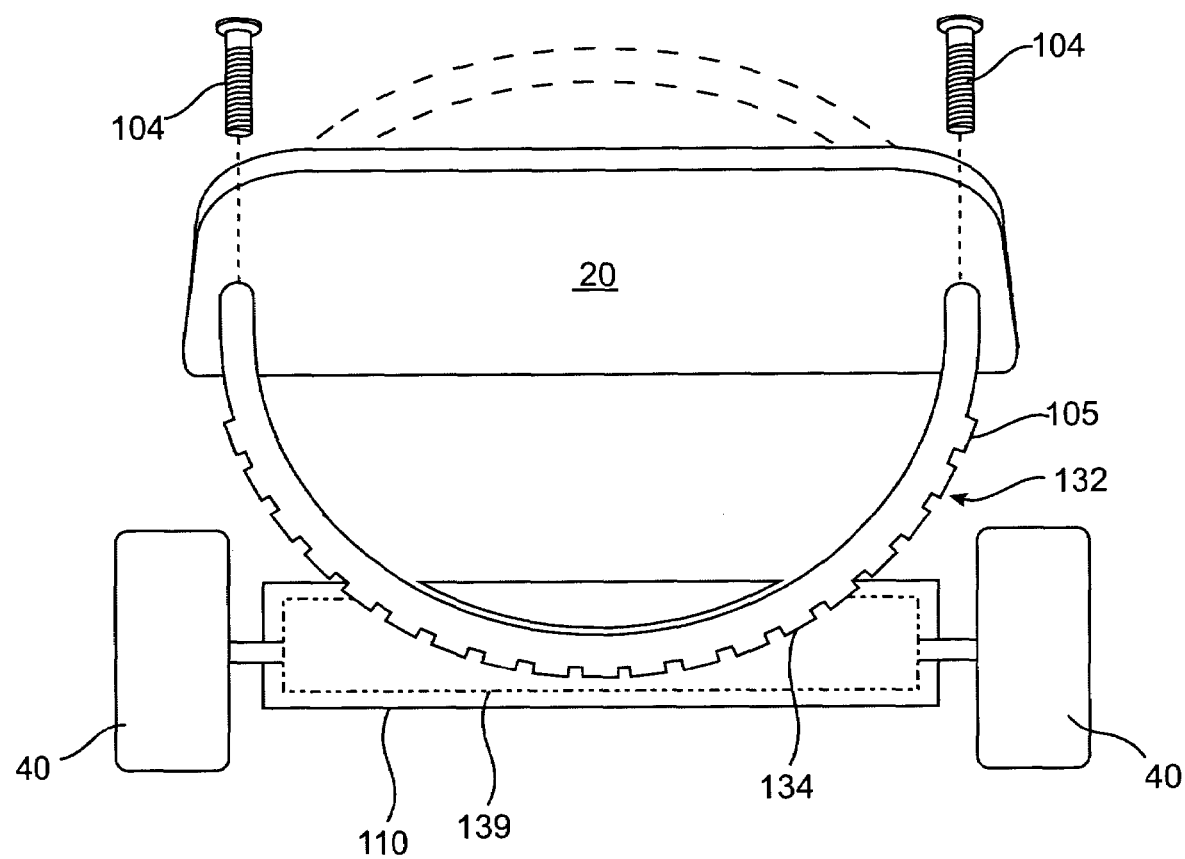
FIG. 13 shows an end view of a skateboard with an alternate truck assembly including mechanisms to create locomotion of the skateboard.

FIG. 13 shows an alternative embodiment of the truck assembly 30 with the same semi-circular geometry of the embodiment shown in FIGS. 7A and 7B, wherein the platform element 105 is configured to engage the housing 110 to propel the wheeled platform. As shown in FIG. 13, the platform element 105 comprises a gear system 132 having a series of gear teeth 134. Note that the location of the teeth 134 on the platform element 105 can be located on any or all surfaces of the platform element 105. It can be appreciated that the platform element 105 can engage the housing 110 to propel the wheeled platform by any suitable mechanism including but not limited to grooves within the platform element, and/or friction between the platform element 105 and the housing 110 or one or more mechanisms 139, which transmit energy from the platform element 105 into other functions, including but not limited to locomotion of the skateboard 10. Alternatively, magnetic attraction, rubberized platform element 105, a sprocket and derailleur system, or any other suitable system wherein the mechanical and/or rotational energy of the platform element 105 is converted into energy in the form of rotational energy to drive the wheels 40 of the platform or other device.

Additionally, as shown in FIG. 13, one or more mechanisms 139 can be added internally and/or externally to the axle housing 110, to convert the rotational motion of the geared platform element 105 into other functions, including, but not limited to the locomotion of the skateboard. It can also be appreciated that, as in the embodiment described in FIG. 12, irregularly shaped platform elements for the truck assembly 30 described in FIG. 13 may be used instead of semi-circular platform elements 105 without deviating from this invention.

Figure 14:
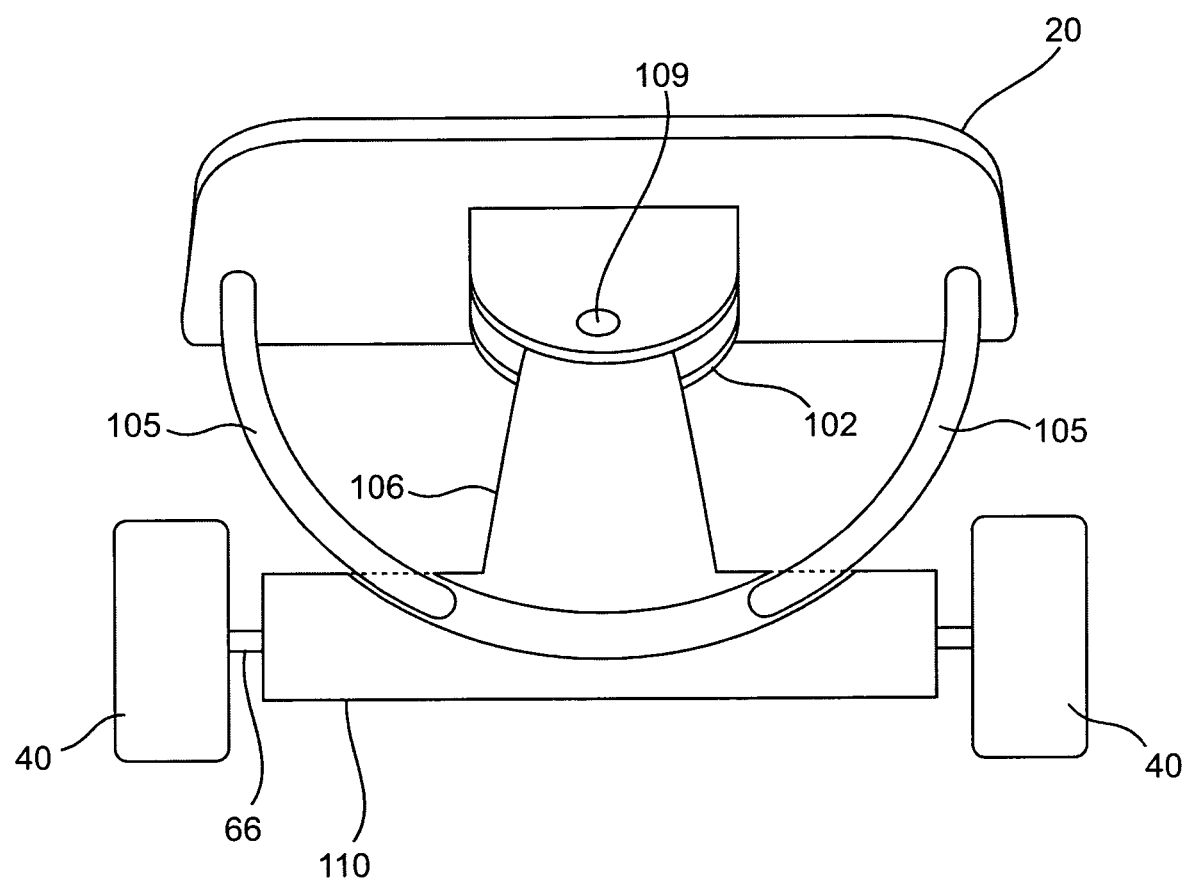
FIG. 14 shows an end view of a skateboard with an alternate truck assembly.

FIG. 14 shows that the platform element 105 is not necessarily limited to a single piece of any particular shape. The platform element 105 can be constructed of any material, any number of pieces, any shape and design so long as it maintains a function of providing a means of generating differential motion between the deck 20 and the axle housing 110. If the platform element 105 loses it function of contributing to the structural support of the rider, then other structural elements must be added. For example, a means of structurally mounting the housing 110 to the skateboard deck 20 can be added. The means of structurally mounting the housing 110 to the skateboard deck 20 can be a truck assembly 30 as shown in FIG. 14 or any other suitable support member.

Figure 15:
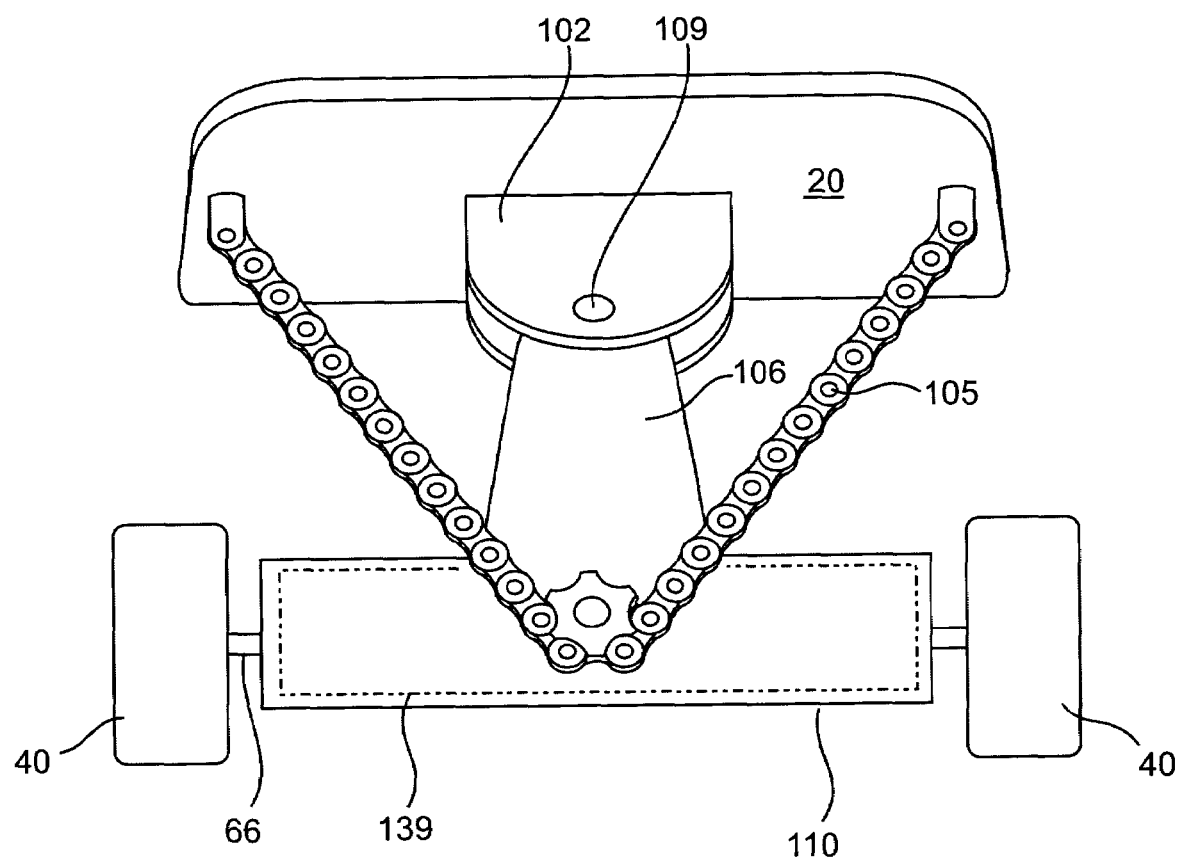
FIG. 15 shows an end view of a skateboard with an alternate truck assembly.

FIG. 15 shows that the connection points for the platform element 105 do not need to be structural or fixedly attached. They can be flexibly or rotationally attached to the deck 20. FIG. 15 also illustrates that the platform element 105 can be a cable, rope, elastic, or chain, like a bicycle chain (not structural) that engages mechanisms on, or in, the truck housing 110. It also can be appreciated that an occupant generated or alternative energy source 138 (FIG. 18) can be incorporated into the housing of the truck assembly 30 without departing from the invention.

Figure 16:
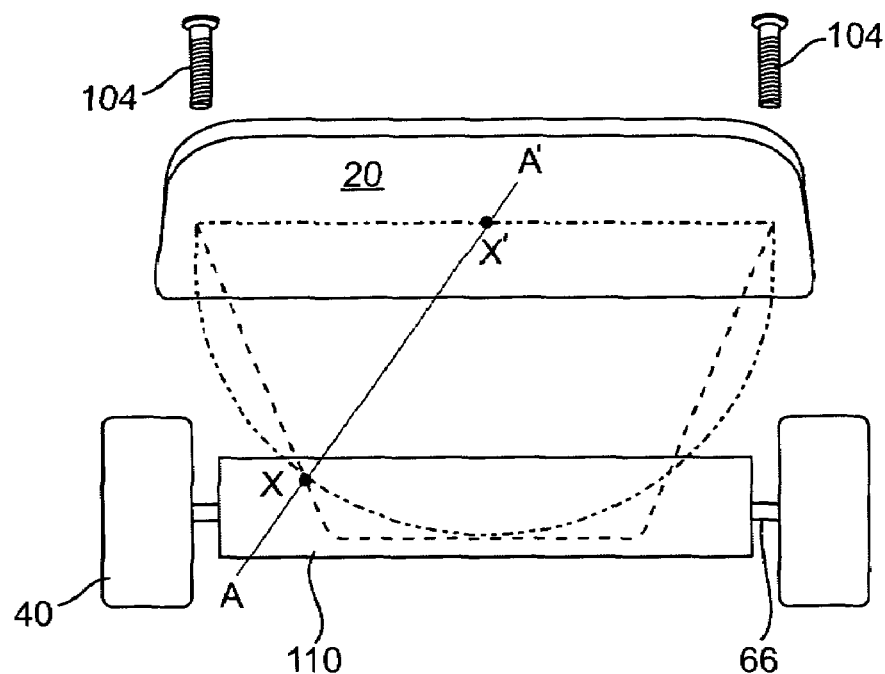
FIG. 16 shows an end view of a skateboard with various truck component geometries.

FIG. 16 shows that the platform element 105 can have any radial cross sectional shape (cross section plane which includes the axis of rotation, for example, of a semi-circular shaped platform element 105). For example, the platform element 105 may be solid, t-shaped, circular, etc. In addition, it can be appreciated that the cross sectional shape for any given platform element 105 may differ for different radial cross sections of the same platform element 105.

Figure 17:
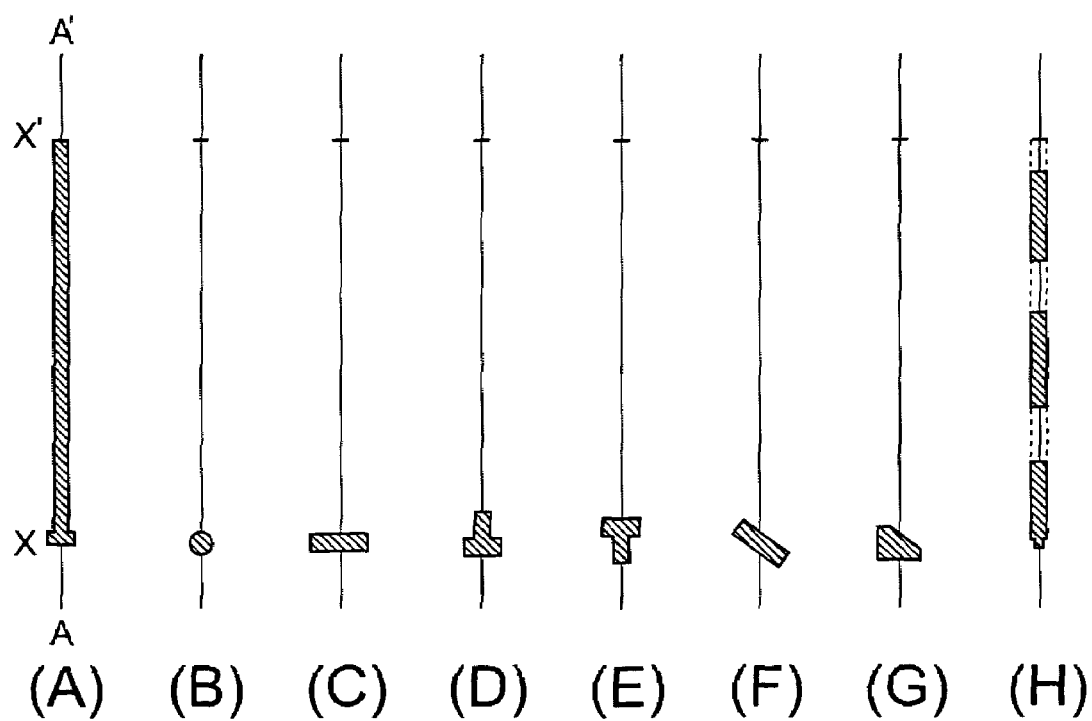
FIGS. 17A-17H show various cross sectional views of a platform element taken along line A-A' of FIG. 16.

FIGS. 17A-17H show various cross sectional views of FIG. 16 within the plane of the platform element 105 taken from a side view. As shown in FIGS. 17A-17H, the platform element 105 can have a solid inverted t-shape, wherein the inverted t-shape extends from X' to X (FIG. 17A), cylindrical having a circular or round cross section (FIG. 17B), bar or hoop shaped having a rectangular cross section (FIG. 17C), an inverted t-shaped cross section (FIG. 17D), an up right t-shape cross section (FIG. 17E), an angled bar or hoop shape having a rectangular cross section (FIG. 17F), an triangular cross section with a portion of each end removed (FIG. 17G), a solid plate having a plurality of holes or sprockets and a toothed gear (FIG. 17H). It can be appreciated that the platform element 105 can have any suitable cross sectional geometry or configuration.

Figure 18:
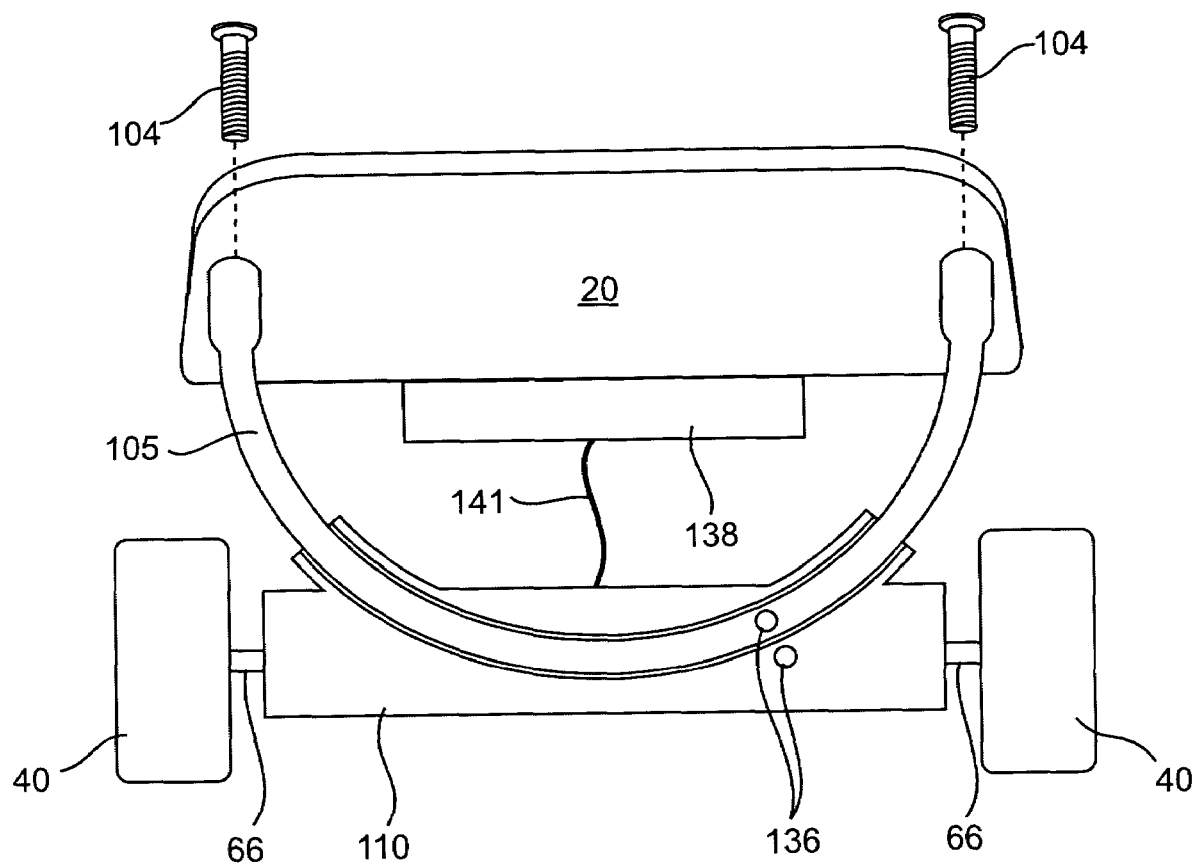
FIG. 18 shows an end view of a skateboard with an alternate truck assembly including sensors and alternate energy sources.

FIG. 18 shows how the platform element 105 and/or truck housing 110 can be equipped with at least one sensor 136, which is configured to detect the relative motion of the deck 20 and attached platform element 105 relative to the truck housing 110. Such sensory information can then be used to control (mechanically, or electronically or otherwise) the distribution of occupant generated or alternate energy source 138. For example, the occupant generated or alternative energy sources 138 can be a battery, an internal combustion engine, or hydraulically or pneumatically accumulated energy. The occupant generated or alternate energy source 138 is attachable to the housing 110 via a suitable connection 141.

It can be appreciated that the truck assembly 30 as shown in FIGS. 1-18 can be further equipped with an integrated or distinct actuating element as disclosed in U.S. patent application Ser. No. 10/980,626, filed on Nov. 2, 2004, which is incorporated herein in its entirety. The actuating element transfers lateral or transverse forces and displacements, directed roughly perpendicular to the longitudinal axis of the skateboard deck to which the truck is mounted, into enhanced turning geometries on the truck and/or skateboard braking capacity. Alternatively, the truck assembly 30 can be equipped with an integrated or attachable actuating element, which transfers lateral or transverse forces and displacements, directed roughly perpendicular to the longitudinal axis of the skateboard deck 20 to which the truck assembly is mounted, into enhanced turning geometries on the truck assembly 30 and/or skateboard braking capacity.

Although the deck 20 has been shown to be a skateboard deck, it can be appreciated that the deck 20 can be a platform such as a plain deck for moving furniture and other items, or an in-line skate where the wheels with a flat footprint remain in contact with the road by the inline boot leaning from left to right and vice-versa creates a force that is converted to rotational force within each of the in-line skates. Additionally, the platforms 20 may be bicycle pedals and the truck assembly 30 may be integrated into other bicycle components used for the locomotion of the bicycle. The platforms 20 do not necessarily require foot actuation. It is possible that energy transmitted to the truck assembly 30 via the platform element 105 be generated by any other human body part or non-human alternate energy source.

It can also be appreciated that the platform element 105 and housing 110 can be implemented into any suitable device, wherein a change in orientation, contact point and/or relationship between the platform 105 element and the housing 110 is desired. For example, the platform element 105 and housing 110 can be implemented into an automobile, wherein the platform element 105 is attachable to the chassis of the automobile and upon a change of direction of the automobile, the orientation and relationship of the platform element 105 and housing 110 provides improved handling and ride of the automobile. It can be also appreciated that the platform element 105 and housing 110 can be implemented into any suitable device or apparatus, wherein the a change in the orientation between the platform element 105 and the housing 110 is desired, including but not limited to an automobile chassis or a car seat.

The devices, platforms and skateboards 10 as shown among FIGS. 4-18 can be equipped with one truck assembly 30 as described herein and one standard truck, or with two truck assemblies 30 as described herein. Although as shown in FIGS. 1-18, the platform or skateboard 10 is a single unit, the platform or skateboard deck can be multiple platforms or decks without departing from the present invention. It also can be appreciated that the mechanisms configured to convert motion of the platform element 105 relative to the housing 110 into energy to propel the wheeled platform or including any torque generating mechanisms can be entirely located within the skateboard wheel 40 rather than within the truck assembly 30.

The truck assembly 30 system can also be applied to other human powered devices, such as motors to drive pumps, pottery wheels, wheeled equipment to move office or work equipment, hand trucks, or any device that can benefit from the rotational energy, including sewing machines or ice cream makers. In addition, it can be appreciated that the system can be incorporated into an inline skate, roller skate, or any device comprising a plurality of wheels.

Figure 19:
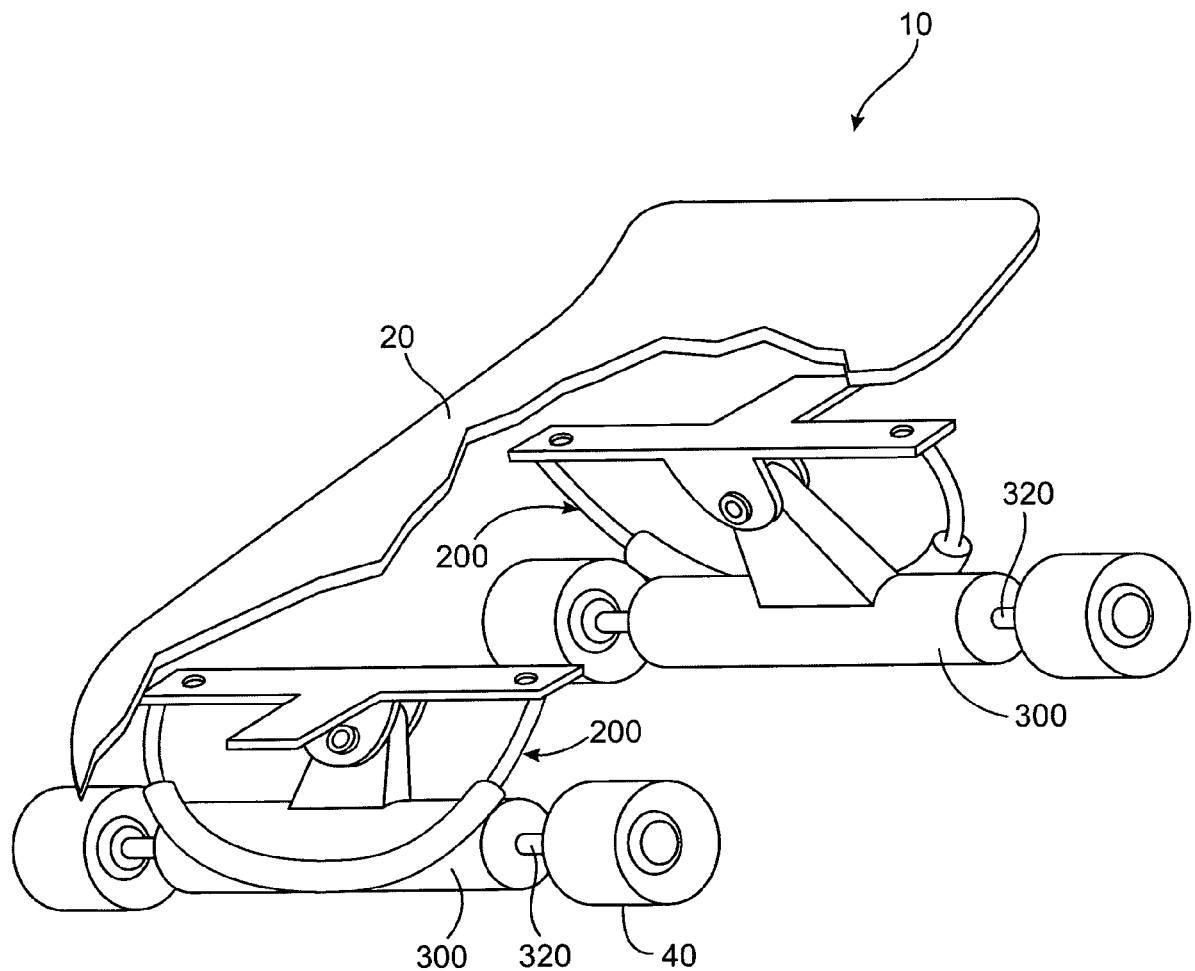
FIG. 19 shows a perspective view of an occupant-propelled device in the form of a skateboard with a portion of the skateboard deck cutaway.

FIG. 19 shows a perspective view of an occupant-propelled device in the form of a skateboard 10 configured to dampen vibrations and wobbles that a skateboarder can experience at high speeds. The skateboard 10 comprises at least one hydraulic cylinder 200, a housing 300 having at least one axle 320, a platform or skateboard deck 20, and at least one wheel 40.

Figure 20:
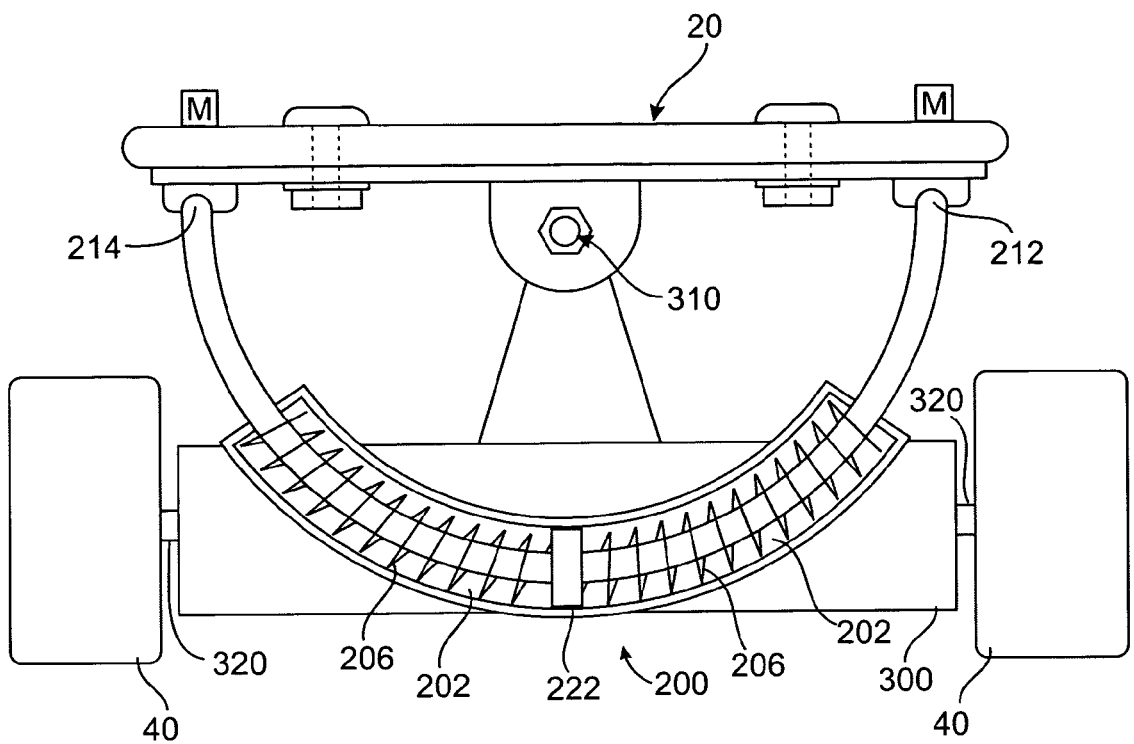
FIG. 20 shows a partial cutaway of a cross sectional end view of a skateboard illustrating one embodiment.
Figure 21:
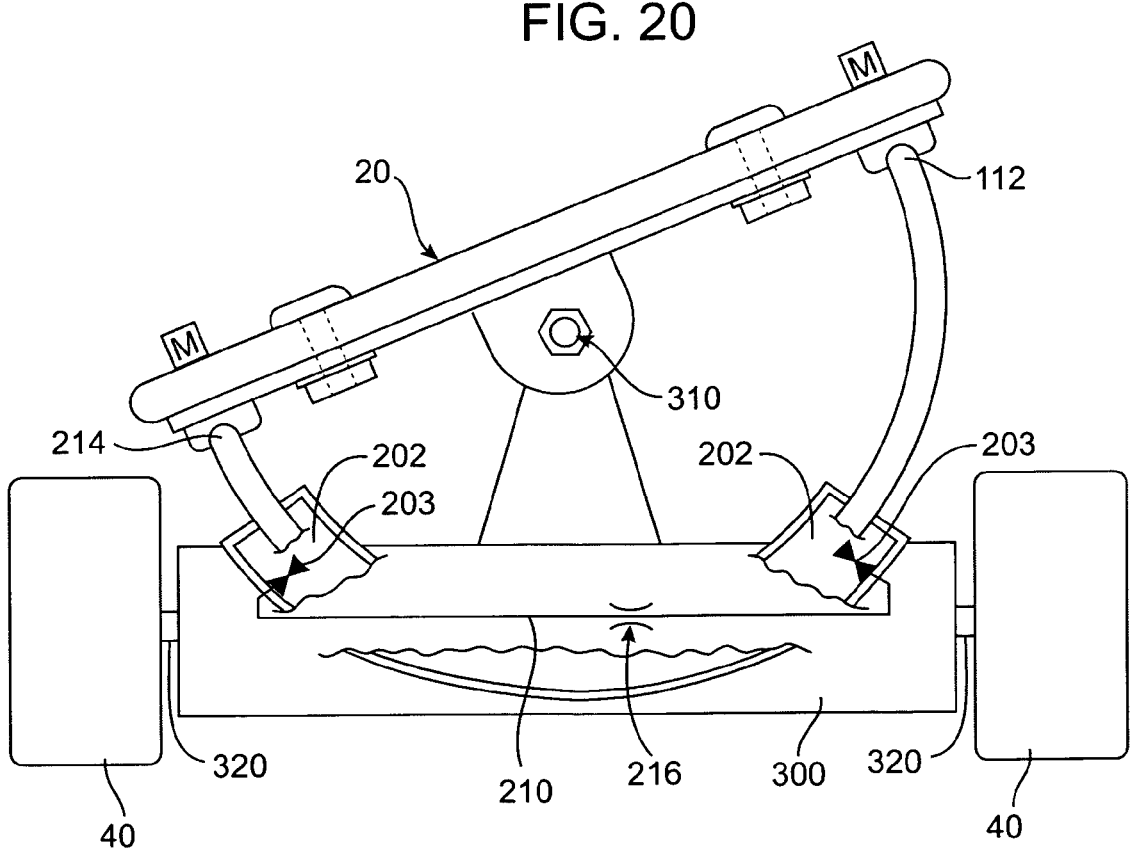
FIG. 21 shows a partial cutaway of a cross sectional end view of the skateboard as shown in FIG. 20 including hydraulic circuitry symbols.

FIGS. 20 and 21 are end views of the skateboard 10 as shown in FIG. 19. FIG. 20 shows the skateboard 10 at rest with a horizontal skateboard deck 20. FIG. 21 shows the skateboard 10 not at rest with the skateboard deck 20 dipping to the left. The skateboard 10 comprises at least one hydraulic cylinder 200 comprising at least two chambers 202. The at least two chambers 202 are in fluid communication with each other through a single conduit 210 which connects to an inlet/outlet port 203 in each chamber 202.

As shown in FIG. 20, the at least one cylinder 200 comprises a semi-circular double-ended-piston-rod having a first connection point 212 and a second connection point 214 affixed to the at least one platform or skateboard deck 20. In this embodiment, the at least one hydraulic cylinder 200 is preferably a single double-ended-piston-rod-spring-centered hydraulic cylinder 200; however, it can be appreciated that other types of cylinder arrangements can be used. Preferably each connection point 212, 214 of the hydraulic cylinder 200 is attached with suitable fixed connections to the platform or skateboard deck 20. However, it can be appreciated that the hydraulic cylinder 200 can be attached to the platform or skateboard deck 20 with suitable pivoting or flexible connections to the skateboard deck 20. It can also be appreciated that it is not necessary to use a semi-circular hydraulic cylinder and that other cylinder configurations can be used.

The at least one hydraulic cylinders 200 as shown in FIG. 21 is adapted to displace a hydraulic fluid from one of the hydraulic chambers 202 to the other hydraulic chamber 202 when compressed, after passing through a housing 300 via a conduit 210 which connects the two chambers 202. It can be appreciated that the conduit 210 can be a flexible or rigid hydraulic conduit, which can be located internal or external to the housing 300. Additionally, the conduit 210 can be designed with an adjustable restrictor valve 216 to dampen or restrict the rate at which the hydraulic fluids flow from one chamber 202 to the other chamber 202. The two chambers 202 are separated by a movable piston 222, which separates the two chambers 202 of the at least one hydraulic cylinder 200 from each other. It can be appreciated that the hydraulic fluid can be any suitable liquid or gas including but not limited to water, mineral oil, or oil. It can be appreciated that the hydraulic system could be replaced with a similar pneumatic system using air or other suitable gas as a replacement for the liquids. Pneumatic embodiments of these devices may or may not require fluid or gaseous communication between the chambers 202.

Each of the two chambers 202 further includes a spring-like element 206 configured to provide resistance within the chambers 202 within the at least one cylinder 200 while the hydraulic fluid is being displaced from one chamber 202 to the other chamber 202. Any suitable spring-like or resistive device can be used within or external to the hydraulic chambers 202 without departing from the present invention.

Gravitational force, centrifugal force and the force derived from the dipping of the skateboard deck 20 to the left or the right or up and down will actuate the hydraulic cylinder 200. In operation, one of the chambers 202 of the hydraulic cylinder 200 compresses, while the other chamber 202 of the hydraulic cylinder 200 expands forcing the hydraulic fluid from the compressed hydraulic cylinder chamber 202 into the expanding hydraulic cylinder chamber 202. The expanding hydraulic cylinder chamber 202 creates a volume of reduced pressure to suction the hydraulic fluid into the hydraulic cylinder chamber 202.

The housing 300 as shown in FIGS. 19-21 is a skateboard truck. However, it can be appreciated that the housing 300 can be a skateboard truck, or any other desirable enclosure for internal components of the hydraulic system. The housing 300 is attachable to the skateboard deck 20 at a pivot point 310. It is preferable that the pivot point 310 is approximately equal distance (or symmetrically positioned) from the connection points 212, 214 to the skateboard deck 20, however, it can be appreciated that the pivot point 310 can be at a distance that is not an equal distance or centrally located. The housing 300 further comprises at least one axle 320 adapted to receive at least one wheel 40.

The housing 300 can further include a conduit 210 connecting the two chambers 202 to one another or alternatively, the conduit 210 can be outside of the housing 300. If the conduit 210 is outside of the housing 300, the conduit 210 can be contained within the hydraulic cylinder 200 or outside of the cylinder 200. It can be appreciated that the skateboard 10 comprising a single double-ended-piston-rod-hydraulic cylinder 200 as shown in FIGS. 1-3 can be designed without a housing 300, wherein the cylinder 200 further comprises the conduit for flow between the two chambers of the cylinder, at least one axle 320 and a means for attaching the cylinder 200 to the deck of the skateboard or skateboard deck 20.

The skateboard deck 20 as shown in FIGS. 19-21 is preferably affixed to each end of a single double-ended-piston-rod hydraulic cylinder 200 at connection points 212, 214. The movement of the skateboard deck 20 from a first position to a second position (i.e., side to side, or up and down) causes the at least one hydraulic cylinder 200 to displace a hydraulic fluid from one of the at least two hydraulic cylinder chambers 202 to the other hydraulic cylinder chamber 202 which expands to receive the hydraulic fluid and can dampen or eliminate the vibrations to varying degrees by restricting the size of the fluid conduit which connects the two chambers 202, that a skateboarder can experience as a result of the speed of the skateboard.

The at least one wheel 40 is preferably a skateboard wheel or suitable wheel having a bearing which can be attached to the at least one axle 320. The at least one axle 320 preferably protrudes from truck 300 and is configured to receive a wheel 40. It can be appreciated that the skateboard can be equipped with one hydraulic truck in the front or rear of the skateboard and one standard truck at the opposite end of the skateboard. Alternatively, multiple hydraulic trucks can be mounted on the skateboard.

Figure 22:
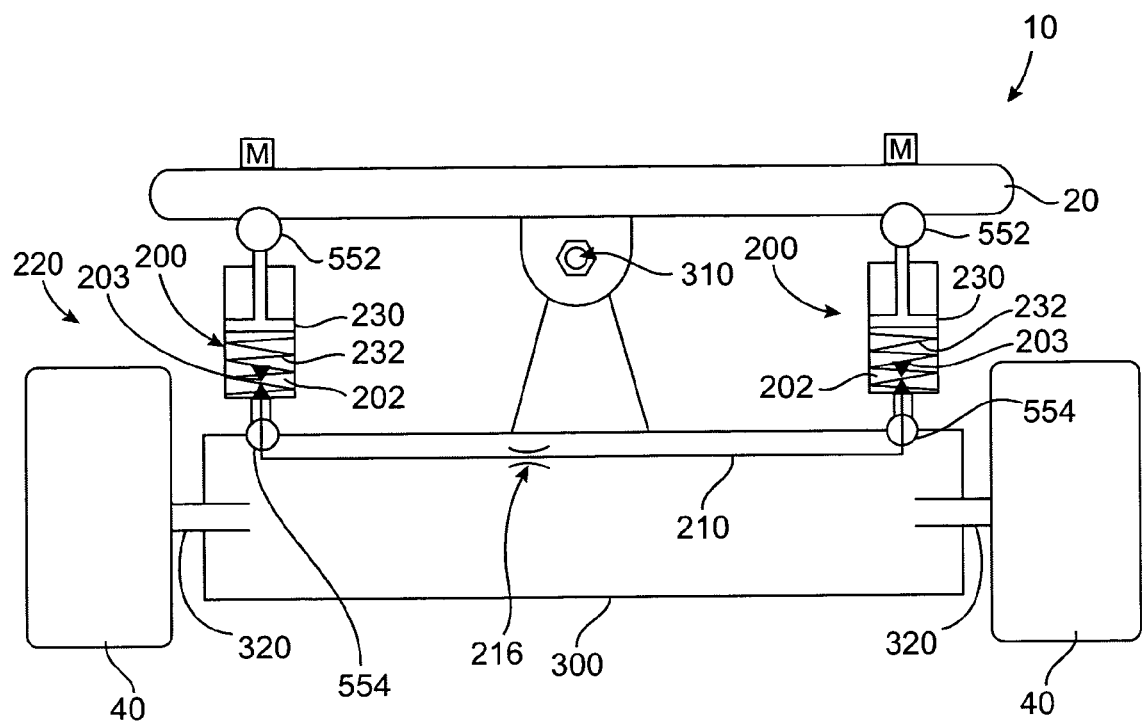
FIG. 22 shows a partial cutaway of a cross sectional end view of a skateboard including hydraulic circuitry symbols illustrating another embodiment.

FIG. 22 is an end view of a skateboard 10 comprising at least two hydraulic cylinders 200, each having at least one chamber 202, including a circuit diagram illustrating the hydraulic system 220. As noted by ISO 1219-1 prime mover symbol, M, the hydraulic system 220 is powered by the movement of the skateboard deck 20.

As shown in FIG. 22, the skateboard 10 comprises at least two hydraulic cylinders 200 affixed to the skateboard deck 20 at a first connection 552 and to the housing 300 at a second connection 554. Preferably one end of each hydraulic cylinder 200 is attached to the skateboard deck 20 with suitable pivoting or flexible connections 552. FIG. 22 shows a ball joint at the flexible connections 552,554; however, the hydraulic cylinders can be attached to the skateboard deck 20 and housing 300 with any suitable flexible or pivoting connection. The two hydraulic cylinders 200 are attached with suitable pivoting or flexible connections 554 to any convenient location on the housing 300. Each of the at least two hydraulic cylinders 200 are in fluid communication with the other via a conduit 210.

As shown in FIG. 22, each of the at least two hydraulic cylinders 200 is adapted to displace a hydraulic fluid from within the cylinder 200. For some hydraulic cylinders 200, the hydraulic cylinder 200 will comprise a piston 230, a chamber 202, and an inlet/outlet port 203, and a spring-like element 232 configured to provide resistance within the chambers 202 of the cylinder 200 when the hydraulic fluid is being displaced. It can be appreciated that the hydraulic cylinders 200 can be hydraulic single acting, double acting, telescopic, pneumatic, and rod-less, with or without springs or any other suitable hydraulic cylinder without departing from the present invention.

The device of FIG. 22 operates based on the gravitational force, centrifugal force and the force derived from the movement or dipping of the skateboard deck 20 to the left or the right or up and down to actuate the hydraulic cylinders 200. In operation, one of the hydraulic cylinders 200 compresses, while the other hydraulic cylinder 200 expands forcing the hydraulic fluid from the compressed hydraulic cylinder 200, after passing through the housing 300 of the truck and a conduit 310 into the expanding hydraulic cylinder 200. The expanding hydraulic cylinder 200 creates a volume of reduced pressure to suction the hydraulic fluid into the hydraulic cylinder 200.

The housing 300 as shown in FIG. 22 is a skateboard truck. The housing 300 is attachable to the skateboard deck 20 at a pivot point 310. It is preferable that the pivot point 310 is approximately equal distance (or symmetrically positioned) from each of the at least two hydraulic cylinders 200, however, it can be appreciated that the pivot point 310 can be at a distance that is not an equal distance nor centrally located. The housing 300 comprises at least one axle 320 adapted to receive at least one wheel 40.

The skateboard deck 20 is affixed to the at least two hydraulic cylinders 200. The movement of the skateboard deck 20 from a first position to a second position (i.e., side to side, or up and down) causes the hydraulic cylinders 200 to displace a hydraulic fluid from one of the at least two hydraulic cylinders 200 to the other hydraulic cylinder 200 which expands to receive the hydraulic fluid, which dampens or eliminates the vibrations that a skateboarder can experience as a result of the speed of the skateboard. The degree to which the fluid dampens the vibrations can be engineered by changing the dimensions of the conduit 210 to be more or less restrictive to fluid flow or by adding an adjustable restrictor valve 216.

The housing 300 comprises at least one axle 320 adapted to receive at least one wheel 40. The at least one axle 320 preferably protrudes from the housing 300 and is configured to receive a wheel 40. Preferably, the at least one wheel 40 is a skateboard wheel. The at least one skateboard wheel 40 is equipped with standard skateboard bearings. It can be appreciated that the skateboard can be equipped with one hydraulic truck in the front or rear of the skateboard and one standard truck at the opposite end of the skateboard. Alternatively, multiple hydraulic trucks can be mounted on the skateboard.

Figure 23:
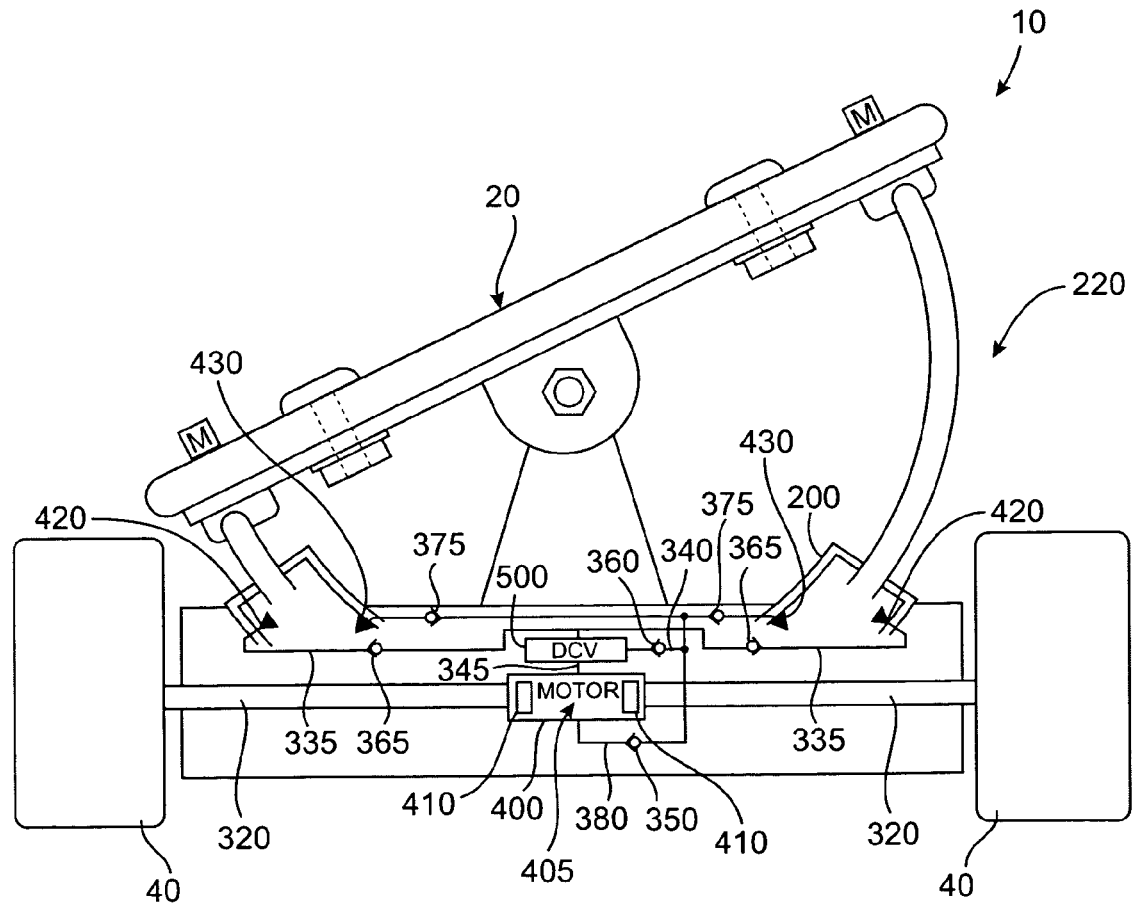
FIG. 23 shows a partial cutaway of a cross sectional end view of a skateboard including hydraulic circuitry symbols illustrating a further embodiment.
Figure 24:
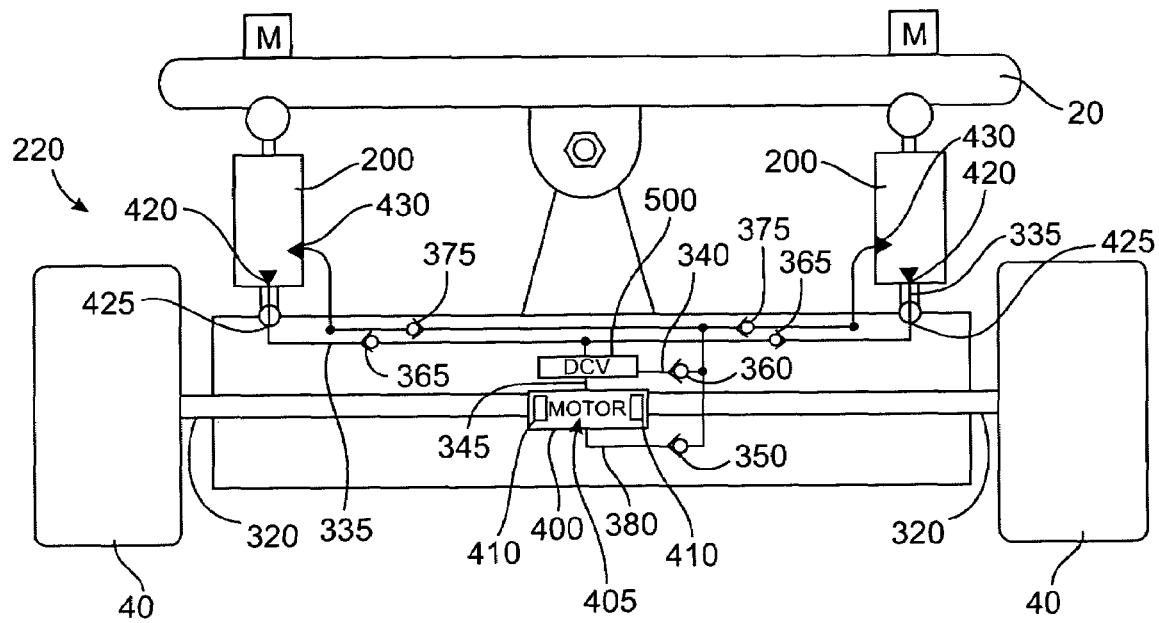
FIG. 24 shows a partial cutaway of a cross sectional end view of a skateboard including hydraulic circuitry symbols illustrating another embodiment.

FIGS. 23 and 24 show alternative embodiments of FIGS. 21 and 22, respectively, further comprising at least one hydraulic motor 400 adapted to receive the hydraulic fluid from either chamber 202 of the at least one cylinder embodiment as shown in FIG. 21 or from either of the at least two hydraulic cylinders 200 as shown in FIG. 22. The hydraulic motor 400 comprises at least one rotor 410 configured to rotate by the displaced hydraulic fluid creating torque to drive the at least one axle 320.

The hydraulic cylinders 200 are adapted to displace the hydraulic fluid from the hydraulic cylinders 200 when compressed. The hydraulic motor 400 is adapted to receive a displaced hydraulic fluid from the hydraulic cylinder 200 or the at least two hydraulic cylinders 200, wherein the rotor 410 of the hydraulic motor 400 is caused to rotate by the displaced hydraulic fluid creating torque to drive an axle 420 of a wheel 40.

FIGS. 23 and 24 include modified circuit diagram for an embodiment of an occupant-propelled device such as a skateboard having a fixed displacement or variable displacement hydraulic motor 400. FIGS. 23 and 24 show a hydraulic motor 400 having a pair of drive axles 320. The drive axles 320 preferably comprise at least one axle 320 that can be disengaged from the motor 400, such that the disengaged axle will be fixed and will not rotate. This fixed axle will contain a standard skateboard wheel equipped with standards skateboard bearings. Disengaging one of the drive axles from the motor enables the two wheels to rotate at different rotational velocities, which may be preferable for housings 300 which may be designed to also steer the device or skateboard. In addition, it can be appreciated that the motor 400 can have either one direction of rotational torque or two directions of rotational torque. The skateboard may be propelled by the rider in immediate response to the steering of the skateboard, whether turning left or right by providing torque to the drive axle 320 in response to the compression of the hydraulic cylinder or hydraulic cylinders 200 located symmetrically across a longitudinal axis of the skateboard deck 20 in the form of a skateboard deck.

The torque can be provided in either one direction of axial rotation or both, depending on the type and construction of the hydraulic motor. In addition, the direction of rotation for motors 400 with only one direction of torque can be either clockwise or counterclockwise depending on which side of the skateboard 10 the motor 400 is located and whether the hydraulic skateboard 10 is positioned at the front end or back end of the skateboard deck 20. Although torque may be provided in only one direction, the rotor 410, axles 320, or the wheels 40 mounted to them, can spin in either direction.

The hydraulic motor 400 can be a variable displacement motor, such as vane motors or axial piston motors or any other type hydraulic motor 400 that can provide variable displacement or fixed displacement capacity. If a variable displacement motor is used, the variable displacement motor is preferably pressure balanced, such that the rider will experience a relatively narrow range of resistive forces when turning, regardless of the speed at which the occupant is traveling on the skateboard. The variable displacement motor allows its displacement capacity to vary in response to the speed of the axial rotation of its internal components 405 and axles 320 and to the pressure delivered by the compression of the hydraulic fluid from one chamber 202 to the other chamber 202. It is the intent of this invention's design to allow the rider to feel a relatively consistent feel of resistance, within the inventions nominal range of operation, regardless of the speed at which the skateboard is traveling.

The skateboard deck 20 as shown in the FIGS. 23 and 24 are affixed to the at least one hydraulic cylinder 200 or the two cylinders 200, wherein the skateboard deck 20 is adapted to move from a first position to a second position to displace the hydraulic fluid within the hydraulic cylinders 200. The at least one wheel 40 is attachable to the axle 320 protruding from either the at least one cylinder 200 or housing 300 (FIG. 23) or the housing 300 (FIG. 24) and configured to provide the skateboard 10 a means to move laterally over a surface.

In operation, the skateboard 10 in the form of a skateboard is propelled forward by the shifting of the bodyweight of a rider of the skateboard. In operation, the rider propels the skateboard 10 by shifting their body weight to the left or the right. Typically, the skateboard will turn in response to the shifting of the platform from side to side or up and down. However, it can be appreciated that the at least one cylinder 200 or housing 300 (FIG. 23) or the housing 300 (FIG. 24) or skateboard truck can be configured to not turn when the skateboard deck 20 or deck of the skateboard is tilted to the left and right. As a result of the shifting of the rider's bodyweight, the skateboard deck dips to the left or right, respectively, which causes the hydraulic fluid located within the chambers of a cylinder 200 or the at least two hydraulic cylinders 200 to flow to the hydraulic motor 400. The internal components 405 within the hydraulic motor 400 are caused to rotate by the displaced hydraulic fluid creating torque to drive the axle 320 and the wheels 40.

The skateboard deck 20 as shown in FIGS. 19-24 is composed of fiberglass, metal, plastic, wood, or wood composite or any suitable material for a skateboard deck and may be configured to be constructed in one or more pieces. In addition, the skateboard deck 20 can have variable degrees of stiffness and flexibility to maximize the hydraulic system based on the weight of the rider and the riders skateboarding style, i.e. gradual turns or a more aggressive pumping action of the skateboard deck. It can be appreciated that although the skateboard deck 20 is shown as a skateboard deck, any type of skateboard deck 20 can be used, such that the skateboard deck 20 can be modified for use in moving furniture or other heavy items on a skateboard deck 20, wherein the apparatus is propelled by a rocking motion. In addition, it can be appreciated that a heavier item preferably would be on a different platform than those that compress the hydraulic cylinders. For example, a stable skateboard deck 20 can be used for the load. Meanwhile, separate rocking or alternating platforms for example a stair climbing type motion, can drive the hydraulic cylinder or cylinders 200. Alternatively, the system can be used with a plurality of platforms 560, 570 wherein each of the platforms 560, 570 controls a hydraulic cylinder 200 as shown in FIG. 25.

Figure 25:
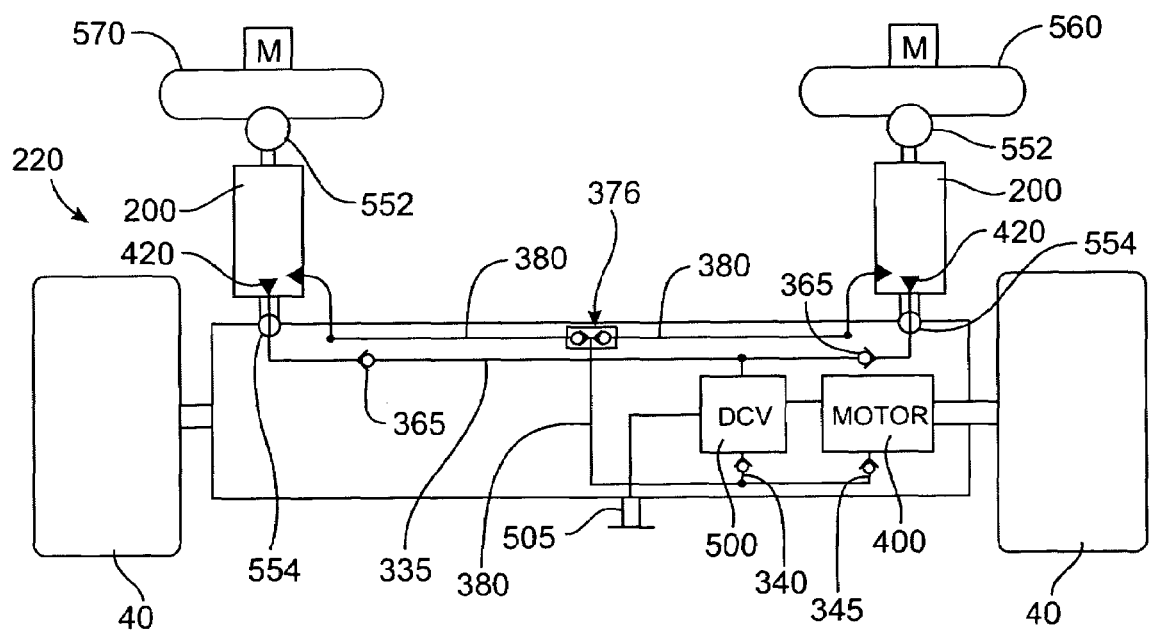
FIG. 25 shows a partial cutaway of a cross sectional end view of a skateboard including hydraulic circuitry symbols illustrating a further embodiment.

FIG. 25 illustrates an alternative embodiment of the present invention, wherein the platform 400 further comprises at least two separate platforms 560, 570. As shown in FIG. 25, each of the at least two separate platforms 560, 570 controls a hydraulic cylinder 200. Each hydraulic cylinder 200 is attached to the platform 560, 570 with suitable fixed, pivoting or flexible connections 552. The opposite end of each of the two hydraulic cylinders 200 is attached with suitable fixed, pivoting or flexible connections 554 to any convenient location on the housing 300. It can be appreciated that the embodiment shown in FIG. 25 can be adapted to any of the embodiments described herein. It can be appreciated that these alternate forms of platforms can integrated with any of the embodiments in FIGS. 19-24, 27-30 and 32.

Figure 26:
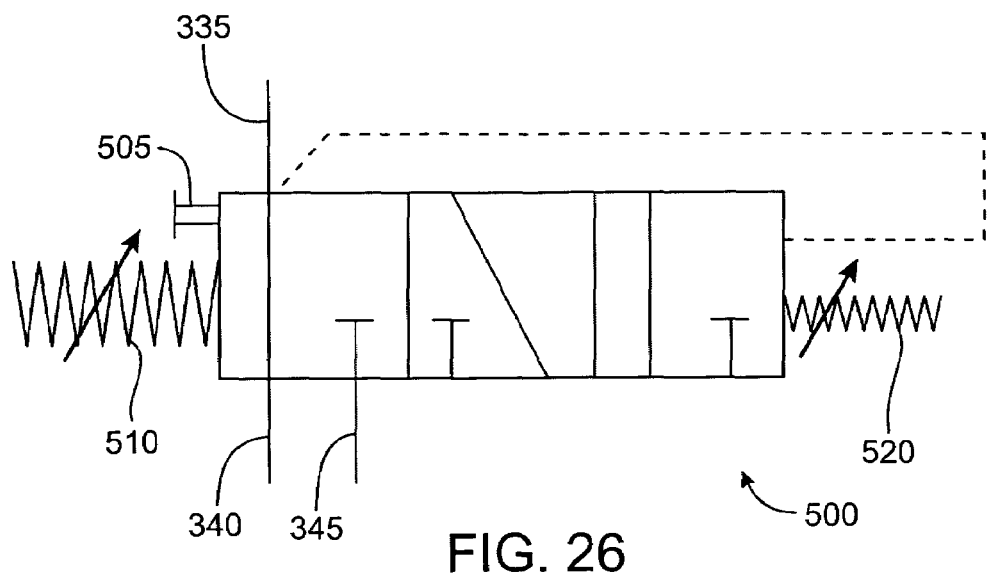
FIG. 26 shows a circuit diagram of a directional control valve.

It can be appreciated that the embodiments as shown in shown in FIGS. 23, 24, and 25 can further comprise a directional control valve 500 as shown in FIG. 26. The directional control valve 500 is configured to direct the hydraulic fluid to flow either through the hydraulic motor 400 or to bypass the hydraulic motor 400. The route the hydraulic fluid travels can be a function of the hydraulic pressure at the head of, or the pressure differentials across, the valve 500. For example, if the hydraulic pressure is too low or too high, the hydraulic fluid will bypass the motor 400, such that the motor's internal components 405 are allowed to spin freely. It can be appreciated that unless the hydraulic fluid is allowed to bypass the motor 400, the motor 400 may not have a free-spin state, which is desirable for coasting or gliding.

The directional control valve 500 preferably comprises a pair of tension screws to manually adjust one or more springs 510, 520 to minimum and maximum pressure settings. The minimum and maximum pressure settings define a range within which hydraulic fluids will engage the hydraulic motor 400. It can be appreciated that a sensor, a programmable microprocessor or other desirable device for setting a minimum and a maximum pressure range can be used. It can further be appreciated that a switch 505 can be used to lock the directional control valve 500 into a position that causes the hydraulic fluid to bypass the motor 400. If the switch is used to bypass the hydraulic motor 400, the switch effectively becomes an on/off switch for the motorized functionality of the invention. If pressures created by the compression of the hydraulic cylinder are within the manually adjusted operational range of the directional control valve 500, the hydraulic motor 400 will be engaged and may impart torque to the drive axle 320 of the hydraulic motor 400.

The hydraulic system 220 preferably provides a continuous variable transmission through the use of a variable displacement hydraulic motor rather than a fixed displacement hydraulic motor, such that at rest, the variable displacement hydraulic motor 400 is spring centered and has no volumetric displacement capacity and allows the internal components to spin freely without providing torque. At slower speeds, the motor's 400 volumetric capacity is increased towards its maximum by internal hydraulic pressure acting against the spring force to allow some relatively larger amount of fluid within the hydraulic system to pass through the variable displacement hydraulic motor 400 with fewer rotations of the motor's internal parts. As angular velocity of the drive axle 420 increases, the motor's volumetric per rotation displacement capacity automatically decreases and lets a relatively smaller amount of the fluid in the closed hydraulic system to pass through per rotation. Regardless of the speed at which the skateboard is traveling, when the motor 400 is engaged, a similar amount of hydraulic fluid passes through the motor 400 per unit of time and the motor 400 will continue to provide torque due to the automatically varying displacement capacity of the motor. Torque will diminish as the displacement capacity approaches zero at higher speeds, effectively defining the upper nominal range of operation at faster velocities. At zero displacement capacity the hydraulic motor 400 imparts no torque, allows no fluid to pass through, and the motor's internal components 405 will spin freely within the motor housing.

Torque is preferably provided by the hydraulic motor 400 in both directions of axial rotation clockwise and counter-clockwise, when they are engaged by an appropriate amount of hydraulic pressure. Alternatively, the hydraulic motor 400 can provide torque in only one direction of axial rotation, clockwise or counterclockwise, depending on the which side of the truck the motor 400 is located and the position of the trucks relative to the front or leading end of the skateboard. Additionally, each hydraulic motor 400 can have a no-torque resting state, which allows the drive axles 420 to rotate freely when the hydraulic pressures are not appropriate to engage the hydraulic motors 400.

The hydraulic motor 400 can further comprise a motor bypass valve 385 as shown in half of the motors 400 detailed in FIGS. 33 and 34, which alternately connects and disconnects direct fluid communication between inlet chamber 386 of the hydraulic motor 400 and the discharge chambers 388 of the hydraulic motor 400. The bypass valve 385 enables continuous fluid communication between the inlet and discharge chambers of the hydraulic motor 400 when the remaining fluids in the hydraulic system 220 are bypassing the hydraulic motor 400. The bypass valve 385 allows the hydraulic motor 400 to retain a non-zero displacement capacity in the motor's 400 free-spin state. When the bypass valve 385 is open, allowing fluid communication between the inlet 386 and discharge 388 chambers of the motor 400, the motor 400 does not have to return to a spring-centered zero displacement capacity state each time the motor 400 is disengaged from the system 220 or each time the cylinder 200 cycles between the compression and expansion phases. Rather, the motor 400 can retain non-zero displacement capacity, which the motor 400 may have adopted at the end of its last cycle of engagement by pressured hydraulic fluids. The next time the motor 400 returns to a state of engagement by pressurized fluids, the displacement capacity will be waiting at or near that level established during the prior cycle of engagement.

The bypass valve 385 also prevents the need for the displacement capacity to reset to zero during each cycle of engagement. The bypass valve 385 features will be especially effective when the axles retain a relatively constant state of angular velocity. So long as the angular velocity of the axles remains relatively constant, the motor's displacement capacity should remain relatively constant. The net effect of the bypass valve 385 is to prevent wear and tear on moving parts and to prevent the possibility of a jerky feel to the inventions function as the motor 400 would otherwise have to constantly cycle between zero displacement capacity when disengaged and a non-zero displacement capacity when the motor 400 is engaged.

The directional control valve 500 and its manually adjusted tension springs 510, 520 define the pressure range within which hydraulic fluids will engage the hydraulic motor 400 and generate non-zero displacement capacity within the motor and torque in the drive axle. Below or above this manually adjusted pressure range, the directional control valve 500 will divert hydraulic fluids and bypass the hydraulic motor 400. The pressure range within the directional control valve 500 is adjusted manually by adjusting a maximum pressure spring 510 and a minimum pressure spring 520. (See FIG. 26). At rest the directional control valve 500 is spring controlled by the maximum pressure spring 510, which provides greater force than the minimum pressure spring 520. Compression of the hydraulic cylinder 400 causes the hydraulic fluid to move from the hydraulic cylinder 200 to the directional control valve 500.

The directional control valve 500 has two end states, both of which cause the diversion of hydraulic fluids around the hydraulic motor 400, and one, or a continuum, of intermediate state that causes hydraulic fluids to engage the hydraulic motor 400. Below minimum pressures, defined by the manually adjusted tension on the minimum pressure tension spring 520, the hydraulic fluid does not engage the motor since the fluid is diverted through a bypass conduit 340 and around the hydraulic motor 400.

Alternatively, when hydraulic pressures at the directional valve 500 exceed maximum pressures defined by the manually adjusted settings of the maximum pressure tension spring 510, the hydraulic fluid does not engage the motor 400 since the fluid is diverted around the hydraulic motor 400. Between the minimum and maximum pressures defined by the manually adjusted settings of the minimum pressure tension spring 520 and the maximum pressure tension spring 510, fluids are directed by the directional control valve 500 to the hydraulic motor 400. It can be appreciated that it is not necessary to have an upper pressure range setting for this invention to function as designed. The upper pressure range setting for the direction control valve 500 is a safety feature that disengages the motor 400 if there is a system malfunction which involves excessive system 220 pressures. Drastically reducing the spring tension of the upper pressure setting can also function as a means of manually disengaging the ability of the system to provide torque while riding the skateboard.

As shown in FIGS. 23, 24, and 25, the hydraulic system 220 comprises a delivery conduit 335, the bypass conduit 340, a motor conduit 345, and a return conduit 380. In operation, the hydraulic fluid exits the hydraulic cylinder 200 through an exit port 420 into the delivery conduit 335. In the multiple cylinder embodiments of FIGS. 24 and 25, the delivery conduit 335 and the return conduit 380 preferably have sections with flexible hose or conduits to accommodate for the tilting or movement from side to side of the skateboard deck 20, cylinders 200, and housing relative to each other. However, it can be appreciated that any suitable conduit material can be used or that other fluid delivery routes between the cylinders and the housing can be accomplished. In the one cylinder embodiment shown in FIG. 23, the two chambers 202 of the cylinder 200 are preferably incorporated within the housing 300 of the hydraulic truck, such that the fluid communication occurs entirely within the housing 300. The delivery conduit 335 and the return conduit 380 are preferably contained entirely within the housing 300, as there is no differential motion required between the semi-circular housing of the single cylinder and the truck housing 300.

In the at least two hydraulic cylinder 200 embodiments shown in FIGS. 24 and 25 the hydraulic fluid flows from the hydraulic cylinders 200 through the exit port 420 and enters the housing 300 through an entrance port 425 into the delivery conduit 335. In the single cylinder embodiment shown in FIG. 23 there is not a need for the entrance port 425, which is designed to receive fluid delivered through a ball joint coupling 554. The delivery conduit 335 in all embodiments of FIGS. 23, 24, and 25 preferably has a first check valve 365, which prevents the hydraulic fluid from flowing into the hydraulic cylinder 200 through the delivery conduit 335. The hydraulic fluid then flows through the delivery conduit 335 from one cylinder chamber 202 to a junction of the delivery conduit 335 from the other or cylinder chamber 202 and a continuation of these conduits 335 to the directional control valve 500. Fluid from both delivery conduits 335 can only travel to the directional control valve 500, which directs the hydraulic fluid through the motor conduit 345 to the hydraulic motor 400 or to the bypass conduit 340.

The fluid passing through the hydraulic motor 400 exits the motor through return conduit 380. The fluid bypassing the hydraulic motor through bypass conduit 340 joins the return conduit 380. Fluid in the return conduit can flow in only one direction, which is controlled by check valves 350 and 375. Check valve 350 specifically prevents the backflow of fluids through the hydraulic motor 400. Check valve 360 prevents the backflow of fluids in the bypass conduit 340 through the directional control valve 500.

The hydraulic pressure in the delivery conduit 335, which is located upstream of the directional valve 500, provide pressure assistance to the minimum pressure tension spring 520, and directs force against the tension provided in the maximum pressure tension spring 510. The pressure range within which the directional control valve 500 will direct fluid to engage the hydraulic motor 400 can be adjustable by manually adjusting the tension on the springs 510, 520 via screws or knobs or any other suitable controlling mechanism whose controlling elements may be exposed on the exterior of the truck housing and attached to tension springs 510, 520. When the combination of upstream fluid pressure in conduit 335 and the minimum spring 520 pressure just exceeds the maximum spring 510 pressure, the directional control valve 500 will shift to an intermediate state referred to as the working pressure range. Within the working pressure range fluid will flow through motor conduit 345 to the hydraulic motor 400.

Outside of working pressure range, hydraulic fluids will bypass the motor 400 through the bypass conduit 340, and a free spin state will be established within the motor 400 and axles 320. In this embodiment, the hydraulic fluid discharged through the hydraulic motor 400 or bypassed around the hydraulic motor 400 enters the return conduit 380. The hydraulic fluid is suctioned into the opposing hydraulic cylinder 200 located on the opposite side of the housing, in a symmetrical position around the centerline of the skateboards longitudinal axis through the return conduit 380. Return conduit 380 splits at a junction and allows fluid to flow to either of the two hydraulic cylinder chambers 202. The route the fluid takes will be determined by the compression and expansion phases of the hydraulic cylinders 200. Hydraulic fluids in return conduit 380 will flow to the hydraulic cylinder chamber 202, which is expanding. Fluids within the hydraulic cylinders 200 are prevented from flowing backwards through return conduit 380 by a pair of check valves 375. Alternatively, a single directional check valve 376 (See FIG. 25) located at the junction that splits the return conduit 380 into two paths can replace the pair of check valves 375. The return conduit 380 returns the hydraulic fluid to the hydraulic cylinder 200 through an entrance port 430.

The system 220 preferably has one direction of fluid flow into the hydraulic motor 400, such that hydraulic fluid collected in the return conduit 380 and returning to one of the at least two hydraulic cylinders 200 is prevented by return check valves 350, 360 from flowing back through the motor 400 or through the bypass conduit 340 in the opposite direction, respectively. It can be appreciated that the system 220 can be designed to operate by allowing fluids to flow both directions through the motor 200. In the current embodiment the motor 400 allows fluids to pass through in only one direction such that the inlet 386 and discharge ports 388 on the motor 400 cannot be interchanged, wherein the fluid flow is into the inlet port only. In this embodiment the motors can be single-rotation or bi-rotational motors, wherein the torque can be provided in only one or in both direction of axial rotation, respectively. If the hydraulic motor is not engaged it will have a zero-displacement capacity (unless the motor is equipped with bypass valve 385) and will be in a free-spin resting state.

Check valves 375 prevent the back flow of fluid from one hydraulic cylinder chamber 202 to the other hydraulic cylinder chamber 202. It can be appreciated that although the flow of hydraulic fluid is through conduits, other suitable devices can be used for the flow of the hydraulic fluid in the hydraulic system 220.

The embodiments as shown FIGS. 23, 24, and 25 can incorporate the full suite of types of motors as shown in FIG. 33: single or dual directions of torque, single or variable displacement, single or dual axle. Alternatively if a fixed displacement motor is implemented, the system should include bypass valve 385 (see FIGS. 33 and 34) but could be designed without it.

Figure 27:
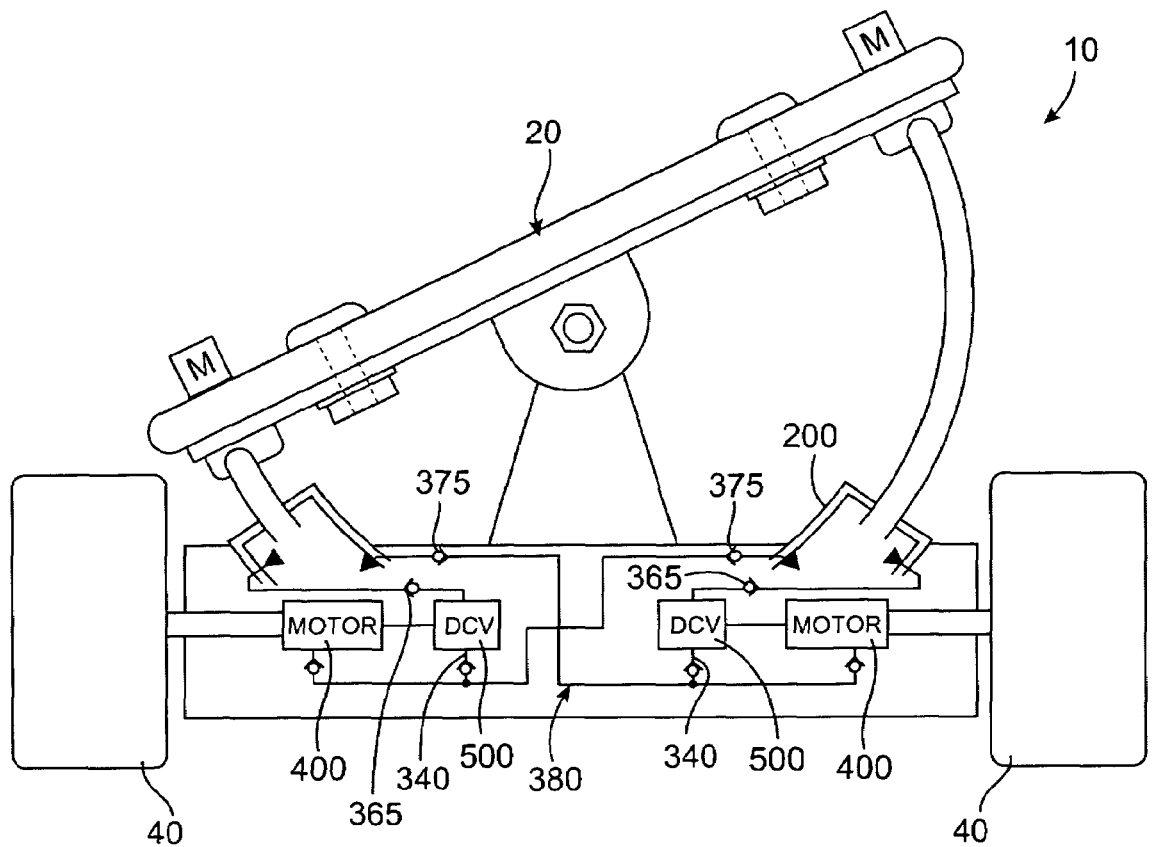
FIG. 27 shows a partial cutaway of a cross sectional end view of a skateboard including hydraulic circuitry symbols illustrating another embodiment.
Figure 28:
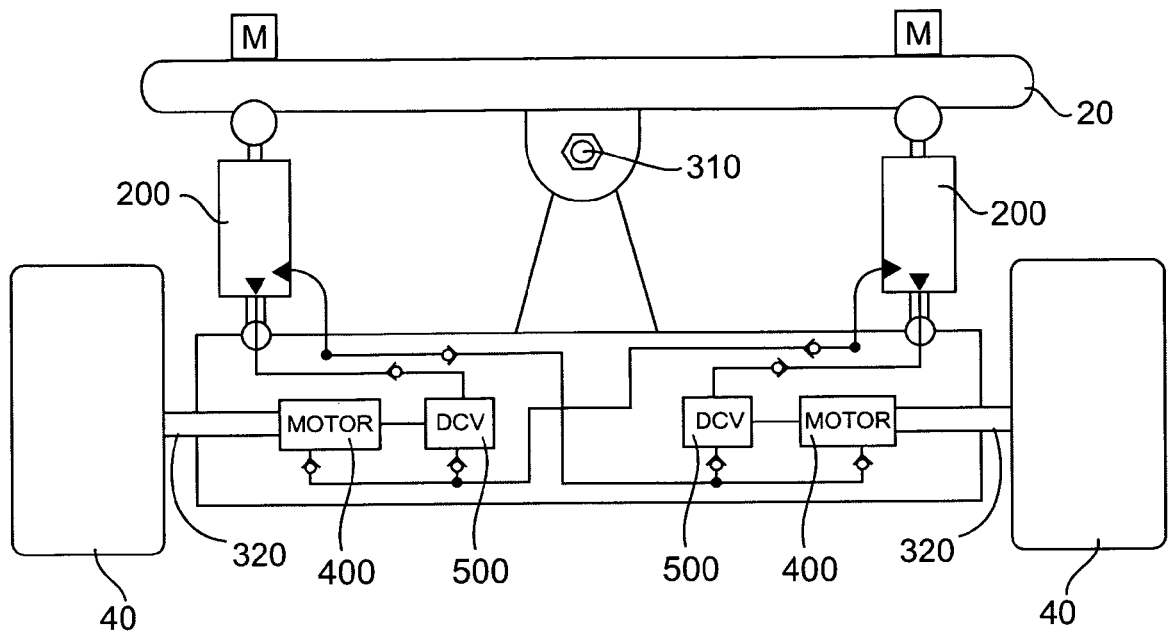
FIG. 28 shows a partial cutaway of a cross sectional end view of a skateboard including hydraulic circuitry symbols illustrating a further embodiment.

FIGS. 27 and 28 illustrate circuit diagrams for a further embodiment having multiple motors and multiple directional control valves. Functionally it operates much like the prior embodiment referencing FIGS. 23 and 24 with the distinct addition of two hydraulic motors 400 and directional control valves 500. In this embodiment, the rider propels the skateboard in immediate response to the steering the device either left or right. This embodiment can have one drive direction forward and can free spin in the other direction or the embodiment can have two directions of rotation. It can be appreciated that the hydraulic motors 400 can be any suitable types of hydraulic motors. In addition, it can be appreciated that if the hydraulic motors are variable displacement motors, the motors 400 may or may not include the bypass valve 385. If the motors 400 are fixed displacement motors, then the bypass valve 385 is preferably included.

As shown in FIGS. 27 and 28, the hydraulic motors 400 are located within the housing 300 or skateboard truck, and provide torque to the drive axles 320. Throughout this description there are dual and symmetric functional elements one directional control valve, motor, conduits drives and controls one axle, the other set of symmetrical components controls the other axle. Dual components allow the system to be propelled by one or the other motors 400 and allow the dual components to have different angular velocity for opposite wheels at the same time. Variable angular velocity in opposite wheels provides the skateboard 10 with the ability to drive axles 320 which, during steering or turning, are rotating at different rotational velocities. The hydraulic motors 400 can be engaged in immediate response to the compression of one or the other hydraulic cylinders 200. The two hydraulic cylinders 200 are located symmetrically across the longitudinal axis of skateboard deck.

In the single cylinder embodiment shown in FIG. 27 the delivery conduit 335 from one hydraulic cylinder chamber 202 can be connected to either one or the other directional control valves 500. Regardless of which directional control valve 500 the delivery conduit 335 is connected to for a given cylinder chamber 202, the return conduit 380 must lead to the opposite cylinder chamber 202. The difference between these two alternative connection schemes determines whether the wheels on the outside of the turn or the wheels on the inside of the turn may be engaged by its respective motor 400. Conceivably, if the wheels 40 and axles 320 connected to the motors 400 on the inside of the turn provide the torque; the vehicle may achieve greater speeds than the alternative connection scheme.

Figure 29:
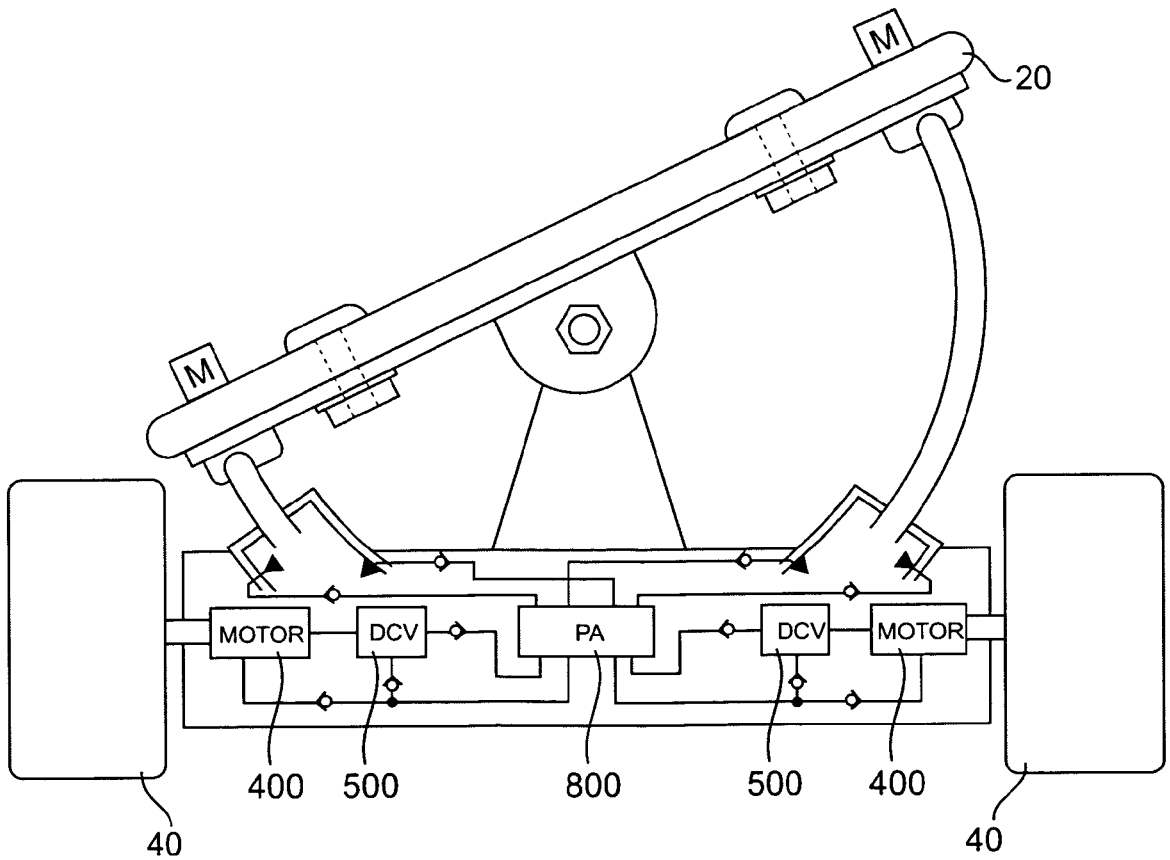
FIG. 29 shows a partial cutaway of a cross sectional end view of a skateboard including hydraulic circuitry symbols illustrating another embodiment.
Figure 30:
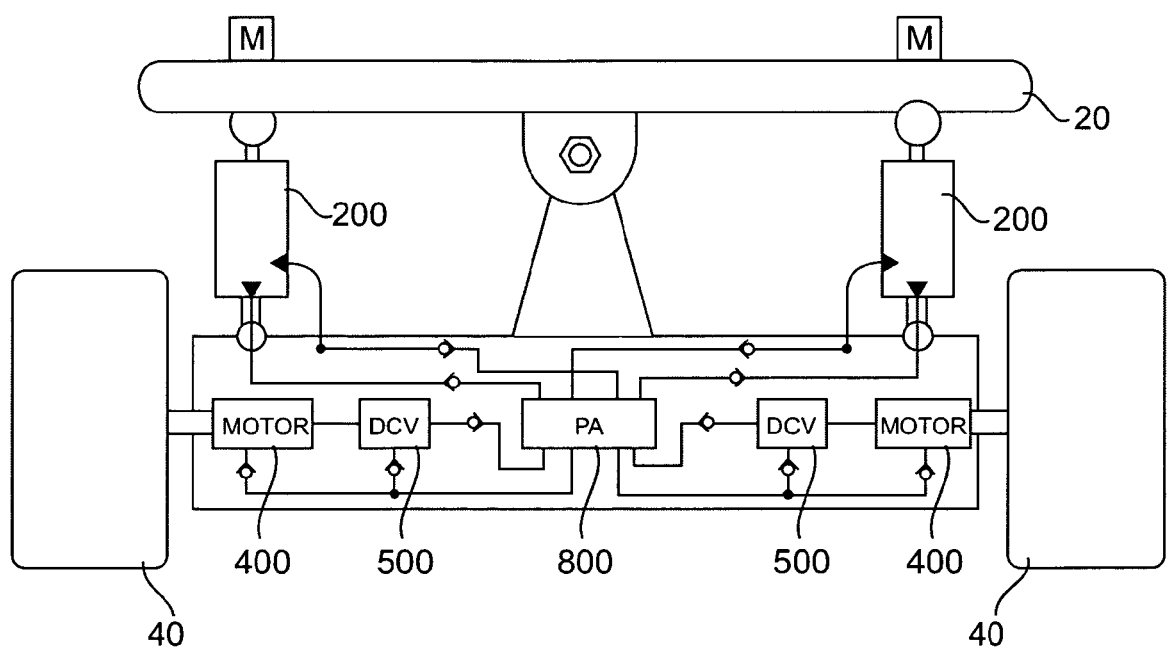
FIG. 30 shows a partial cutaway of a cross sectional end view of a skateboard including hydraulic circuitry symbols illustrating a further embodiment.

FIGS. 29 and 30 illustrate a circuit diagram for another embodiment having a delayed-drive system. The system comprises at least two motors 400, at least two directional control valves 500 and a piston or gas accumulator 800. In this embodiment, the rider propels the skateboard in a delayed and indirect response to the steering of the skateboard, whether turning left or right. In prior embodiments the compression of hydraulic cylinders created pressures that, when in a user defined range of pressure, was in direct fluid communication with the hydraulic motors that propelled the skateboard. In the prior embodiments the skateboard was propelled in immediate response to the compression of the hydraulic cylinders. In this present embodiment the skateboard is propelled in delayed response to the steering of the skateboard. Energy can stored when the platform deck is rotated in one direction and this potential energy can be released to propel the skateboard when the platform is rotated in the other direction.

The delayed response provides a sensation for the rider that is more similar to the gains and losses in speed encountered when turning, curving, and straightening ones path when snowboarding downhill, or surfing ocean waves. In these sports, the motion of turning tends to slow the rider and speed is typically gained when straightening the path of travel when the radius of curvature of the turn increases. The current embodiment is designed to provide a similar sensation.

Functionally it is proposed that the torque provided by the hydraulic motor 400 in the present embodiment will have less force to overcome than prior embodiments and that greater speeds will be possible as a result. The frictional or rolling resistance of the skateboard increases as the rider steers the skateboard into a tighter turning radius because centrifugal loading increases on the platform. Transferring the energy generated by the dipping deck instantaneously into the propulsion of the skateboard means that there will be greater frictional resistance for the skateboard will have to overcome. If, on the other hand, the energy is stored temporarily in a gas accumulator or piston accumulator, and released at a later time in the turning cycle when the riders centrifugal loading and perhaps gravitational loading is decreased, then the system will have less frictional resistance to overcome at the time the energy is released. Greater speeds will then be achievable. As one hydraulic cylinder 200 compresses, the radius of curvature of the skateboard's path of travel decreases. The fluid displaced by compressed hydraulic cylinder 200 is forced, under pressure, into storage, within a functional unit herein referred to as a piston accumulator 800. At that moment in time when the turning motion of the skateboard has its shortest radius of curvature, the centrifugal and gravitational loads of the rider are peaking for that cycle of compression within the turn. Following this peak the rider begins to straighten his turn, expands the formerly compressed hydraulic cylinder 200 and "unweights" his centrifugal and gravitational loads. Skateboard decks or platforms 20 with greater elasticity will accentuate this unloading effect. It is in this next moment following the peak of the centrifugal loading that the piston accumulator 800 releases the stored hydraulic pressure stored within it. This stored hydraulic pressure is able then to act upon a system whose external loads are being lightened, thereby offering the potential of greater speeds, effectively providing a bouncy, sling-shot feeling of propulsion as the rider comes out of his turns. It is this delayed-drive response that will provide a more natural feel similar to that of snowboarding or surfing. Potential energy to propel the skateboard is created when the skateboard is turned either left or right. This potential energy is stored in a device referred to herein as a piston or gas accumulator 800 located in the hydraulic circuits between the hydraulic cylinders 200 on one side and the directional control valves 500 on the other side. Energy is stored in the piston accumulator 800 during the compression of one hydraulic cylinder 200 in a multiple cylinder embodiment or one of the two chambers 202 in the single hydraulic cylinder 200 embodiment and is retained there until the radius of the turn begins to increase when the path of the skateboard begins to straighten coming out of the turn or when the compressed hydraulic cylinder 200 begins to expand. The potential energy is then released from the piston accumulator 800 and made available to one of the hydraulic motors 400.

As illustrated in FIGS. 29 and 30, the delayed-drive system preferably comprises two directional control valves 500, two hydraulic motors 400, two axles 320, at least two wheels 40, and a piston accumulator 800. The delayed-drive system can be used with the single cylinder 200 or the at least two hydraulic cylinder 200 embodiments as shown in FIGS. 19, 23-25, 27, and 28. In operation, the system incorporates a piston accumulator 800 with a hydraulic motor 400 comprising a fixed displacement or a variable displacement configuration. In addition, the hydraulic motors 400 preferably provide torque in one direction of rotation or both directions of rotation. Preferably a hydraulic motor 400 is positioned on each side of the truck housing 300. A rider stands on the skateboard and shifts their body weight left or right to turn the skateboard. The skateboard deck dips to the left or right, respectively, in response to the shift in the rider's weight. Gravitational force, centrifugal force and the force derived from the dipping of the skateboard left or right will actuate hydraulic cylinders 200. The hydraulic cylinder 200 on one side compresses and the other hydraulic cylinder 200 on the other side simultaneously expands the same amount. This pattern of compression and expansion of the two hydraulic cylinders 200 alternates back and forth as the skateboard is turned repeatedly from left to right.

As illustrated in FIGS. 29 and 30, two hydraulic motors 400, located within skateboard truck 300, provide torque independently to drive two different axles 320. Each hydraulic motor 400 drives one axle 320. Throughout this description there are dual and symmetric functional elements. The hydraulic motors 400 can be engaged in delayed and indirect response to the compression of one or the other hydraulic cylinders 200. The compression of hydraulic cylinder chamber 202 builds potential energy within a piston accumulator 800. The potential energy stored in the piston accumulator 800 drives the hydraulic motors 400.

Figure 31:
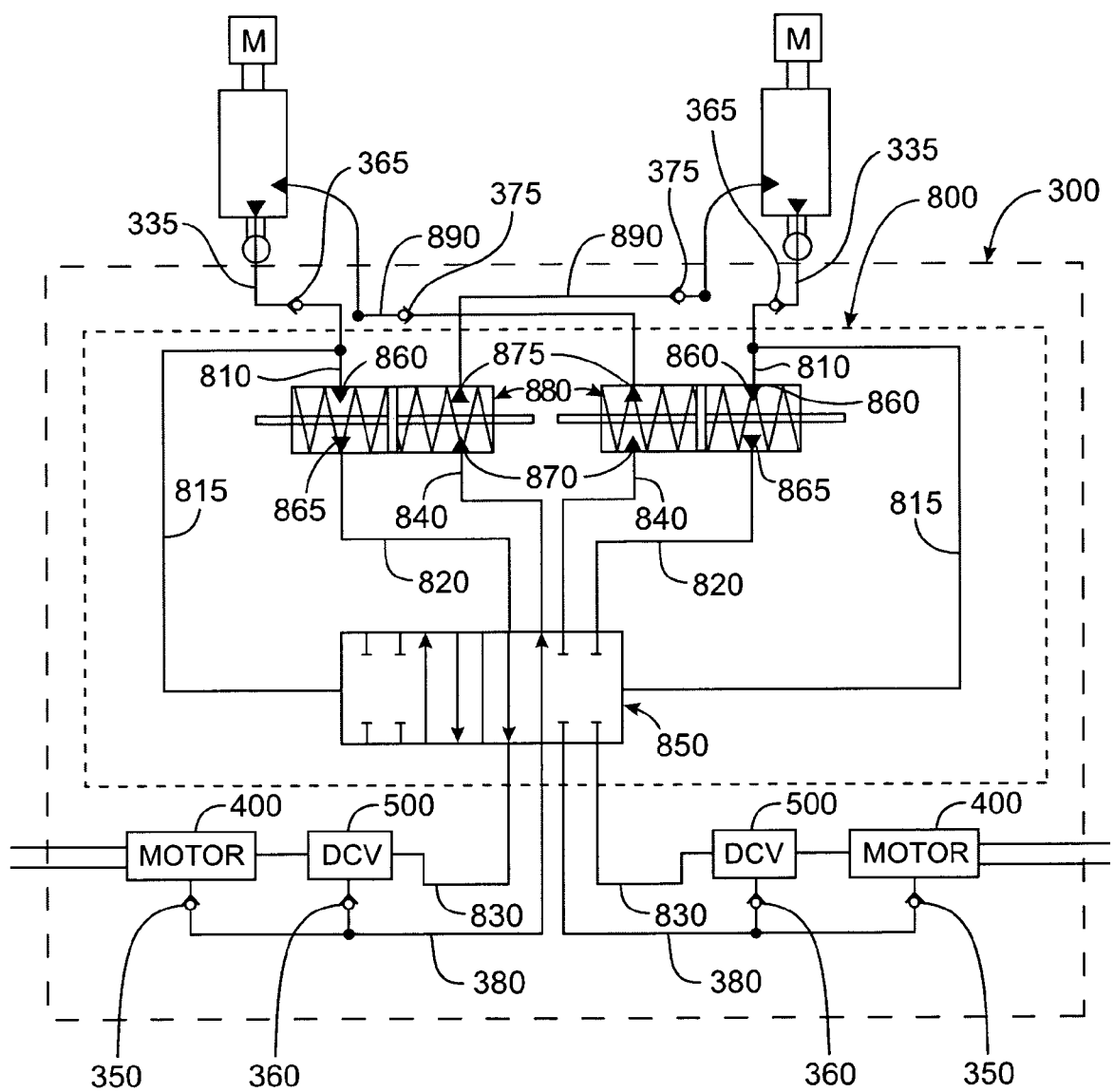
FIG. 31 shows a hydraulic circuitry diagram of a piston accumulator.

FIG. 31 shows the piston accumulator 800 comprising two dual-chambered, double-ended-piston-rod, spring-centered hydraulic cylinders 880, wherein each hydraulic cylinder comprises at least two inlet ports 860, 870, two outlet ports 865, 875, one for each of the two chambers of each double ended hydraulic cylinder 880, a directional control valve 850, and a series of conduits through which hydraulic fluids are directed. It can be appreciated that there are other methods of designing an element herein referred to as a piston accumulator that have the same or similar function of alternately storing and releasing hydraulic potential energy to a hydraulic system without deviating from the present invention. In operation, fluids accumulating in the expanding chamber of the double-ended-piston-rod cylinder 880 are stored under pressure and prevented from escaping the chamber through exit port 865 by the piston accumulator's directional control valve 850, so long as the compressing hydraulic cylinder 200 continues its compression phase. The directional control valve 850 is, itself, controlled by the compression and expansion of hydraulic cylinders 200. During the compression phase of hydraulic cylinder 200 fluids within conduit 815 force the directional control valve into one of two end states. In the first end state, the piston accumulator's directional control valve 850 allows the communication of fluids between one of the two double-ended-piston-rod cylinders 880 in the piston accumulator 800 and one of the directional control valves 500. During this same initial end-state of the piston accumulators directional control valve 500, fluids are prevented from communicating between the other double-ended-piston-rod cylinders 880 in the piston accumulator 800 and the other directional control valve 500.

At the point the rider begins to straighten out of the turning skateboards minimum radius of curvature, the compressed cylinder 200 begins to expand. At this moment the piston accumulator's 800 directional control valve 850 shifts to its second of two end states. In this second end state the roles of the two double-ended-piston-rod hydraulic cylinders 880 reverse. The double-ended-piston-rod hydraulic cylinder 880 that formerly was storing pressurized fluid is now releasing this stored energy through exit port 865 through conduit 820 through the piston accumulator's directional control valve 850 to delivery conduit 830 to directional control valve 500. This fluid either passes through the hydraulic motor 400 or bypasses the hydraulic motor 400 and returns through return conduit 380 back to the piston accumulator's 800 directional control valve 850. This returning fluid passes through the piston accumulator's 800 directional control valve 850 through conduit 840 and then through the inlet port 870 on the expanding side of the double-ended-piston-rod hydraulic cylinder 880.

In operation, the chambers within the two double-ended-piston-rod hydraulic cylinders 880 function very much like the chambers of a heart. A plurality of valves allows the hydraulic fluid to flow into the piston accumulator 800 within the chamber in a single direction. The valves allow the hydraulic fluid to escape with the heart compresses and forces the fluids into the circulatory system. Once the compressed hydraulic cylinder 200 begins to expand, the potential energy stored within the first piston accumulator is made available to engage one of the hydraulic motors and to propel the vehicle. At the same time energy is released from one of the chambers of the piston accumulator 800 on one side of the skateboard truck, the other chamber of the piston accumulator 800 is being stored with potential energy from the compression of the other formerly expanding now compressing hydraulic cylinder 200.

As shown in FIG. 31, the hydraulic fluid is delivered from the hydraulic cylinder or cylinders 200 through the delivery conduit 335 to the piston accumulator 800. The hydraulic fluid exits the piston accumulator through a directional control delivery conduit 830, which connects the piston accumulator 800 to the directional control valve 500. As with the other embodiments, the hydraulic fluid is delivered to the motor 400 via conduit 345. With a piston accumulator 800, the return conduit 380 terminates at the piston accumulator 800 and a return conduit 890 connects the piston accumulator to the hydraulic cylinders 200.

In the single cylinder embodiment shown in FIG. 29 the delivery conduit 830 from the piston accumulator 800 can be connected to either one or the other directional control valves 500. Regardless of which directional control valve 500 the delivery conduit 830 is connected to, the return conduit 380 must lead to the appropriate connection on valve 850 such that fluid passing through one direction control valve 500 returns to the same double ended piston rod cylinder 880 from which it derived. The difference between these two alternative connection schemes determines whether the wheels on the outside of the turn or the wheels on the inside of the turn may be engaged by its respective motor 400. Conceivably, if the wheels 40 and axles 320 connected to the motors 400 on the inside of the turn provide the torque; the vehicle may achieve greater speeds than the alternative connection scheme.

The directional control valve 500 directs the hydraulic fluids through the hydraulic motor 400 or to the bypass conduit 340. As with the other embodiments as shown in FIGS. 23-28, the route the fluid travels will be a function of the hydraulic pressure at the head of the directional valve 500. If pressures are too low or too high the fluid will bypass the motor 400. If pressures are within the manually adjusted operational range, the hydraulic motors will be engaged and impart torque to the drive axle of the hydraulic motor 400.

In a two-cylinder embodiment, compression of either of the hydraulic cylinders 200 will cause hydraulic fluid to discharge from the hydraulic cylinders 200 through a discharge port 420 through the delivery conduit 335 to the piston accumulator 800. Check valves 350, 360, and 375 prevent fluid from flowing the wrong direction in the conduits 335, 340, 345, 890 and 380, the hydraulic motors 400, directional control valve.

Figure 32A:
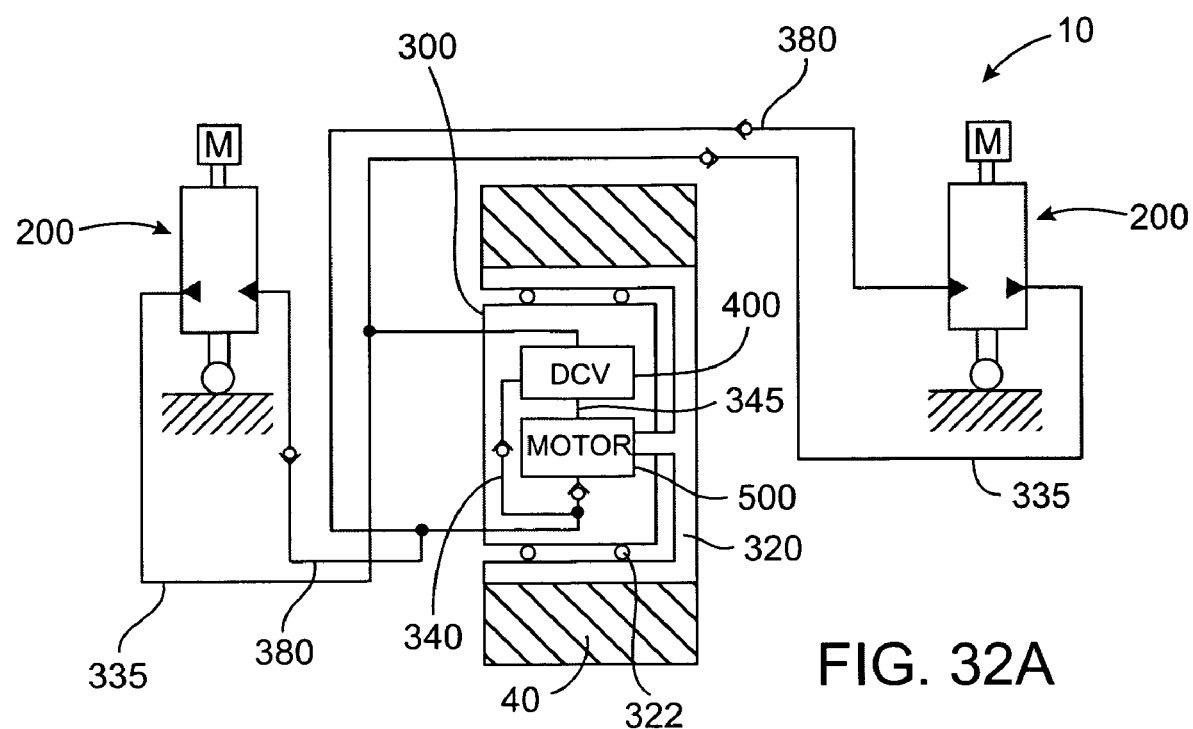
FIGS. 32A-32B show a partial cutaway of a cross sectional end view of a single wheeled device including hydraulic circuitry symbols.

FIGS. 32A and B are alternative embodiments of a skateboard 10 comprising a single wheel 40. The hydraulic circuitry of this embodiment may be identical to that shown in FIG. 23, 24, or 25. It can be appreciated that the rotational motor need not drive a wheel, but may drive any axle or rotor of a device that requires rotational force, velocity or torque. The skateboard 10 comprises at least one hydraulic cylinder 200, a hydraulic motor 400, a directional control valve 500 and a wheel 40. In FIGS. 32A and B, the hydraulic motor 400 and directional control valve 500 are located adjacent to or within the wheel 40. As shown, the wheel 40 surrounds the axle 320.

Figure 32B:
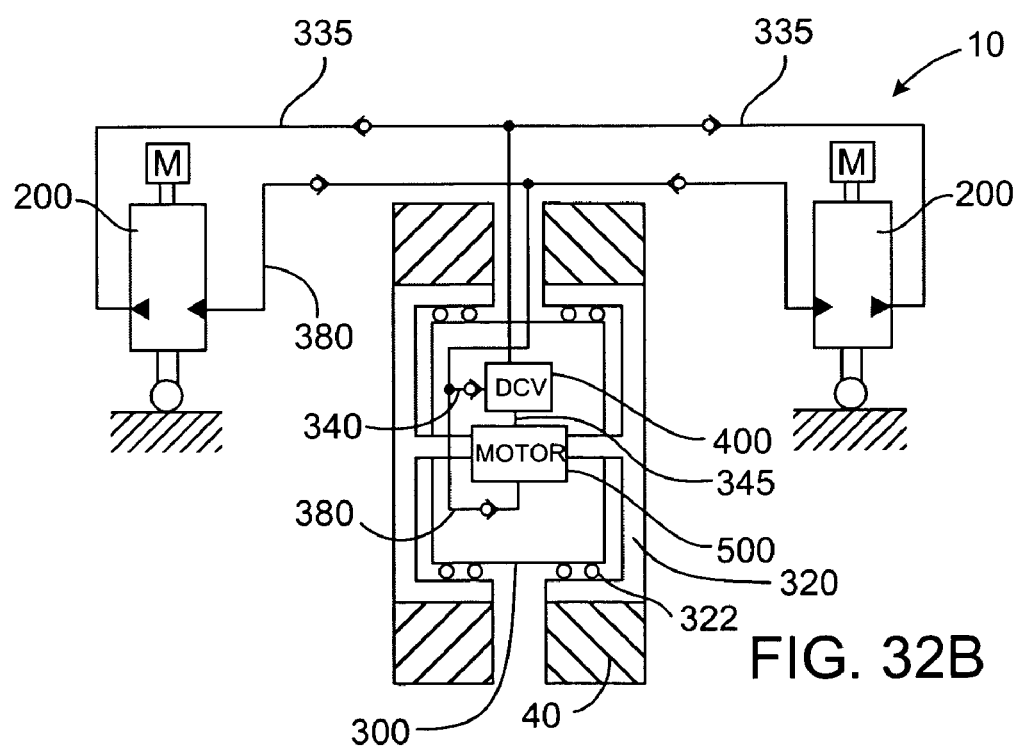

FIGS. 32A and 32B are single wheeled 40 devices comprising two hydraulic cylinders 200, a hydraulic motor 400 and a directional control valve 500 positioned within the interior of the wheel 40. It can be appreciated, as in other embodiments of the skateboard 10 that the system can be constructed with a single hydraulic cylinder.

As shown in FIGS. 32A-B the hydraulic skateboard 10 comprises at least two hydraulic cylinders 200 attachable to a wheel 40 having a hydraulic motor 400 located therein. The hydraulic skateboard comprises a skateboard deck 20, at least two hydraulic cylinders 200, and a hydraulic motor 400 located within at least one wheel 40. It can be appreciated that any suitable connection between the hydraulic cylinder 200 and the skateboard deck 20 can be used and that any type of hydraulic or pneumatic cylinder can be used.

It can be appreciated that the radial load on the internal components of the motor can be minimized by the extension of the axle 320 to wrap around or surround the housing 300 of the motor 400. In this situation, bearings 322 can be used between the housing 300 and the wrap-around axle 320 to bear the load and significantly reduce radial loading on the axle 300. This aspect of wrapping the axle 320 around the housing 300 can be used on any of FIGS. 19-32 or any hydraulic motor 400 for any function to reduce the radial loads.

FIG. 33 shows a reference table of potential motors that could be used for the hydraulic motor 400 and shown in FIG. 34. Column 1 includes a variety of fixed displacement motors, column 2 includes variable displacement motors, column 3 includes fixed displacement motors with bypass valve 385, and column 4 includes variable displacement motors with bypass valve 385. Five rows are included within FIG. 33. Row A shows the general ISO 1219-1 hydraulic circuitry for motors without specification of details of the motor type. Row B shows single-axle/single-torque-direction motors, Row C shows single-axle/bi-directional-torque motors, Row D shows dual-axle/single-torque-direction motors, and Row E shows dual-axle/bi-directional-torque motors. It can be appreciated that each of the hydraulic motors can be replaced with pneumatic motors and the hydraulic system 220 can be replaced with a similar pneumatic system without departing from the present invention.

Figure 34P:
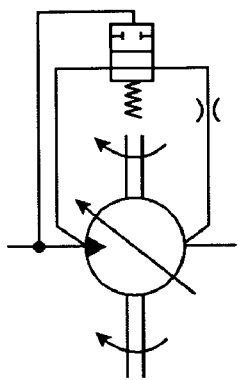
Figure 34T:
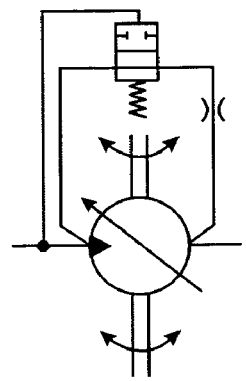
Figure 34O:
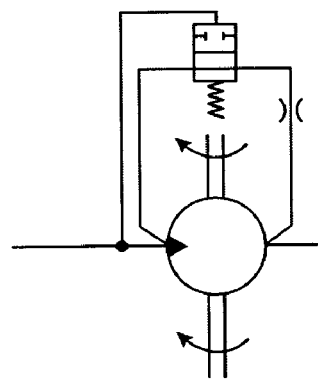
Figure 34S:
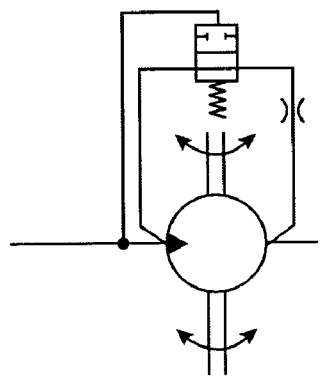
Figure 34N:
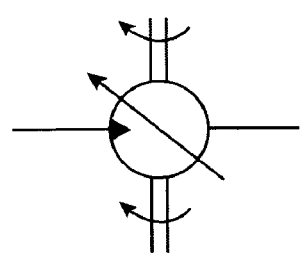
Figure 34R:
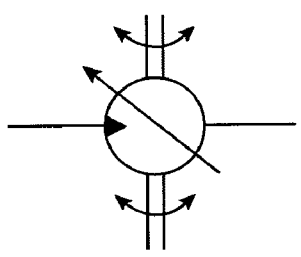
Figure 34M:
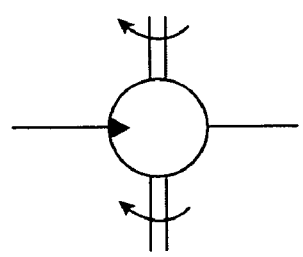
Figure 34Q:
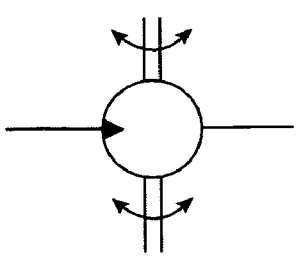

FIGS. 34A-34T is a series of ISO 1219-1 hydraulic circuit diagrams showing many different hydraulic motors referenced by FIG. 33 that can be used in any of the embodiments as shown in FIGS. 23-25, 27-30, 32. It can be appreciated that other types of motors can be used for the motor 400 other than those shown in FIGS. 33 and 34 without departing from the present invention. It can be appreciated that the motor 400 can be either hydraulic or pneumatic without departing from the present invention.

In addition, the devices and skateboards as shown among FIGS. 19-32 can be equipped with one hydraulic truck and one standard truck, or with two hydraulic trucks. In addition, in an alternate embodiment, the hydraulic motors including any torque generating mechanisms can be entirely located within the skateboard wheel rather than within the truck, enabling the hydraulic motorized wheels on any standard skateboard trucks.

The devices or skateboards as shown among FIGS. 19-32 also can include an on/off switch configured to allow the system to operate in two different modes. In the first mode or "off" mode, the hydraulic system does not engage the motor and wheels, such that the wheels are in a free spin mode. In the second mode or "on" mode, the hydraulic system engages the motor under the user defined pressure ranges.

Figure 35:
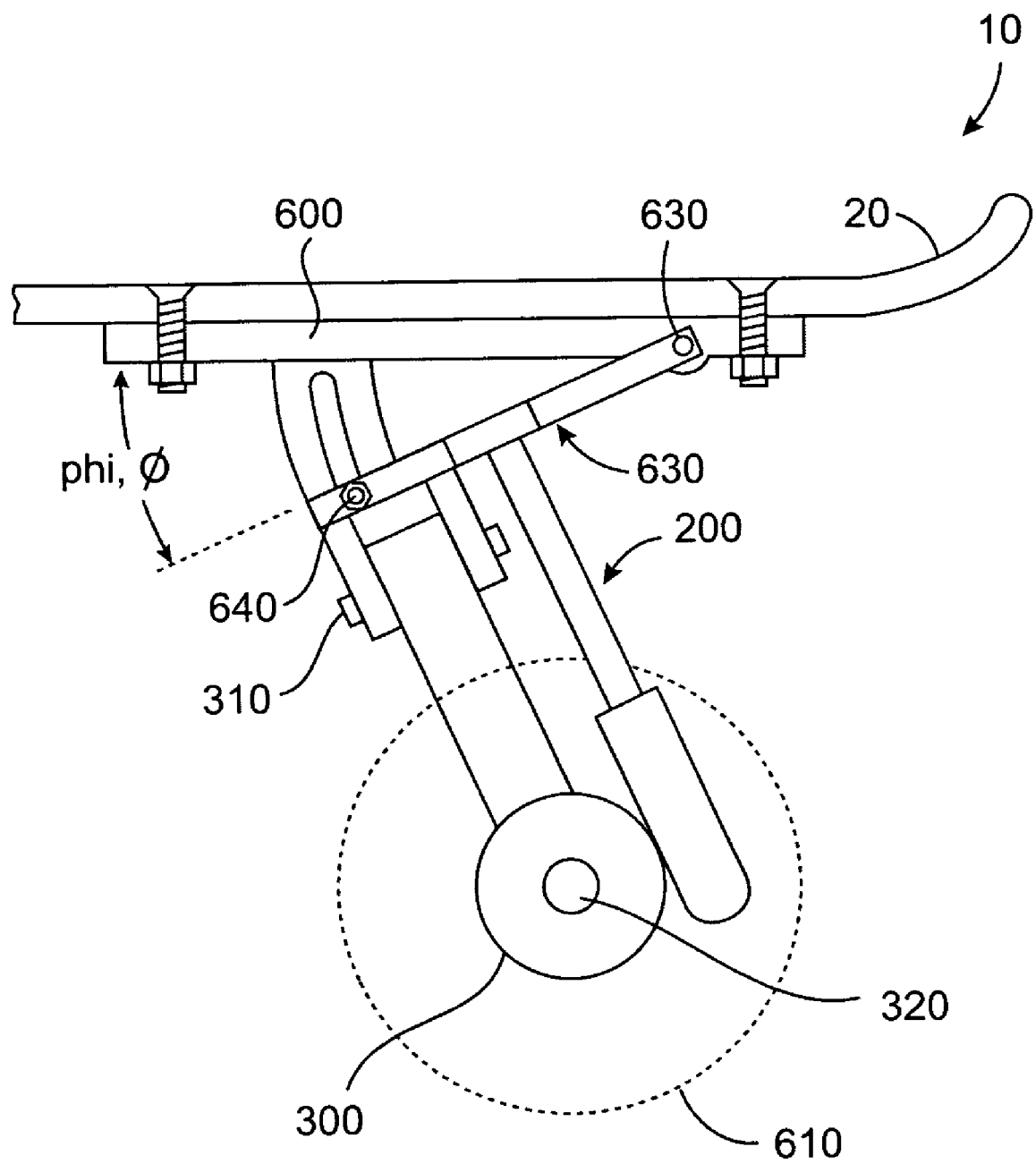
FIG. 35 shows a cross sectional side view of the alternative embodiment of an occupant-propelled device in the form of a skateboard.

FIG. 35 shows a cross section of an alternative embodiment of the skateboard 10 as shown in FIGS. 19-21, 23, 27, and 29. The skateboard 10 comprises a standard or hydraulic skateboard truck housing 300 configured to enable the adjustment of the pitch angle, phi, of the plane of rotation of truck housing 300 as the truck housing 300 pivots about pivot point 310. When the angle phi is zero, the plane of rotation of the truck housing 300 as it rotates around pivot point 310 is vertical. In this end state the truck will not turn left or right in response to the dipping of the deck 20 to the left or right. In this end state, hydraulic cylinders 200 may engage the hydraulic motors, but the skateboard will travel in virtually a straight path. As the angle, phi (φ), is adjusted to larger angles, the plane of rotation of the truck housing 300 as it pivots around pivot point 310 will deviate from vertical. The larger the angle phi, the more responsive the steering of the skateboard will become to a given dipping motion of the skateboard from the first position to the second position. The occupant can manually adjust the angle, phi (φ), to suite his preferences in the responsiveness of the skateboard's steering to a given change in position (dip) of the skateboard's deck. The truck housing 300 can be attached to the skateboard deck 20 by a support plate 610. It can be appreciated that any of the embodiments as shown in FIGS. 19-32 can utilize the pivoting member 630 as shown in FIG. 35.

It can be appreciated that the pivoting member 630 can be manually adjustable to fix the angle phi (φ) to any desired position by suitable connection 640. Alternatively, the pivoting member 630 can comprise a sensor and processing unit to automatically adjust the angle, phi (φ), as a function of the rotational velocity of the axles 320.

Figure 36:
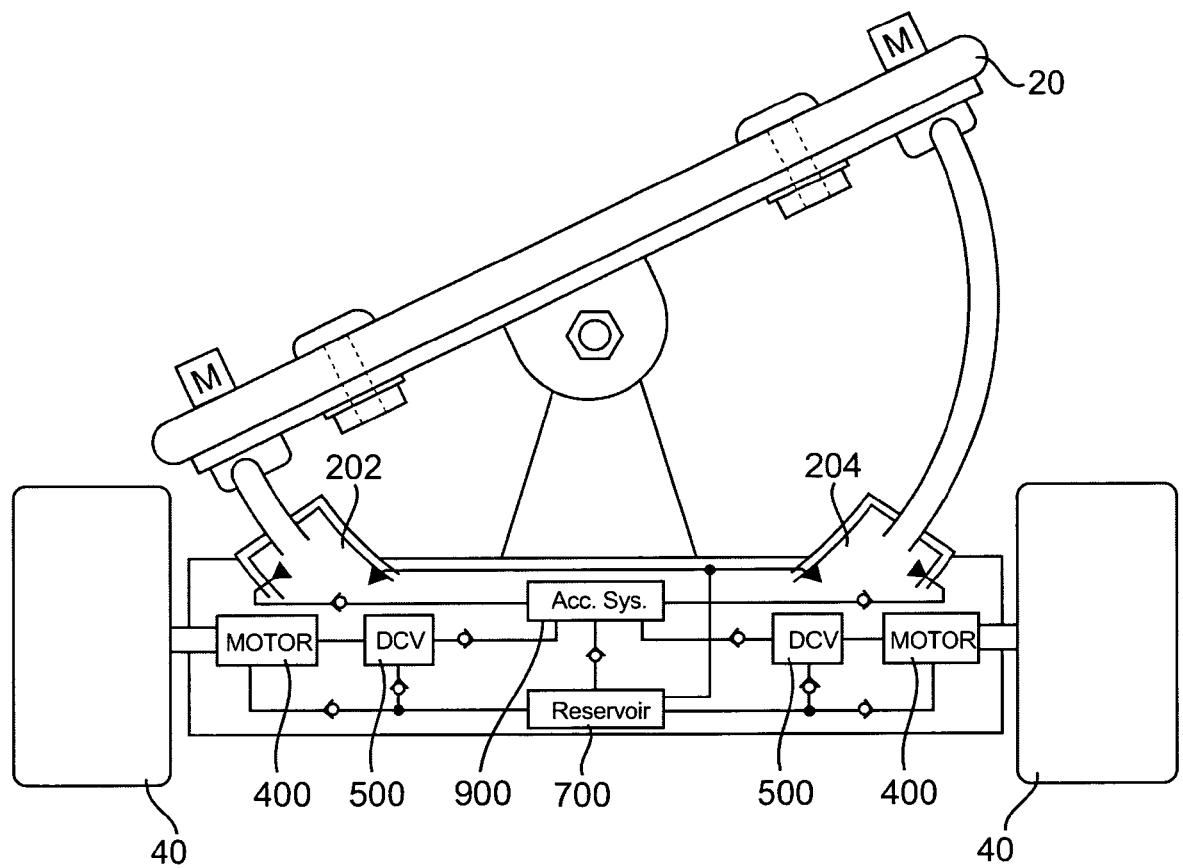
FIG. 36 shows a partial cutaway of a cross sectional end view of a skateboard including hydraulic circuitry symbols illustrating another embodiment.
Figure 37:
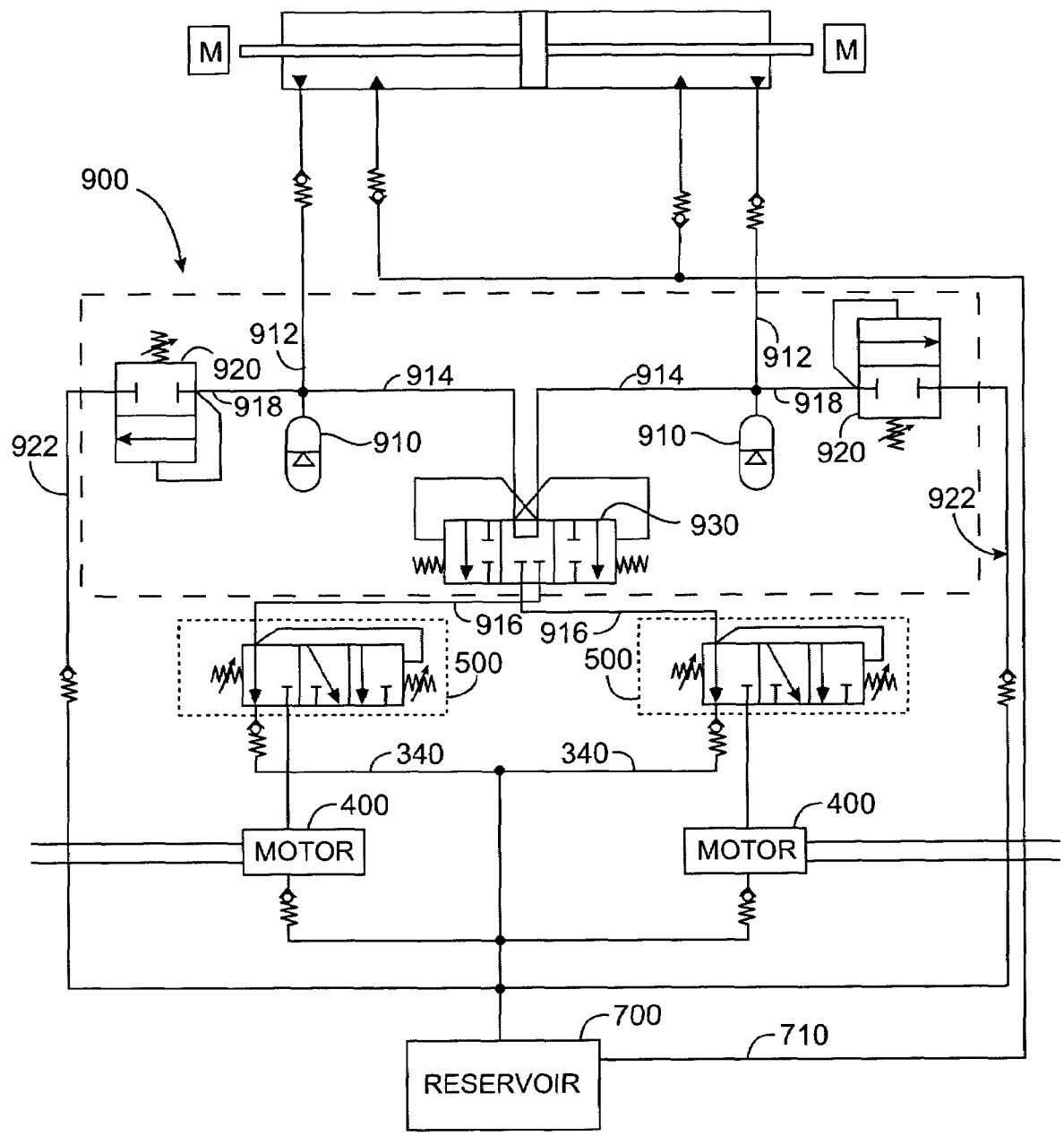
FIG. 37 shows a circuit diagram of a device to generate rotational energy.

FIG. 36 illustrates a circuit diagram for another embodiment of a hydraulic system 220 having a delayed-drive, multiple motors system for a single double-ended-piston-rod hydraulic cylinder 200 and an accumulator system 900. In this embodiment, the rider propels the skateboard in a delayed and indirect response to the steering of the skateboard, whether turning left or right. This is an alternative delayed drive embodiment using hydraulic accumulators 910 as shown in FIG. 37 to store energy rather than double ended piston rods as were used in piston accumulators 800 as shown in FIGS. 29-31.

The delayed response system provides a sensation for the rider that is more similar to the gains and losses in speed encountered when turning, curving, and straightening ones path when snowboarding downhill, or surfing ocean waves. In these sports, the motion of turning tends to slow the rider and speed is typically gained when straightening the path of travel when the radius of curvature of the turn increases. The current embodiment is designed to provide a similar sensation.

Functionally it is proposed that the torque provided by the hydraulic motor 400 in the present embodiment will have less force to overcome than prior direct-drive embodiments and that greater speeds will be possible as a result. As one chamber 202, 204 of the curved double-ended hydraulic cylinder compresses, the radius of curvature of the skateboard's path of travel decreases. The fluid displaced by compressed hydraulic cylinder chamber 202, 204 is forced, under pressure, into storage, within a functional unit herein referred to as an accumulator system 900. At that moment in time when the turning motion of the skateboard has its shortest radius of curvature, the centrifugal and gravitational loads of the rider are peaking for that cycle of compression within the turn. Following this peak the rider begins to straighten his turn, expands the formerly compressed hydraulic cylinder chamber 202, 204 and "unweights" his centrifugal and gravitational loads. Skateboard decks or platforms 20 with greater elasticity will accentuate this unloading effect. It is in this next moment following the peak of the centrifugal loading that the accumulator system 900 releases the stored hydraulic pressure stored within it. This stored hydraulic pressure is able then to act upon a system whose external loads are being lightened, thereby offering the potential of greater speeds, effectively providing a bouncy, sling-shot feeling of propulsion as the rider comes out of his turns. It is this delayed-drive response that will provide a more natural feel similar to that of snowboarding or surfing. Potential energy to propel the skateboard is created when the skateboard is turned either left or right. This potential energy is stored in the accumulator system 900 located in the hydraulic circuits between the hydraulic cylinders chambers 202, 204 on one side, and the directional control valves 500 on the other side. Energy is stored in the accumulator system 900 during the compression of one hydraulic cylinder chamber 202, 204 in a single cylinder embodiment or one of the two cylinders 200 in the multiple hydraulic cylinder 200 embodiment and is retained there until the radius of the turn begins to increase when the path of the skateboard begins to straighten coming out of the turn or when the compressed hydraulic cylinder chamber 202, 204 begins to expand. The potential energy is then released from the accumulator system 900 and made available to one of the hydraulic motors 400. It can be appreciated that the hydraulic energy stored in the accumulator system 900 can be released to multiple motors 400 at the same time without deviating from this invention.

As illustrated in FIG. 36, the delayed-drive system preferably comprises two directional control valves 500, two hydraulic motors 400, two axles 320, at least two wheels 40, a reservoir 700 and the accumulator system 900. The delayed-drive system can be used with the single cylinder 200 or the at least two hydraulic cylinder 200 embodiments as shown in FIG. 19-28. In operation, the system incorporates a reservoir 700 and an accumulator system 900 with a hydraulic motor 400 comprising a fixed displacement or a variable displacement configuration. In addition, the hydraulic motors 400 preferably provide torque in one direction of rotation or both directions of rotation. Preferably a hydraulic motor 400 is positioned on each side of the truck housing 300. A rider stands on the skateboard and shifts their body weight left or right to turn the skateboard. The skateboard deck dips to the left or right, respectively, in response to the shift in the rider's weight. Gravitational force, centrifugal force and the force derived from the dipping of the skateboard left or right will actuate hydraulic cylinder chambers 202, 204. The hydraulic cylinder chamber 202, 204 on one side compresses and the other hydraulic cylinder chamber 202, 204 on the other side simultaneously expands the same amount. This pattern of compression and expansion of the two hydraulic cylinder chambers 202, 204 alternates back and forth as the skateboard is turned repeatedly from left to right.

As illustrated in FIG. 36, two hydraulic motors 400, located within skateboard truck 300, provide torque independently to drive two different axles 320. Each hydraulic motor 400 drives one axle 320. Throughout this description there are dual and symmetric functional elements. The hydraulic motors 400 can be engaged in delayed and indirect response to the compression of one or the other hydraulic cylinder chambers 202, 204. The compression of the hydraulic fluid within the hydraulic cylinder chamber 202, 204 builds potential energy within the accumulator system 900. The potential energy stored in the accumulator system 900 drives the hydraulic motors 400.

FIG. 37 shows the accumulator system 900 comprising two gas accumulators 910, two pressure relief valves 920, a single 3-position-4-port valve 930, and a series of conduits 912, 914, 916, 918, 922. It can be appreciated that there are other methods of designing an element herein referred to as an accumulator system 900 that have the same or similar function of alternately storing and releasing hydraulic potential energy to a hydraulic system. Hydraulic fluid is forced out of the compressed cylinder chamber 202, 204 through conduit 912 and into one of the two gas accumulators 910.

In operation, fluids accumulating in the gas accumulator 910 are stored under pressure and prevented from escaping, so long as the compressing hydraulic cylinder chamber 202, 204 continues its compression phase, or unless accumulated pressure exceeds some maximum threshold defined by the pressure relief valve 920. If pressures in the gas accumulator 910 do exceed maximum threshold pressures defined by the pressure relief valve 920, some hydraulic fluid is released from the gas accumulator 910, through conduit 918, through the relief valve 920, through conduit 922 into the Reservoir 700. When enough excessive pressure in the gas accumulator 910 has been release through the relief valve 920, the relief valve 920 closes. When the hydraulic cylinder chamber 202, 204 begins its expansion phase, pressurized hydraulic fluid in the gas accumulator 910 is released through conduit 914, to the 3-position-4-port valve 930. The 3-position-4-port valve 930 is, itself, controlled by the compression and expansion of hydraulic cylinders chambers 202, 204. During the compression phase of hydraulic cylinder chamber 202, 204 fluids within conduit 914 force the 3-position-4-port valve 930 into one of two end states. In the first end state, the 3-position-4-port valve 930 allows the communication of fluids between one of the gas accumulators 910 in the accumulator system 900 and one of the directional control valves 500. During this same initial end-state of the 3-position-4-port valve 930, fluids are prevented from communicating between the other gas accumulator 910 and the other directional control valve 500. It can be appreciated that any suitable hydraulic accumulator or device that stores energy in the form of fluid under pressure can be used in place of the gas accumulator 910, including but not limited to spring loaded and weight loaded accumulators, without deviating from this invention.

At the point the rider begins to straighten out of the turning skateboards minimum radius of curvature, the compressed cylinder chamber 202, 204 begins to expand. At this moment the 3-position-4-port valve 930 shifts to its second of two end states. In this second end state the roles of the two gas accumulators 910 reverse. The gas accumulator 910 that formerly was storing pressurized fluid is now releasing this stored energy through conduit 914, through the 3-position-4-port valve 930, through conduit 916 to directional control valve 500. This fluid either passes through the hydraulic motor 400 or bypasses the hydraulic motor 400 and through additional conduits to the reservoir 700. Fluid stored in the reservoir 700 is drawn into the expanding hydraulic cylinder chamber 202, 204 through conduit 710.

Once the compressed hydraulic cylinder 202, 204 begins to expand, the potential energy stored within the first gas accumulator 910 is made available to engage one of the hydraulic motors and to propel the vehicle. At the same time energy is released from one of the gas accumulators 910 on one side of the skateboard truck, the other gas accumulator 910 is being stored with potential energy from the compression of the other formerly expanding, now compressing, hydraulic cylinder 202, 204.

The directional control valve 500 directs the hydraulic fluids through the hydraulic motor 400 or to the bypass-conduit 340. As with the other embodiments as shown in FIGS. 23-31, the route the fluid travels will be a function of the hydraulic pressure at the head of the directional valve 500. If pressures are too low or too high the fluid will bypass the motor 400. If pressures are within the manually adjusted operational range, the hydraulic motors will be engaged and impart torque to the drive axle of the hydraulic motor 400.

It can be appreciated that any of the devices 10 as shown among FIGS. 19-32, 36 and 37 can further comprise a hydraulic braking system. The hydraulic braking system comprises a hydraulic brake, which clamps onto or presses against the drive shaft of the motor axle 320 or any other rotating elements of the hydraulic truck 400, axle 320 or wheel 40. It can be appreciated that the hydraulic braking system can be used in both the "on" and "off" modes. The hydraulic braking system can be activated by a hand held control; a foot brake located on the skateboard deck 20, or other suitable device for activating the braking system as disclosed in U.S. patent application Ser. No. 10/980,626, filed Nov. 2, 2004, which is incorporated herein in its entirety.

In an alternative embodiment, the braking system is controlled by a brake pad or lever located on the skateboard deck 20 or skateboard deck. The brake plate or lever rotates about a vertical axis to actuate the hydraulic braking system. In operation, the rider can position his or her trailing foot on or next to the brake plate or lever and upon a twist of the foot; the brake plate rotates sending an impulse to the hydraulic braking system. The hydraulic braking system slows the skateboard and provides the rider with a sensation of a stopping or slowing motion.

It can be appreciated that the skateboard deck 20 can be any type of platform such as a plain deck for moving furniture and other items, or an in-line skate where the wheels with a flat footprint remain in contact with the road and the hydraulic pressure created by the inline boot leaning from left to right and vice-versa creates a linear hydraulic pressure that is converted to rotational force within each of the in-line skates. In addition, any suitable apparatus or device, which compresses and expands the at least one hydraulic cylinder 200 can be used, such that the device and systems as described herein can include not only land based devices but also water craft such as paddle boats, wherein a hydraulic fluid is converted into a rotational torque.

The hydraulic system 220 can be applied to other human powered devices that convert energy generated by compressing and expanding single or multiple hydraulic cylinders into rotational energy via hydraulic motors. Such as motors to drive pumps, pottery wheels, wheeled equipment to move office or work equipment, hand trucks, or any device that can benefit from the rotational energy, such as sewing machines or ice cream makers. In addition, it can be appreciated that any of the embodiments as shown can be incorporated into an inline skate, roller skate, or any device comprising a plurality of wheels.

While the invention has been described with reference to the preferred embodiments described above, it will be appreciated that the configuration of this invention can be varied and that the scope of this invention is defined by the following claims.

The invention claimed is:

1. A method of propelling a wheeled platform comprising the steps of:
   creating a source of energy upon a first change in orientation of the platform around an axis approximately parallel to a longitudinal axis of the platform and wherein the platform rotates around the axis;
   storing the source of energy; and
   releasing the source of energy to propel the wheeled platform upon a second change in orientation of the platform around the axis by converting the source of energy into a rotational force to drive at least one wheel of the wheeled platform.

2. The method of claim 1, wherein creating the source of energy is created as a result of a first movement of a pair of trucks relative to one another, and releasing the source of energy by a second movement of the trucks relative to one another.

3. The method of claim 1, wherein the source of energy is released to a hydraulic motor, wherein the hydraulic motor is configured to propel the wheeled platform.

4. The method of claim 1, further comprising step of storing the source of energy in one or more energy storage elements, and wherein the energy storage elements include at least one of the following: a spring, a compressed or pressurized gas, an elastic material, a battery, or a hybrid combination of one or more of the energy storage elements.

5. The method of claim 1, further comprising step of releasing the source of energy from one or more energy storage elements, wherein the one or more energy storage elements comprises a ratchet system which engages the storing of energy when the platform is rotated in one direction and which disengages the storage of energy from the movement of the platform when the platform rotates in the opposite direction, and which releases the energy to one or more mechanisms to propel the wheeled platform.

6. The method of claim 1, further comprising step of releasing the source of energy from one or more energy storage elements, wherein the one or more energy storage elements comprises a mechanical or electronic toggle system, which engages the storing of energy when the platform is rotated in one direction and which disengages the storage of energy from the movement of the platform when the platform rotates in the opposite direction, and which releases the energy to one or more mechanisms to propel the wheeled platform.

7. The method of claim 1, further comprising step of releasing the source of energy from one or more energy storage elements, wherein the one or more energy storage elements comprises an electronic sensor and switching system which releases the energy to one or more mechanisms to propel the wheeled platform when the platform rotates around its rotational axis in a programmed response to some movement of the platform relative to a truck assembly.

8. The method of claim 1, further comprising step of releasing the source of energy from one or more energy storage elements, wherein the one or more energy storage elements comprises a pneumatic or hydraulic control valve system which engages the storing of energy when the platform is rotated in one direction and which disengages the storage of energy from the movement of the platform when the platform rotates in an opposite direction, and which releases the energy to one or more mechanisms to propel the wheeled platform.

9. The method of claim 1, wherein the source of energy is released to a pneumatic motor, wherein the pneumatic motor is configured to propel the wheeled platform.

10. The method of claim 1, wherein the source of energy is released to a electric motor, wherein the electric motor is configured to propel the wheeled platform.

11. The method of claim 1, wherein the source of energy is released to a mechanical drive train, wherein the mechanical drive train is configured to propel the wheeled platform.

12. The method of claim 1, wherein the source of energy is released to a hybrid mechanism which may include hydraulic, pneumatic, electric, electronic, mechanical, internal combustion elements, wherein the hybrid mechanism is configured to propel the wheeled platform.

13. The method of claim 1, wherein the wheeled platform comprises:

a platform;
a pair of trucks, each truck being adapted to be attachable to the platform and comprising at least one axle configured to receive a wheel; and
at least one wheel attached to the at least one axle of each truck.

14. The method of claim 1, wherein the first change in orientation of the platform relative to the axle housing of the wheeled platform results in a turning response of the wheeled platform.

15. A method of propelling a wheeled platform comprising the steps of:

creating a source of energy upon a first change in orientation of the platform around an axis approximately parallel to a longitudinal axis of the platform and wherein the platform rotates around the axis;
storing the source of energy;
releasing the source of energy to propel the wheeled platform upon a second change in orientation of the platform around the axis; and
sensing the change in orientation of the platform element with at least one sensor, and wherein a signal from the at least one sensor controls a distribution of energy for the propulsion of the wheeled platform.

16. The method of claim 1, wherein the axis approximately parallel to the longitudinal axis of the platform corresponds to a direction of rolling motion of the wheeled platform.

17. A method of propelling a wheeled platform comprising the steps of:

creating a source of energy upon a first change in orientation of the platform around an axis approximately parallel to a direction of rolling motion of the platform and wherein the platform rotates around the axis;
storing the source of energy; and
releasing the source of energy to propel the wheeled platform upon a second change in orientation of the platform around the axis by converting the source of energy into a rotational force to drive at least one wheel of the wheeled platform.

18. The method of claim 17, wherein the first change in orientation of the platform relative to the axle housing of the wheeled platform results in a turning response of the wheeled platform.

19. The method of claim 18, wherein the second change in orientation of the platform relative to the axle housing of the wheeled platform results in a second turning response of the wheeled platform.

20. A method of propelling a wheeled platform comprising the steps of:

creating a source of energy upon a first change in orientation of the platform around an axis approximately parallel to a longitudinal axis of the platform and wherein the platform rotates around the axis;
storing the source of energy; and
releasing the source of energy to propel the wheeled platform upon a second change in orientation of the platform by converting the source of energy into a rotational force to drive at least one wheel of the wheeled platform, wherein the change in orientation of the platform results in a change in direction of the wheeled platform.

* * * * *

UNITED STATES PATENT AND TRADEMARK OFFICE
CERTIFICATE OF CORRECTION

PATENT NO. : 7,635,136 B2 Page 1 of 1
APPLICATION NO. : 11/376621
DATED : December 22, 2009
INVENTOR(S) : Jeffrey E. Cole It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Ninth Day of November, 2010

David J. Kappos
*Director of the United States Patent and Trademark Office*